United States Patent [19]

Perdue et al.

[11] Patent Number: 5,214,364

[45] Date of Patent: May 25, 1993

[54] MICROPROCESSOR-BASED ANTENNA ROTOR CONTROLLER

[75] Inventors: Terry A. Perdue, St. Joseph; David Poplewski, Dowagiac, both of Mich.

[73] Assignee: Zenith Data Systems Corporation, Buffalo Grove, Ill.

[21] Appl. No.: 703,464

[22] Filed: May 21, 1991

[51] Int. Cl.⁵ .................. G05B 19/26; H01G 3/08
[52] U.S. Cl. .................... 318/600; 318/604; 318/664; 343/766; 455/158.1; 342/357
[58] Field of Search ............... 318/560–630, 318/46, 646, 649, 40, 49; 343/757–763, 766, DIG. 2, 894, 765; 342/359, 357; 364/731; 455/158

[56] References Cited

U.S. PATENT DOCUMENTS

| | | | |
|---|---|---|---|
| 4,077,000 | 2/1978 | Grubbs | 318/604 |
| 4,156,241 | 5/1979 | Mobley et al. | 318/649 X |
| 4,208,721 | 6/1980 | Eisenberg | 364/731 |
| 4,263,539 | 4/1981 | Barton | 318/664 |
| 4,496,890 | 1/1985 | Wurdack et al. | 318/600 |
| 4,542,326 | 9/1985 | Hornback . | |
| 4,804,899 | 2/1989 | Wurdack et al. | 318/600 |
| 4,814,711 | 3/1989 | Olsen et al. | 342/357 X |
| 4,862,179 | 8/1989 | Yamada | 343/766 X |
| 4,969,209 | 11/1990 | Schwob | 455/158 |
| 5,001,775 | 3/1991 | Hayashi et al. | 455/158 |

Primary Examiner—Paul Ip
Attorney, Agent, or Firm—Fitch, Even, Tabin & Flannery

[57] ABSTRACT

Apparatus and method for automatically controlling the rotation of an angularly positionable antenna from one angular position to a desired new angular position. The disclosed technique provides the user with a list of destination indicia, each of which corresponds to a geographic location. The user is also provided with a selector for choosing one or more of the available destination indicia. Once the user selects a destination index, a retrieval system automatically retrieves the appropriate geographic reference location from a destination indicia table stored in memory. A calculation is then automatically performed to determine the desired angular position of the antenna with respect to an arbitrary reference angle. The antenna rotor shaft is then energized to rotate the shaft to the desired angular position.

28 Claims, 43 Drawing Sheets

```
Thu 3-15-1991    238°
9:28:56 PM   (Remote)
```

```
60°S/ 63°W  FD80  168°
4:29:02 AM       7174 MI
```

```
South Shetland Isl.
CE9, HF0, LU, VP8, 4K1
```

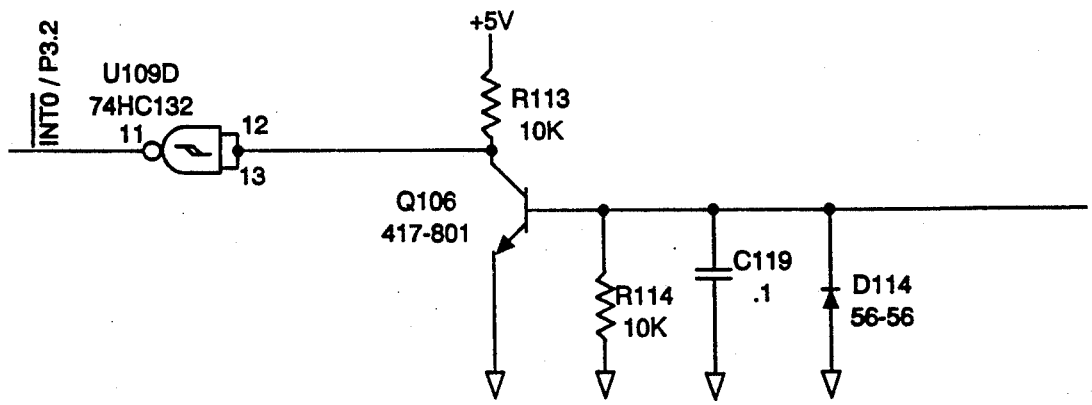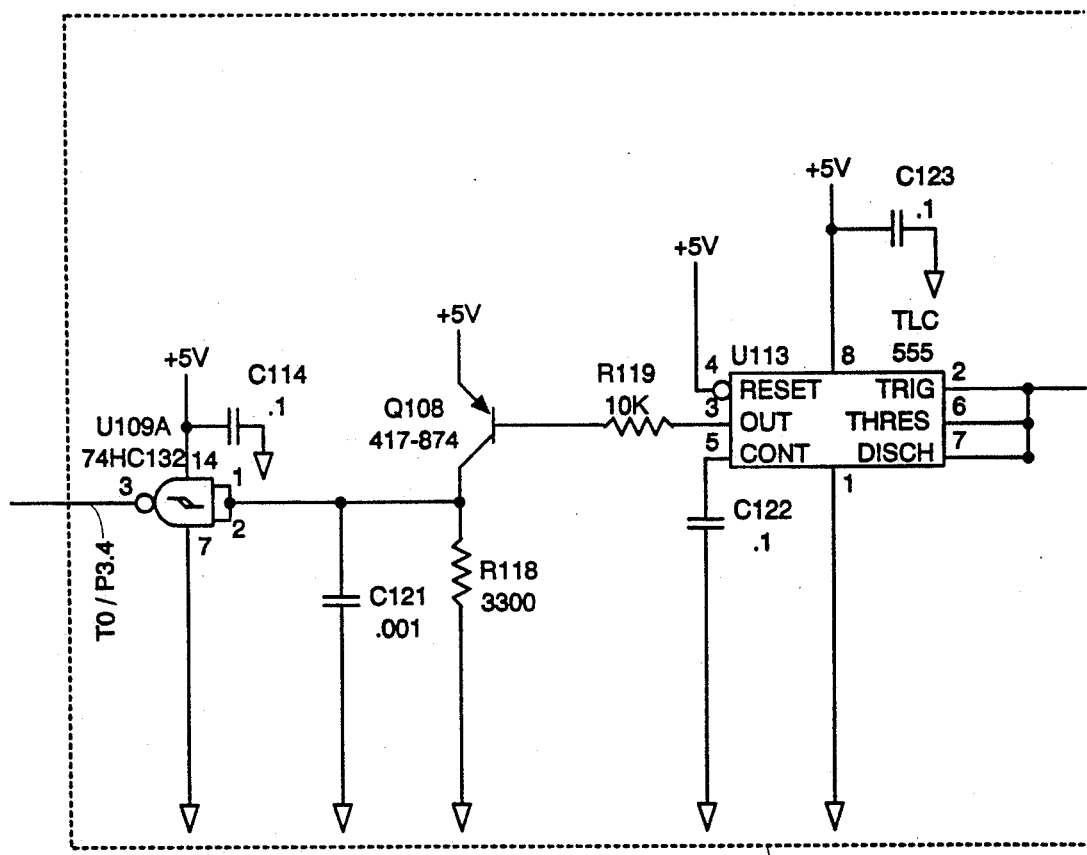
Fig. 7i

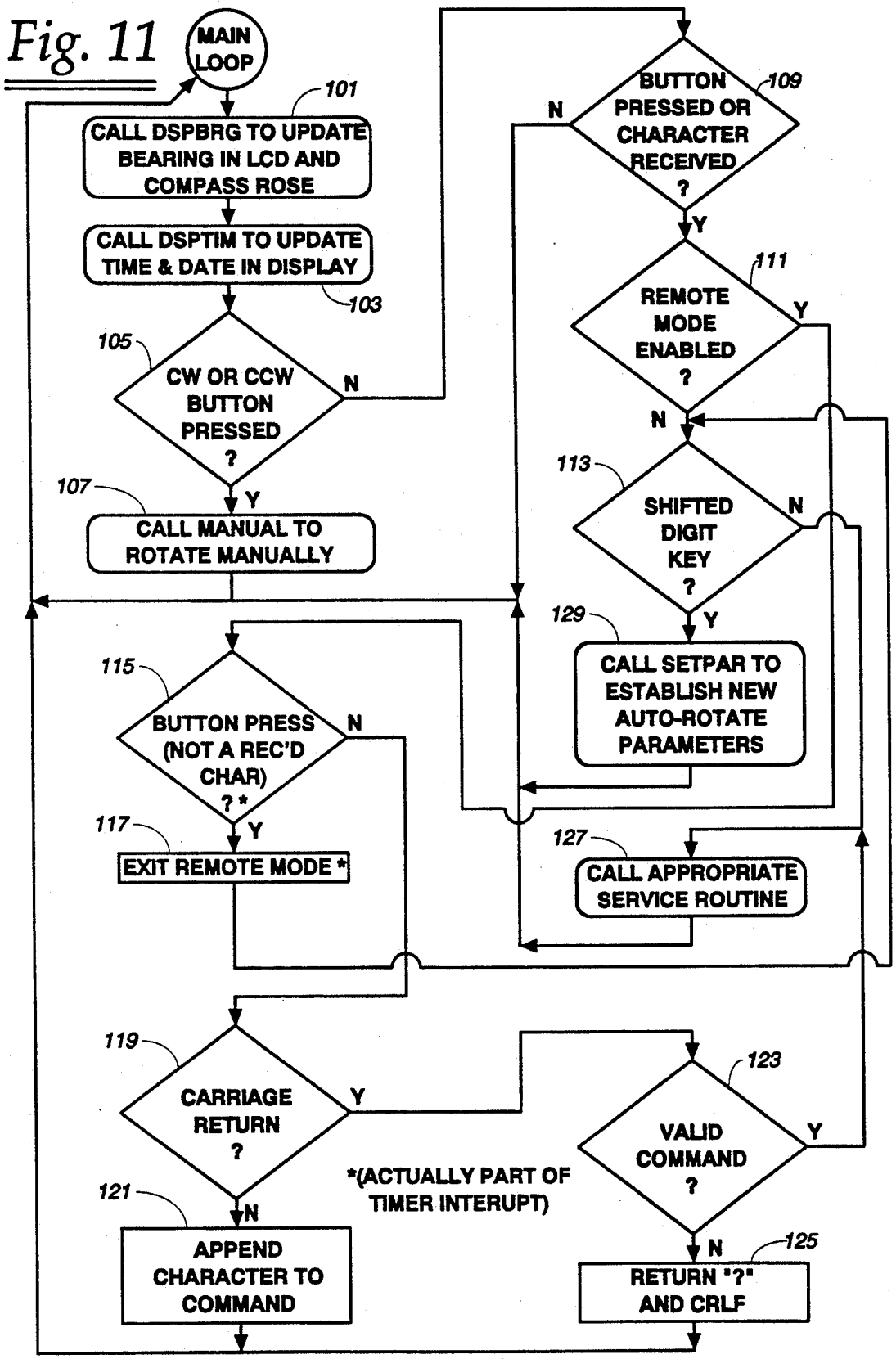

MICROPROCESSOR-BASED ANTENNA ROTOR CONTROLLER

The invention pertains generally to antenna rotor controllers and is more particularly directed to such controllers which are microprocessor-based and automatically rotate an antenna beam to a desired bearing.

Antenna rotator systems generally consist of two components: an antenna rotor motor assembly and a rotor controller. The antenna rotor motor assembly is mounted on a first antenna mast anchored to the ground or other firm support. A multielement directional antenna array is mounted on a second antenna mast which is free to rotate axially. The second antenna mast is supported by the antenna rotor motor assembly, which applies torque to the second mast to rotate the antenna array in a desired direction. The rotor controller, usually placed within easy reach of the radio operator, functions as an interface between the operator and the antenna rotor motor assembly. Multiconductor wire cable connects the rotor controller to the antenna rotor motor assembly. The controller receives power from a standard 117-VAC wall socket, and a step-down transformer is used to provide low-voltage motor control signals.

The radio operator inputs a desired bearing into the controller, and the controller responds by providing the required control signals to the antenna rotor motor assembly. Many controllers contain a rotatable dial surrounded by a compass rose labeled with the four cardinal directions. The dial is coupled to a potentiometer. The operator turns the dial to indicate the desired bearing, and in response the potentiometer and controller cause appropriate control signals to be applied to the antenna rotor motor assembly. The controller may also provide the operator with an indication of the current bearing of the antenna array by receiving, processing and displaying a feedback signal from the antenna rotor motor assembly.

Some controllers can be preprogrammed to store several frequently-used bearings. The operator can select any of the preprogrammed bearings by pressing the appropriate keys on a keypad. Such a system is disclosed in U.S. Pat. No. 4,803,412 to Burton, issued on Feb. 7, 1989, for a programmable electronic antenna rotator.

Various computer software packages are available for calculating distance and bearing from geographic coordinates in latitude and longitude. An example of such a program is DX Helper, available from Antennas West in Provo, Utah. However, these programs do not provide control signals for driving an antenna rotor motor assembly.

Amateur radio enthusiasts and other radio operators often use antenna rotor controllers in conjunction with multi-element directional antenna arrays to enhance the receiving and transmitting capabilities of their equipment. In general, the radio operator must first find the location that he/she wishes to work on a map, chart or globe. From this information, the operator calculates or estimates a bearing. Next, the operator sets the antenna rotor controller manually to the desired bearing If the radio operator now wishes to work another location, this procedure must be repeated.

Antenna rotation by means of a conventional rotor controller presents several shortcomings. Since the controller cannot accept the names of geographic locations, the radio operator must first calculate or estimate a bearing, and then enter the bearing into the controller to rotate the antenna If the operator calculates the bearing, the listening area is cluttered with protractors, rulers, calculators, maps and charts. Even with these aids, the accurate determination of a bearing is a laborious, time-consuming task prone to errors. Since propagation conditions can change quite rapidly, a rare or important contact can be missed because of the time required to compute a bearing. If the operator estimates the desired bearing, the capabilities of a high-gain, narrow-beamwidth antenna are not fully utilized.

If a radio operator frequently works a wide variety of locations, a long list of countries and bearings is typically developed. The need for such a list exists because radio operators generally think of desired target zones in terms of destination indicia, such as country names and amateur radio prefixes, whereas antenna rotor controllers require an input that represents a bearing as an angle measured in degrees. In many cases, the list of countries and bearings grows unmanageably long.

Accordingly, a general object of the present invention is the development of a system that aims an antenna automatically after the operator specifies the target zone by means of a destination index, such as a country name or an amateur radio prefix. Preferably, the various destination indicia are listed, so that the radio operator simply selects from among the available listed alternatives.

SUMMARY OF THE INVENTION

The present invention provides a system for automatically controlling the rotation of an angularly positionable antenna from one angular position to a desired new angular position. The system provides the user with a list of destination indicia, each of which corresponds to a geographic location. These destination indicia are displayed for the convenience of the user. The user is provided with selection means for selecting one or more of the available destination indicia. The destination indicia list is stored in memory as a table which associates each destination index with a geographic reference location in latitude and longitude, and/or a time zone offset referenced to an arbitrary time zone. Once a destination index is selected by the user, a retrieval system automatically retrieves the appropriate geographic reference location and/or the appropriate time zone offset from the table stored in memory. A calculation is then automatically performed to determine the desired angular position of the antenna based upon the location of the selected geographic reference location with respect to an arbitrary reference location. The antenna rotor shaft is then automatically energized to rotate the shaft to the desired angular position.

Additional features and objects of the invention are to be found in the following detailed description.

BRIEF DESCRIPTION OF THE DRAWINGS

FIG. 3a is an enlarged detailed view of a key, illustrated in FIG. 3.

FIG. 4 depicts three exemplary display modes for the display means shown in FIG. 3;

FIGS. 7a-7j; represents an electrical schematic diagram of the main circuit board of the control unit shown in FIG. 1;

FIG. 11 is a software flowchart illustrating the main program loop of the rotor controller shown in FIG. 1;

DESCRIPTION OF THE PREFERRED EMBODIMENTS

Figure 1:
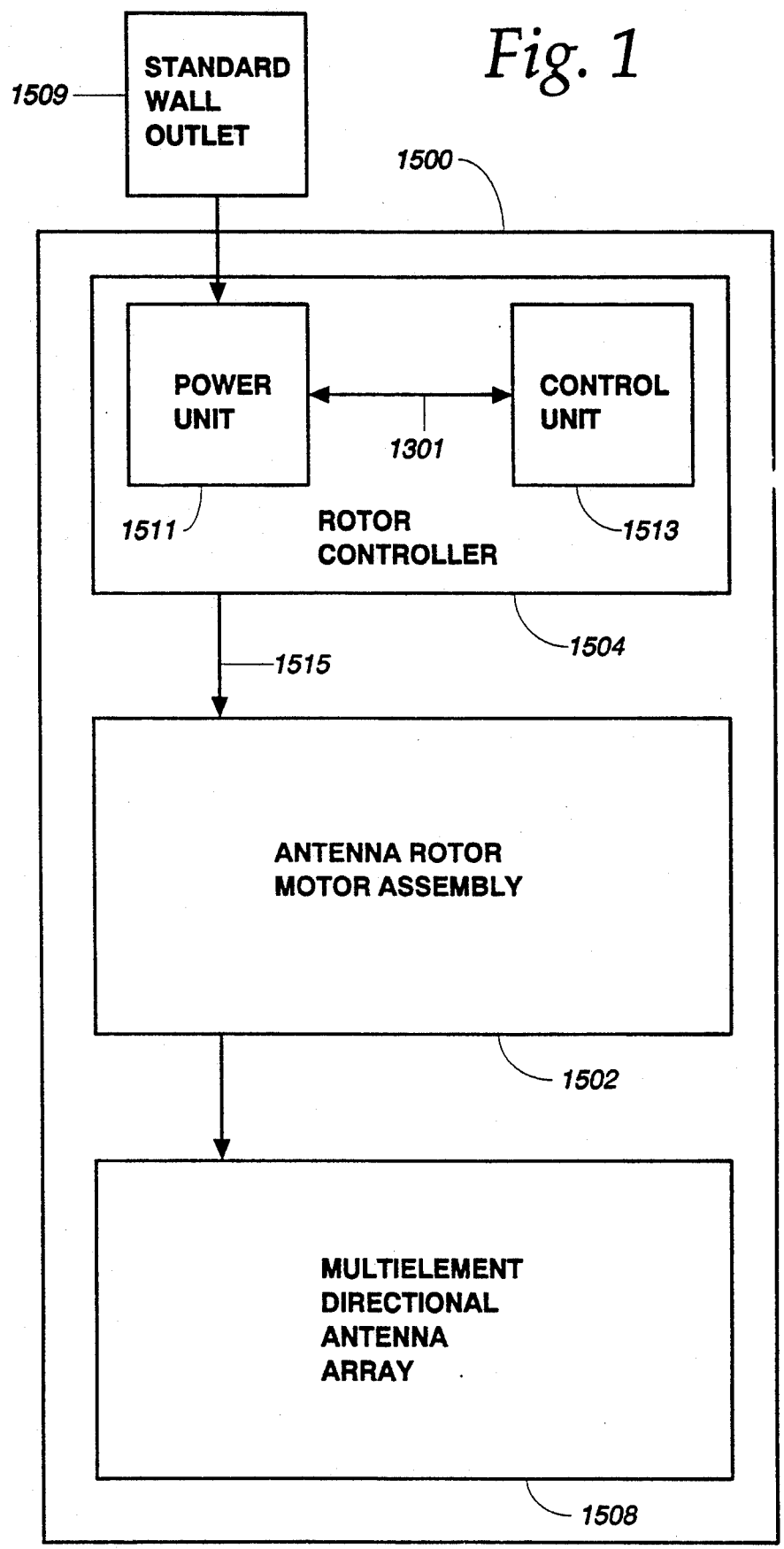
FIG. 1 is a functional block diagram of a system for automatically controlling the rotation of an angularly positionable antenna and constructed in accordance with the invention.

The present invention provides the operator with a list of destination indicia. Each destination index corresponds to a specific geographic region representing a possible desired target zone. Accordingly, destination indicia include amateur radio prefixes, country names and/or the names of cities, states and provinces.

After the operator selects a particular destination index from among the alternatives, the present invention automatically controls the movement of an antenna rotor motor to aim an antenna array at the desired geographic region. The invention calculates the distance and bearing of the target zone with respect to the location of the operator.

In this manner, the invention functions as an interface between the operator and the antenna rotor motor. The operator need only know the common name for his/her desired target zone. After he/she selects the zone of his/her choosing, the present invention carries out the necessary calculations and provides the required control signals to the antenna rotor motor. In response to the control signals, the antenna is moved to the appropriate bearing. The operator need not perform any laborious calculations or any further manipulation of controls to aim the antenna as desired.

In the preferred embodiment, the microprocessor-based antenna rotor controller of the present invention provides a system for automatically controlling the rotation of a multielement directional antenna array from one position to a desired new position. The rotor controller contains a display which provides the user with a list of destination indicia, including country names and amateur radio prefixes. Manual selection means are used to select a specific entry from among the various available destination indicia or to select a particular group of destination indicia from the destination indicia database. A memory contains a table associating each of the destination indicia with a corresponding bearing specifying an angular offset from a fixed reference angle. A retrieval system obtains the bearing corresponding to the selected destination indicia. The bearing is then processed to produce a control signal for rotating the antenna rotor shaft to the desired bearing.

The rotor controller contains a permanent destination indicia database of over 400 geographic names, including their coordinates, call letter prefixes and time zones, and permits the radio operator to enter and store additional names and coordinates of the operator's own choosing via a standard QWERTY keyboard. The keyboard may also be used to enter the first few letters of a country, an amateur radio prefix or partial prefix, geographic coordinates in latitude and longitude, a grid square or a bearing in degrees. In response, a microprocessor calculates the bearing of the desired target zone and applies the necessary control signals to the antenna rotor motor to point the beam antenna in the desired direction.

The rotor controller offers a scanning feature whereby the radio operator may scan through a built-in destination indicia database to obtain information before the antenna is rotated. In the preferred embodiment, this database contains a list of countries, states, amateur radio prefixes and grid squares. Additionally, the operator may customize the database to make the beam selections more convenient or more precise. The operator may enter new bearings or edit existing entries. Each new or revised bearing may be designated by destination indicia of the operator's own choosing.

The operator can rotate the antenna to any arbitrary angle of his or her own choosing by pressing keys which will rotate the antenna rotor motor clockwise or counterclockwise as desired. Alternatively, the operator may specify a desired angular position in degrees. In either case, the invention provides a constant visual update on the current angle. Sight-impaired users can select an option whereby the rotor controller annunciates current bearings in audible Morse code at 20 wpm.

The rotor controller contains a 40-character LCD display. In its default mode, the display shows the current time, date, day of the week and antenna bearing to the nearest degree. The bearing is also displayed on a compass rose of 16 LEDs, with a resolution of roughly 10 degrees. In addition, the short or long path distance, the latitude and longitude, the grid square and the time in the target country may be displayed.

The rotor controller provides precision motor control including motor pulsing, automatic braking and initial back-rotating to protect the brake from locking due to windloading of the antenna beam. The rotor controller monitors the motor's duty cycle to ensure that the motor does not overheat.

The rotor controller includes a compact controller module that is linked to a separate power unit. The control module can run as a "stand-alone" unit, with its LCD display and LED compass rose. Alternatively, it can be connected to a personal computer that is programmed to serve as the keyboard and display, with the personal computer software either transiently resident or available as part of a pop-up menuing system. A voice card, manufactured by the Heath Company of Benton Harbor, Mich., can be installed in the personal computer to provide sight-impaired operators with full access to the rotor controller's functions.

The rotor controller is designed to replace the conventional control console provided with many commonly-available antenna rotating systems. Consequently, the controller has been designed to interface with all Ham-M (series 3, 4, 5 and 6), Ham-II, Ham-III, Ham-IV, T$^2$X, CDE TR-44, CD-45 (series 2), M2 and HDR-300 rotators.

As shown in FIG. 1, antenna rotator systems 1500 generally consist of three components: an antenna rotor motor assembly 1502, a rotor controller 1504 and a multi-element directional antenna array 1508. The rotor controller 1504 contains a power unit 1511 and a control unit 1513. These units may be integrated into a single package, but the control unit 1513 and the power unit 1511 are preferably provided as two separate devices in order to conserve on desk space and to permit wall mounting of control unit 1513, if desired. The power unit 1511 converts the 117-VAC current from a standard wall outlet 1509 into low-voltage alternating current and/or low voltage direct current. These low voltages are used to power the control unit 1513 and the antenna rotor motor assembly 1502. Multiconductor cables 1301, 1515 may be used to connect the power unit 1511 to the control unit 1513 and to connect the power unit 1511 to the antenna rotor motor assembly 1502, respectively. If the control unit 1513 and the power unit 1511 are integrated into a single package comprising rotor controller 1504, then only one run of multiconductor control cable 1515 will be required, linking the rotor controller 1504 with the antenna rotor motor assembly 1502.

Figure 2:
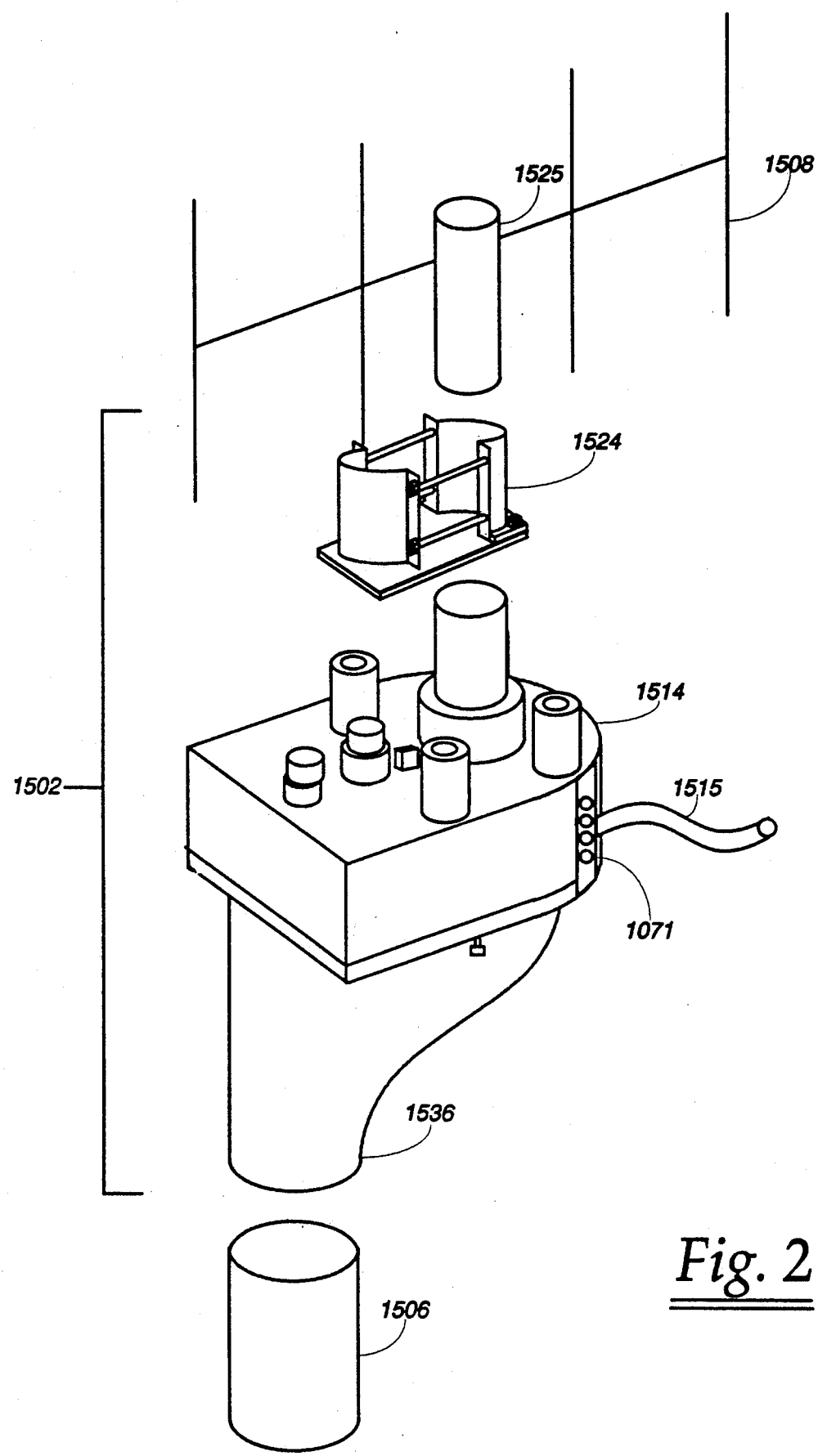
FIG. 2 is a side view of the antenna rotor motor assembly shown in FIG. 1.

The antenna rotor assembly 1502, shown in greater detail in FIG. 2, is mounted on a stationary support mast 1506 and must support the full weight of the multielement directional antenna array 1508. The antenna rotor motor assembly 1502 contains a housing 1514, a rotatable antenna support shaft holder 1524, a rotatable antenna support shaft 1525, mounting means 1536 for mounting the antenna rotor motor assembly 1502 to the antenna mast 1506, and a multiconductor control cable 1515 for connecting the antenna rotor motor assembly 1502 to the power unit 1511 of rotor controller 1504 or directly to rotor controller 1504 (FIG. 1).

A standard eight-position terminal block 1071 (FIG. 2) is provided to facilitate cable connections between the rotor controller 1504 (FIG. 1) and the antenna rotor motor assembly 1502 (FIGS. 1 and 2). A total of seven connections must be made; accordingly, standard 8-conductor rotor cable may be used for multiconductor control cable 1515. The seven connections are: (1) ground; (2) clockwise rotation control line; (3) counterclockwise rotation control line; (4) clockwise end of the position potentiometer; (5) wiper terminal of the position potentiometer; (6) counterclockwise end of the position potentiometer; and (7) braking device control line. The azimuth-indication potentiometer 1522 (FIG. 5) in the antenna rotor motor assembly 1502 (FIGS. 1 and 2) is wired with its wiper at ground potential. The rotor controller 1504 (FIG. 1) uses the potentiometer 1522 (FIG. 5) as a rheostat, only requiring a connection to the wiper and one end of the potentiometer 1522 (in this case, the clockwise end as viewed from the top of the rotor motor 1510). However, the counterclockwise end may be connected to the wiper so that if there is a dirty spot on the potentiometer 1522, the resistance will only rise to the total resistance across the ends of the potentiometer 1522. Conventional systems require all 8 wires; both sides of the potentiometer 1522 are used. In this system, it is preferred that two ground wires be used, one for AC common, the other for DC (analog) ground. This keeps any AC from I-R voltage drops out of the voltage-to-frequency converter 1409 (FIG. 6) during rotation. Therefore, all 8 wires are used.

Figure 3:
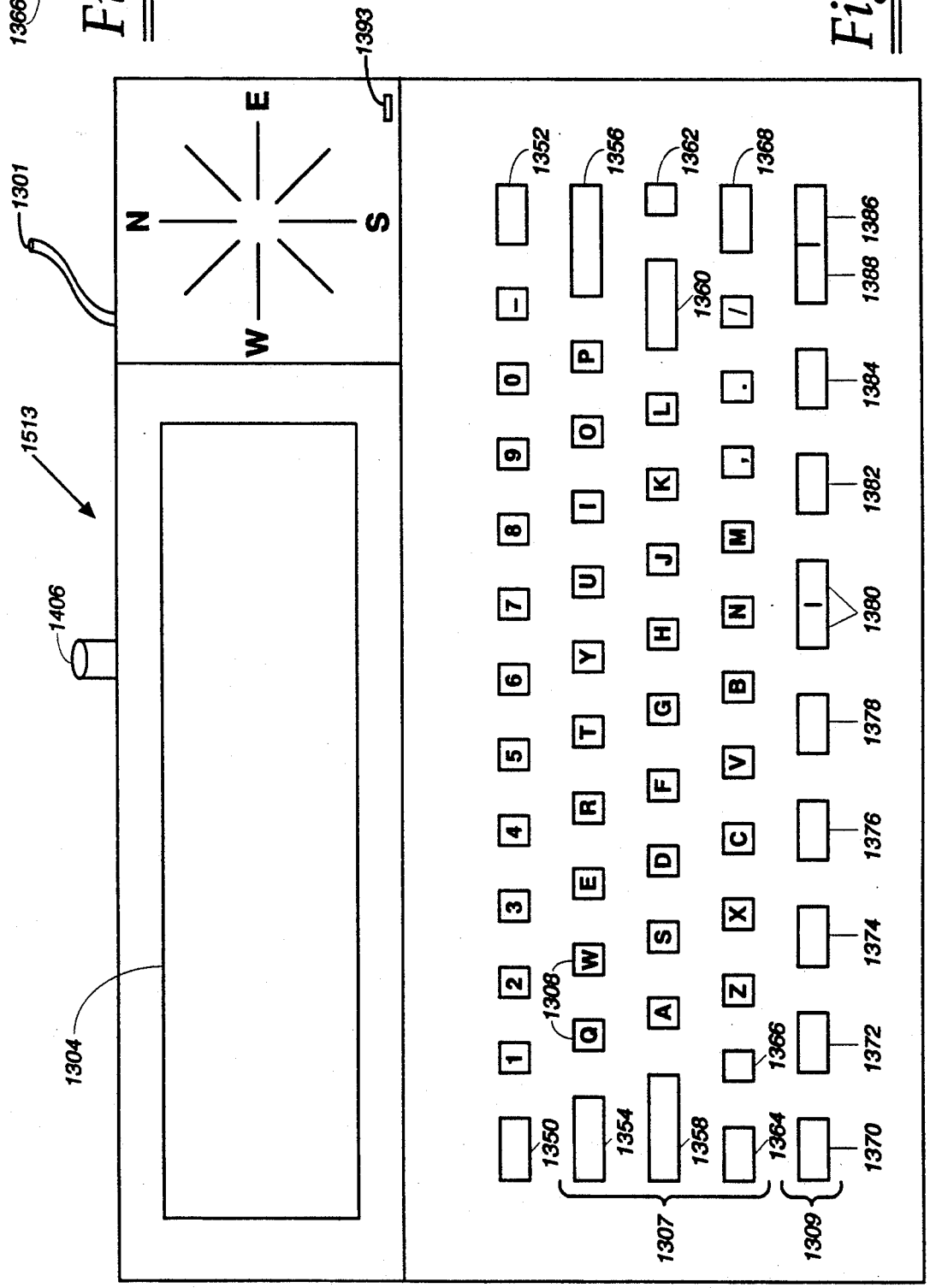
FIG. 3 is a top view of the control unit graphically depicted in FIG. 1.

FIGS. 3a-3b are plan views of the control unit 1513 graphically depicted in FIG. 1. The control unit 1513 receives power from the power unit 1511 (FIG. 1) via multiconductor power cable 1301. Information is transferred between the control unit 1513 and the antenna rotor motor assembly 1502 through power unit 1511. These communications occur over the multiconductor control cable 1515 running between the antenna rotor motor assembly 1502 and the power unit 1511, and over the multiconductor power cable 1301 unit 1513. With reference to FIG. 3b, the control unit contains a display means, which in the preferred embodiment is a 40-character liquid-crystal display (LCD) 1304 (FIG. 4). However, other types of displays, such as a light-emitting diode (LED) display, a fluorescent display or a cathode-ray tube display could be used for display means without departing from the scope of the invention.

A compass rose display 1305 (FIG. 3b) is provided, consisting of a plurality of light-emitting diodes (LEDs) arranged about the circumference of a circle. As the LED compass rose display 1305 is intended as a visual aid and to provide a rough indication of the actual antenna bearing, a sixteen-segment display provides the operator with useful information, yet it does not introduce unnecessary complexity or cost into the design of control unit 1513. As the multielement directional antenna array 1508 (FIG. 1) is rotated about, the compass rose display 1305 (FIG. 3b) is continuously updated to indicate the actual position of the antenna array 1508 by means of position feedback signals transmitted to the control unit 1513 via multiconductor control cable 1515 and multiconductor power cable 1301 (FIG. 1). The LED compass rose display 1305 provides a resolution of 32 points or 11.25 degrees.

The control unit 1513 (FIG. 3b) contains manual selection means 1307, which, for example, may be a standard QWERTY keyboard 1308. The manual selection means 1307 is used to select from among the various available destination indicia. If desired, one or more special function keys 1309 may be provided. The special function keys 1309 provide quick access to procedures which are used frequently or which have special significance. In the preferred embodiment of the invention, the special function keys 1309 are labelled "CW" 1350, "REMOTE" 1352, "STORE" 1354, "ACCESS" 1356, "RECALL" 1358, "ENTER" 1360, "DEL" 1362, "SHIFT" 1364, "SPC" 1366, "DSPLY" 1368, "BEAR'G" 1370, "COORD" 1372, "GRID S." 1374, "PREFIX" 1376, "CNTRY" 1378, "PREV/NXT" 1380, "PATH" 1382, "AUTO" 1384, "ROTATE MANUAL CW" 1386 and "ROTATE MANUAL CCW" 1388. The function of these special function keys 1309 will be explained more thoroughly in conjunction with the detailed description of the software flowcharts.

Destination indicia may consist of any distinguishing word, phrase, numerical combination or feature which uniquely identifies a geographic area, including the name of a city, state or country; an amateur radio prefix; a grid square; or geographic coordinates in longitude and latitude. Cities are used only if entered into the database by the user—no cities are provided in the destination indicia database. Alternatively, the first few characters of one of these destination indicia sufficient to distinguish that entry from all others entries in the destination indicia database may be specified.

The control unit 1513 (FIG. 3b) is designed for user convenience It is relatively compact and may be placed on a desktop without significantly reducing the radio operator's workspace in a typical amateur radio installation. If space is at a premium, the control unit 1513 may contain mounting means for mounting the unit on a wall or other stationary object.

The liquid crystal display 1304 displays information in one of a plurality of display modes as depicted in FIG. 4. In the first (normal) standby mode, the liquid crystal display 1304 shows local day, date, time and current bearing. In a second display mode, selected by pressing one of the special function keys 1309 (FIG. 3b), the liquid crystal display 1304 (FIG. 4) shows a selected country's latitude and longitude, grid square, bearing, time and distance A third display mode sequentially displays names and possible prefixes for any of over 400 countries stored in the permanent database of the control unit 1513. This display only appears when making an entry by country name or prefix. If a country name is entered, the operator can step forward or backward alphabetically through the names. If a prefix is entered, the operator can step forward. This feature is provided so that if a partial name or prefix is entered, and the operator does not retrieve the prefix he/she intended, he/she can still select without starting over. The third standard window of information displays the currently selected country and all prefixes associated with it.

The DSPLY key 1368 toggles the liquid-crystal display 1304 through the aforementioned display modes. The first display mode window is the window that is normally displayed The operation of some keyboard 1308 keys will automatically return the liquid crystal display 1304 to this display mode, which gives the local day of the week, date, time and the current bearing. The LCD display 1304 also displays "REMOTE" if the controller is in the remote mode.

The second window displays the target bearing. The rest of the information in this window, if any, depends on the manner in which the target bearing was specified If the bearing was entered in degrees with the BEAR'G key 1370, the numerical bearing in degrees is all that will be displayed. If the latitude and longitude were entered with the COORD key 1372, or the grid square was entered with the GRID S. key 1374, then the latitude, longitude and grid square will also be displayed. If the RECALL key 1358 was used to recall a previously stored name bearing, the bearing and reference name will appear. Finally, if the selection was made by country name with CNTRY key 1378 or by prefix with the PREFIX key 1376, then bearing, latitude, longitude, grid square, distance to and time at that location will be displayed in this window. A third window, accessed by pressing the DSPLY key 1368 once again, will contain the country name and prefix list. Any information that is not known will not appear in the selected window, and if any window is blank, it will not be accessed with the DSPLY key 1368. For example, if a command is issued to automatically rotate the beam antenna to a bearing given in degrees, the window that normally displays the country name and prefix list will be blank, and therefore skipped.

When entering information, such as a country name or a bearing, the top line of the display will prompt for the required data, while the bottom line will display the data which has been entered. If the prompt is requesting a selection between several options, such as "12 or 24 hour clock?", or "Miles or Kilometers?", pressing the first character of the selection is all that is required In the first example above, pressing the "2" key will select a 24-hour time format, and the next prompt will appear. In cases where several characters are required, such as the entry of a country name, the ENTER key 1360 must be pressed to terminate the entry. To remind the operator that his entry should be terminated with the ENTER key 1360, a cursor will appear in the lower line. The DEL (delete) key 1362 may be pressed to correct mistakes before pressing the ENTER key 1360.

In general, if the operator changes his mind after making an entry or entering a menu, he/she can press the DELETE key 1362 as necessary to clear the bottom line, and then press the ENTER key 1360 to return to the normal display with that selection unchanged. If the name of a country or state is entered, the approximate geographic center of the country or state is used to calculate a bearing. The target time is referenced to the center of the selected area, and does not take daylight savings time into account.

Figure 5:
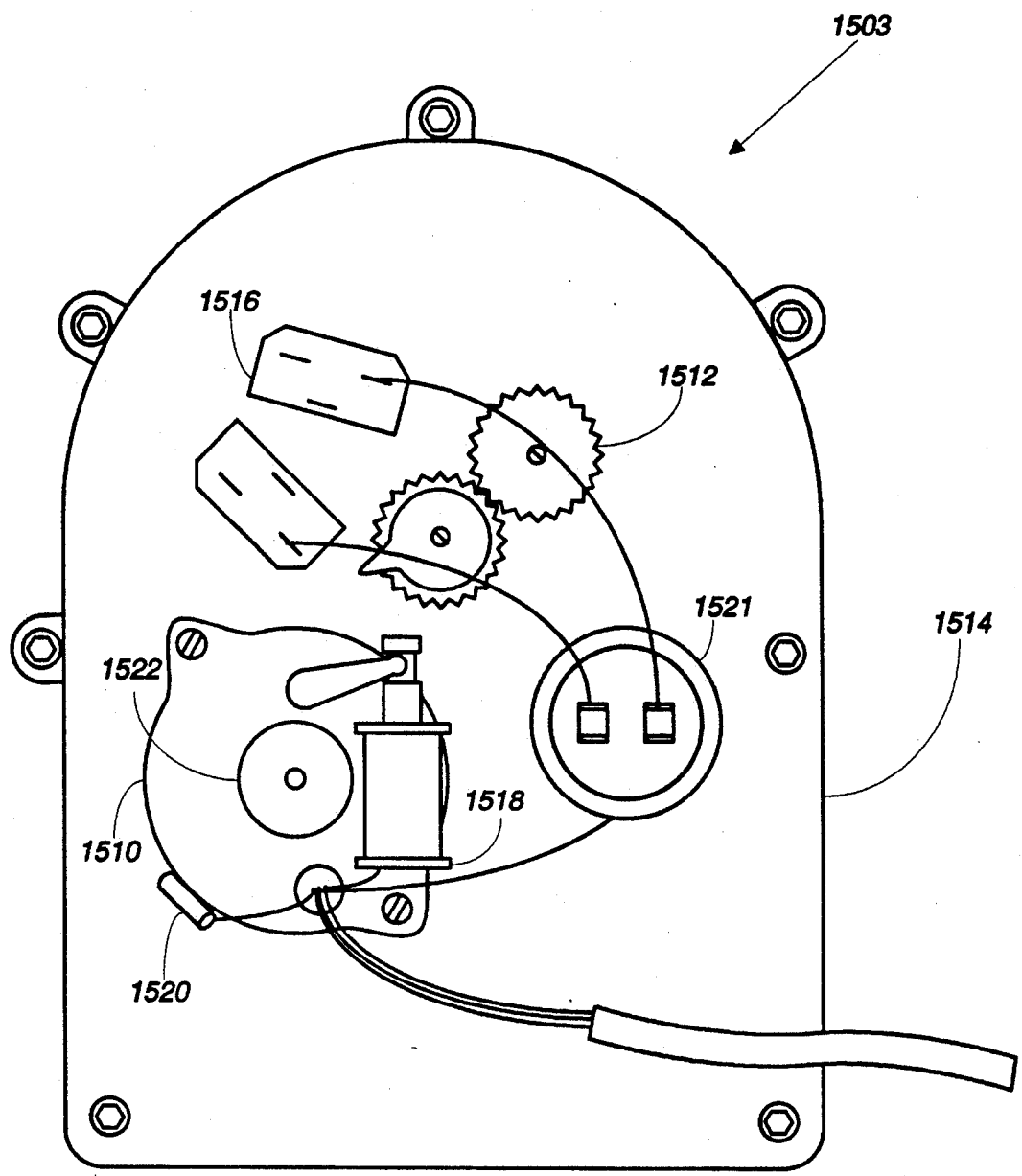
FIG. 5 is a bottom view of the antenna rotor motor assembly shown in FIG. 2.

FIG. 5 illustrates a top view of the antenna rotor motor assembly 1502 shown in FIG. 2 with the housing 1514 removed for clarity The antenna rotor motor assembly 1502 may contain a motor 1510, a gear train 1512, a housing 1514, one or more limit switches 1516, a brake/clutch device 1518, a thermal overload circuit breaker 1520, a motor capacitor 1521 and an azimuth-indication potentiometer 1522.

The motor 1510 (FIG. 5) is typically a split-phase motor which receives low-voltage, single-phase AC power through one or more limit switches 1516. The motor 1510 drives a gear train 1512 constructed of metal or fiber spur gears. To reduce vibration, any gears which are driven directly by the motor may be fabricated of fiber; however, the remaining gears should be constructed of heavy steel to provide strength and reliability. The gears may be lubricated with a grease that is stable over a wide temperature range, i.e., −60° F. to +280° F., to permit outdoor operation in a variety of climates and locations.

Some rotor motors contain a thermal overload circuit breaker 1520 which will not allow the motor 1510 to operate if the motor becomes too hot. Many rotor motors are designed for intermittent duty and will not withstand continuous operation. If the motor 1510 is energized for more than a few minutes at a time, it will overheat and burn out. The circuit breaker 1520 automatically resets after the motor 1510 has cooled down. The reset period of thermal circuit breakers 1520 will vary from 5 to 15 minutes, depending upon ambient temperature. Usually, a thermal breaker is not provided in the rotor itself. Generally, the thermal breaker is in the power supply—often imbedded in the windings of the power transformer.

Under conditions of ordinary with a manual rotor controller, it is very unlikely that the duty cycle of the motor 1510 would be exceeded. However, computer-driven controllers such as the rotor controller 1504 (FIG. 1) of the present invention could easily burn out many rotor motors 1510 (FIG. 5) unless certain precautions are observed. Otherwise, frequent activation of the control unit 1513 could result in virtually uninterrupted energization of the rotor motor 1510 and consequent motor failure Although some motors 1510 contain a circuit breaker 1520 which protects the motor 1510 from burnout, the present invention incorporates a timeout feature to protect rotor motors which do not have built-in thermal cutoff devices. When the motor 1510 is energized, the rotor controller 1504 keeps track of elapsed on and off times, and automatically cuts off power to the motor 1510 when the duty cycle has been exceeded. Energization is resumed once the motor 1510 has been given sufficient time to cool down to a safe temperature.

The motor 1510 should be designed to operate reliably under conditions of typical outdoor use. Therefore, operation over a temperature range of −30° F. to +120° F. is desirable. A suitable antenna rotor motor assembly 1502 which may be used in conjunction with the present invention is described in a manual entitled "Model HDR-300 Heavy-Duty Rotator System, Order No. 300", published by Telex Communications, Inc., of Minneapolis, Minn., on Jan. 16, 1986, which disclosure is incorporated herein by reference.

Figure 6:
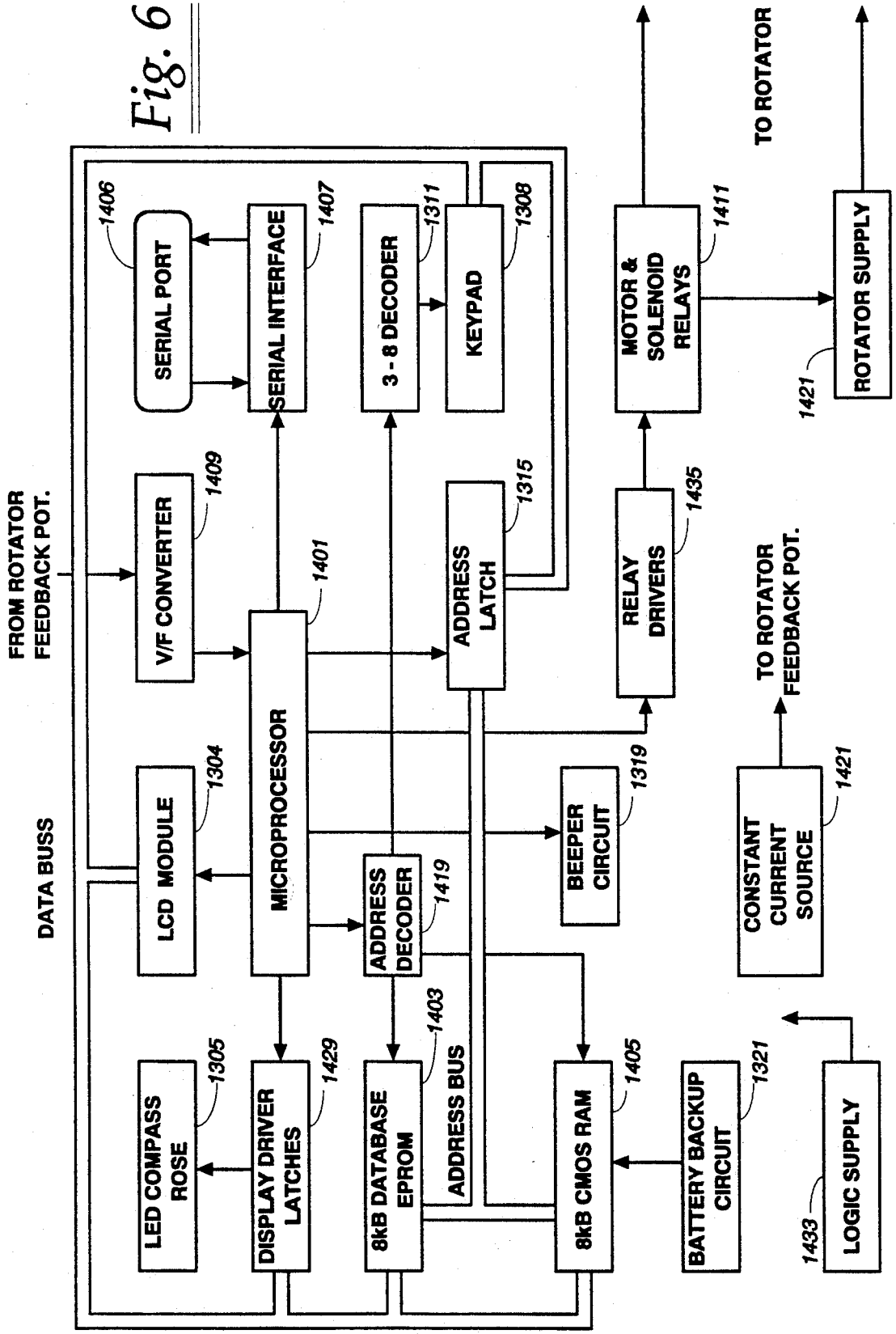
FIG. 6 is a system block diagram of the rotor controller shown in FIG. 1.
Figure 7A:
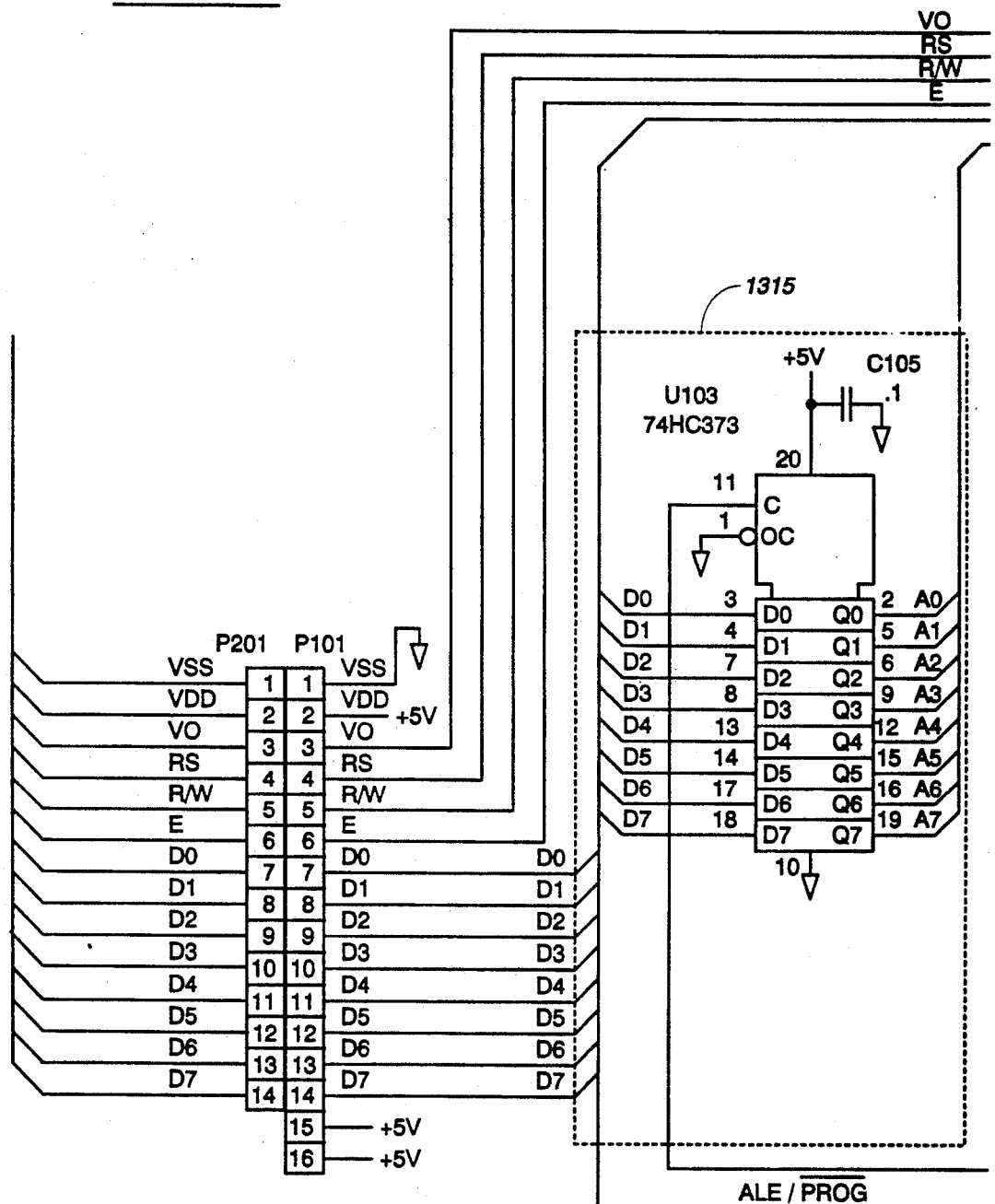
Figure 7B:
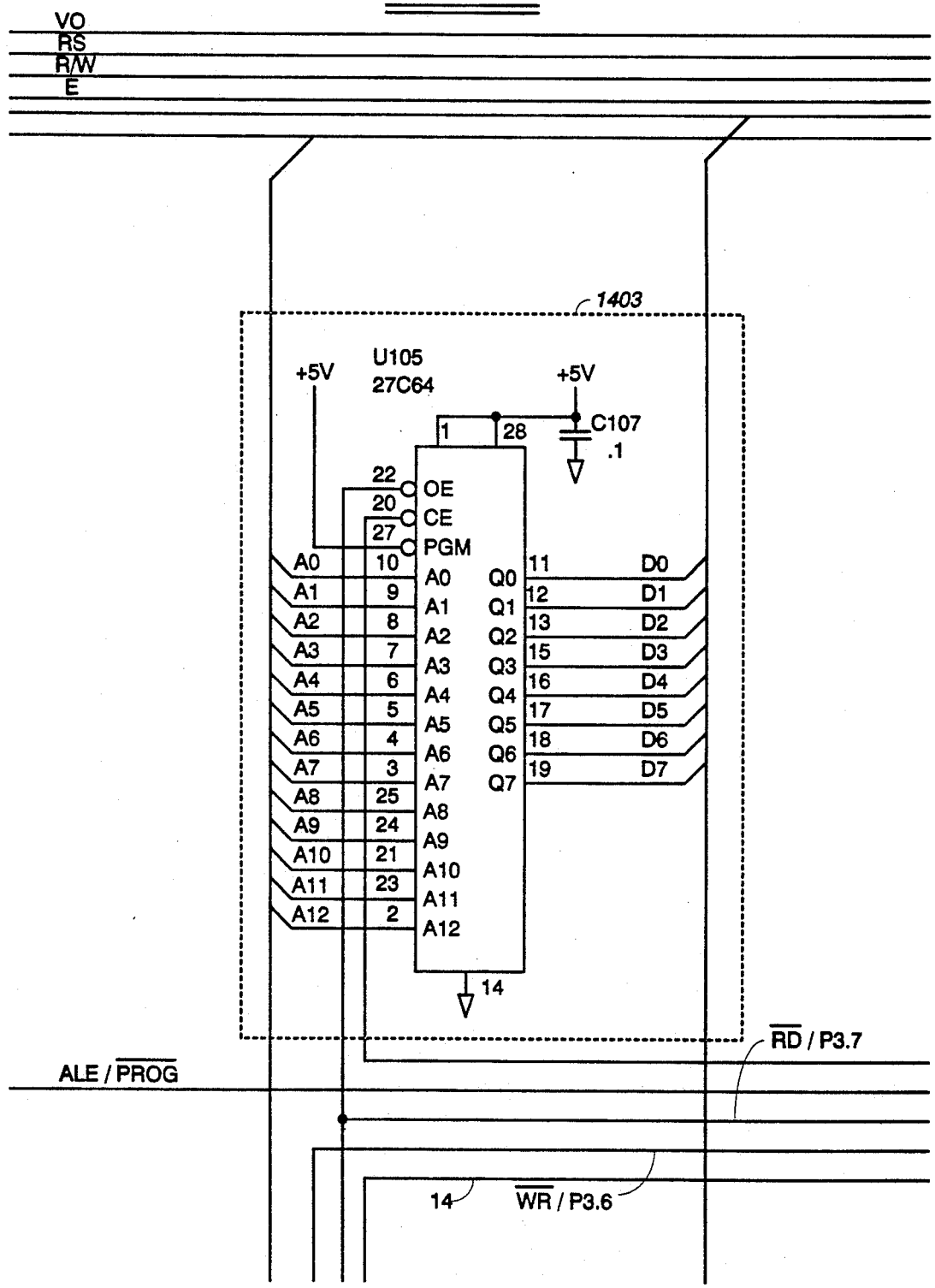

The hardware contained within the control unit 1513 and the power unit 1511 (FIG. 1) will be described in conjunction with FIGS. 6–10. FIG. 6 is a generalized block diagram of the electronic circuitry contained within the control unit 1513 and the power unit 1511. FIGS. 7–10 are detailed electronic schematic diagrams showing a preferred embodiment of the invention according to the block diagram of FIG. 6. As indicated in FIG. 6, the power unit 1511 and the control unit 1513 comprise rotor controller 1504. A microprocessor 1401 (FIGS. 6 and 7) implements many of the functions of the control unit 1513. The microprocessor 1401 may include an 8-bit, 40-pin integrated circuit U108 (FIG. 7) commonly designated as an 8052 chip. A read-only memory (ROM) program instructions and display prompts are contained in 8k of ROM internal to the microprocessor 1401. The external 8k ROM 1403 holds the database. An appropriate integrated circuit for ROM 1403 is an 8-bit EPROM chip U105 (FIG. 7b) designated by generic part number 27C64. In addition to the ROM 1403, an external RAM 1405 (FIG. 6) holds an editable copy of the database contained in the external ROM 1403. An appropriate integrated circuit for RAM 1405 is generic part number 6264, which is 28-pin integrated circuit U106 (FIG. 7a). Calculations are done using the scratchpad RAM contained within the microprocessor 1401.

The microprocessor 1401 (FIG. 6) decodes the input entered into a keyboard 1308 by means of a 3–8 encoder/decoder 1311 and an address decoder 1419. A suitable 3–8 encoder/decoder integrated circuit U104 (FIG. 7a) is generic part number 74HC138, and a suitable address decoder integrated circuit U107 is generic part number 74HC138. The address decoder 1419 (FIG. 6) decodes addresses according to the following memory map:

| ROM 1403 | 000–1FFFH |
|---|---|
| –RAM 1405 | 4000H–5FFFH |
| Keypad 1308 | 8000H–8007H |

The microprocessor 1401 also communicates with a serial port 1407 (FIG. 6), reads the voltage-to-frequency (V-F) converter 1409, sends information to the LCD display 1304 and the LED compass rose display 1305, moves data to and from the RAM 1405, moves data from the ROM 1403, and activates motor and solenoid relays 1411.

Figure 7C:
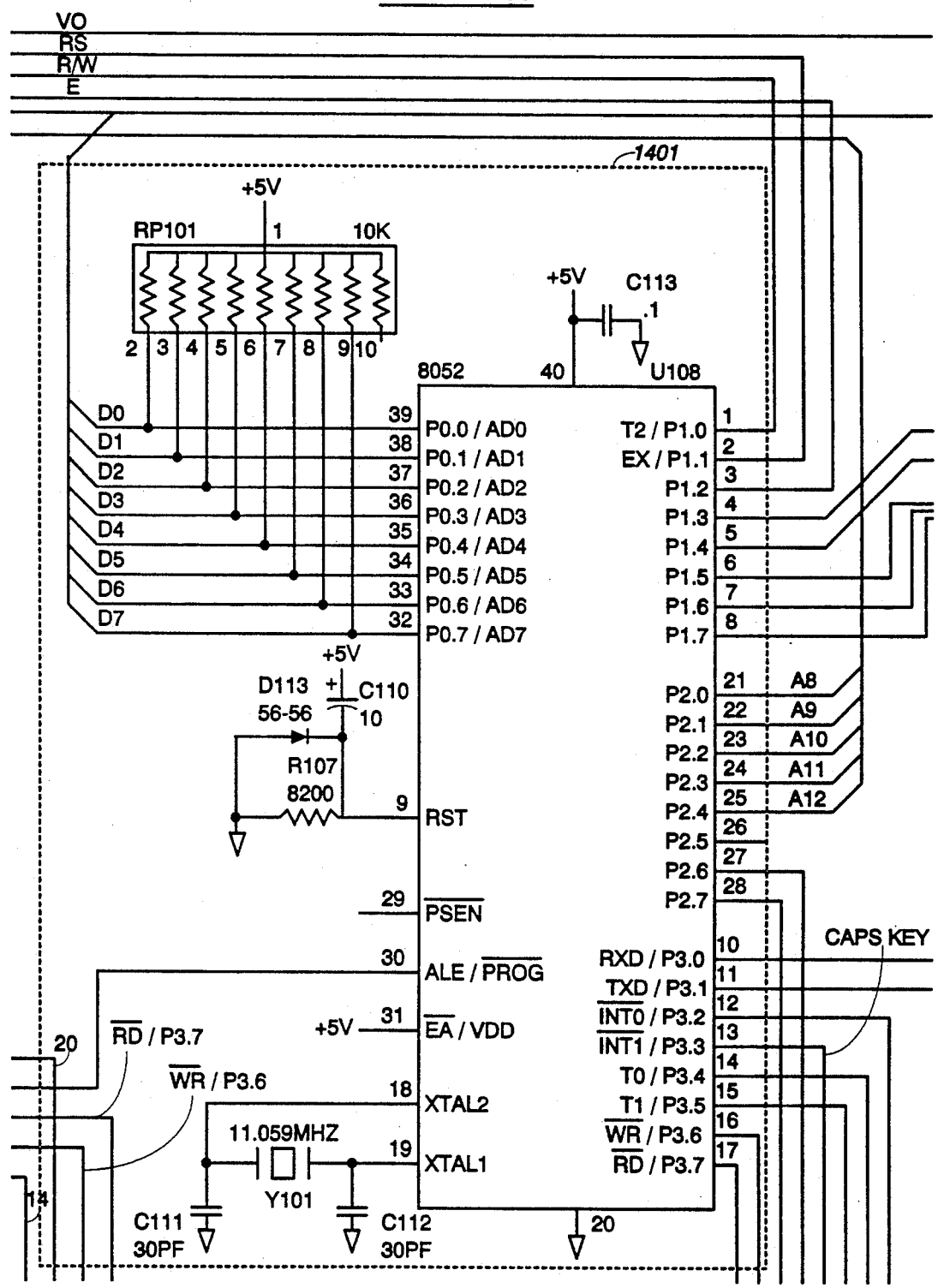
Figure 7D:
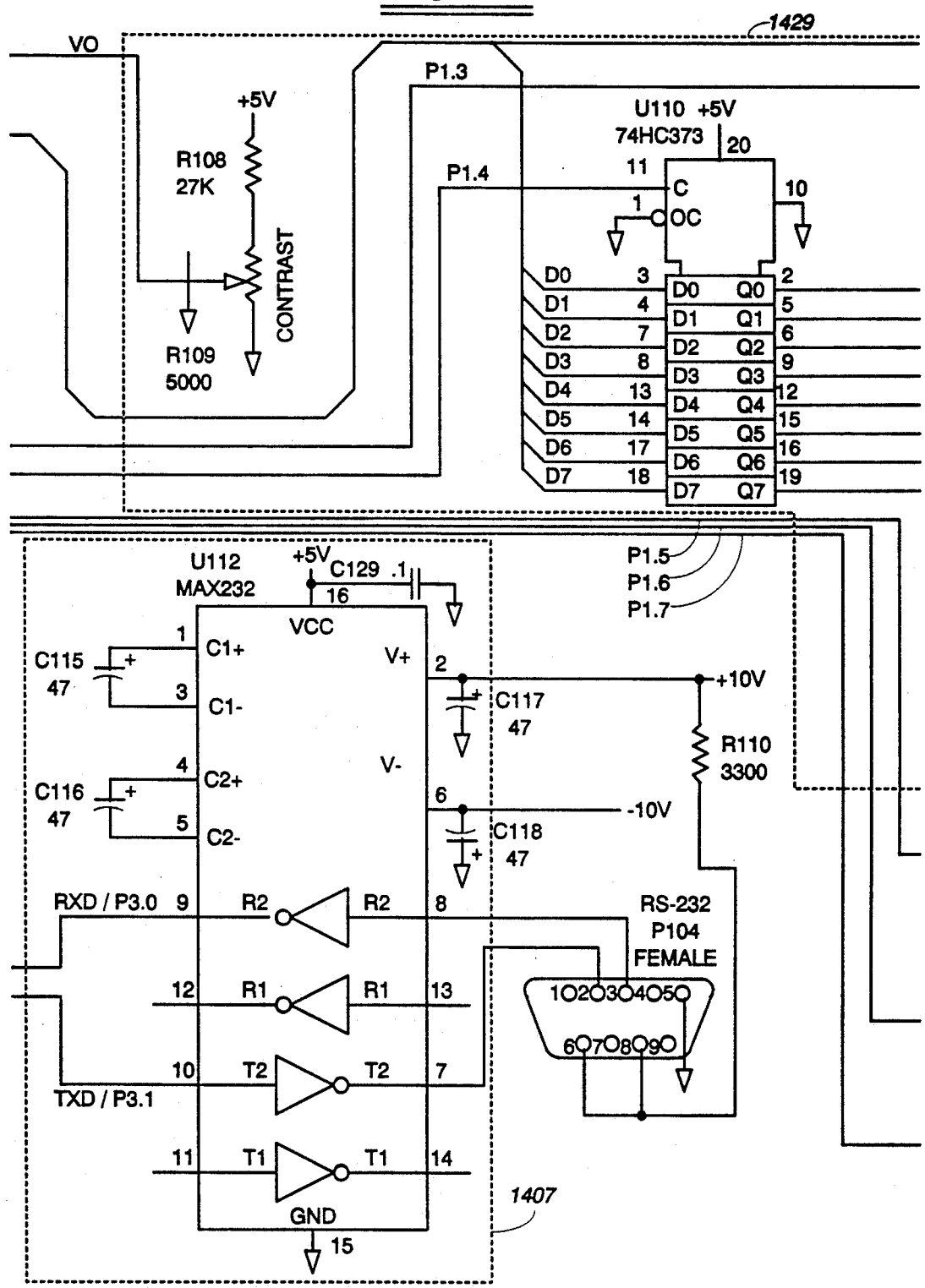
Figure 7E:
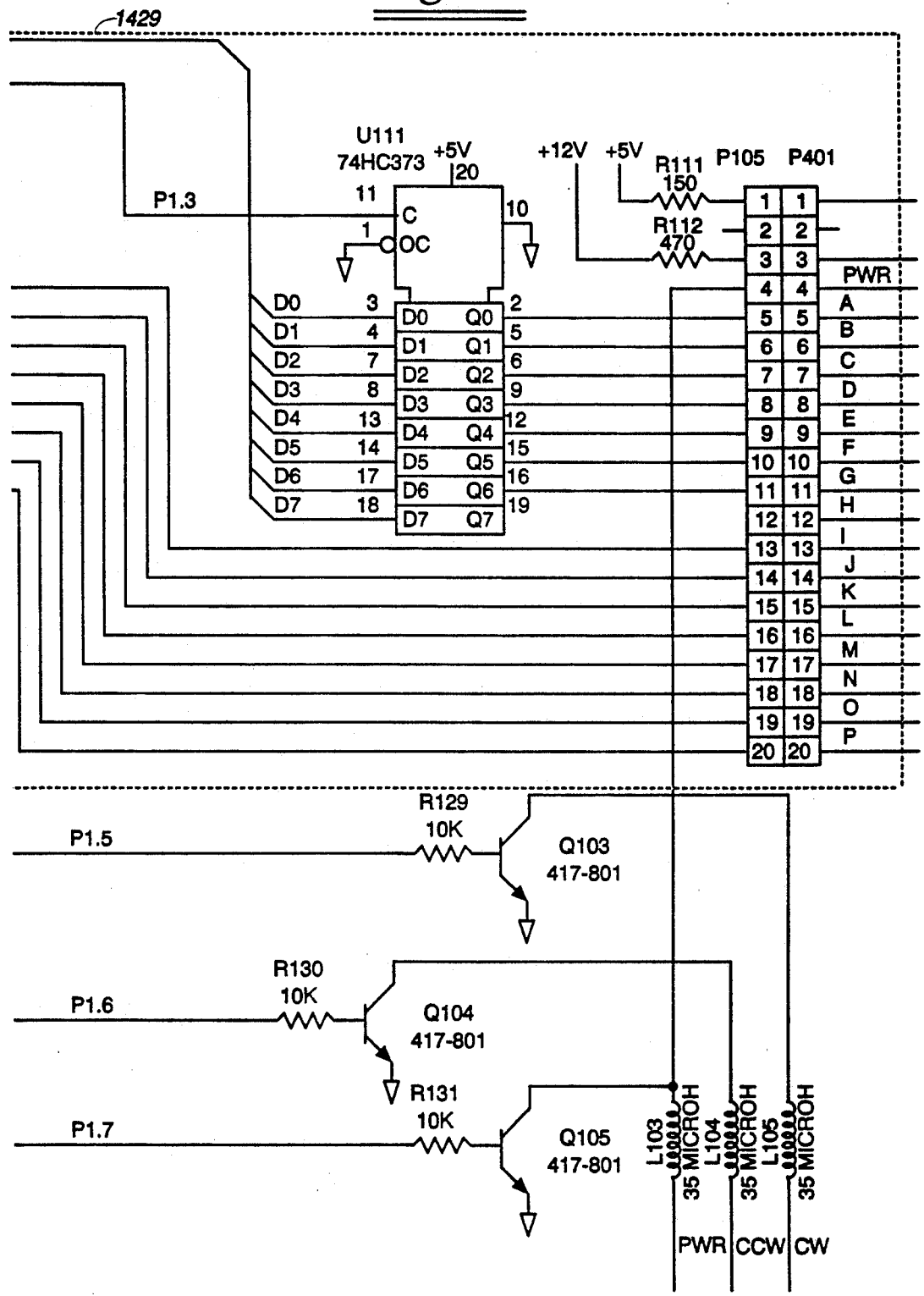
Figure 7F:
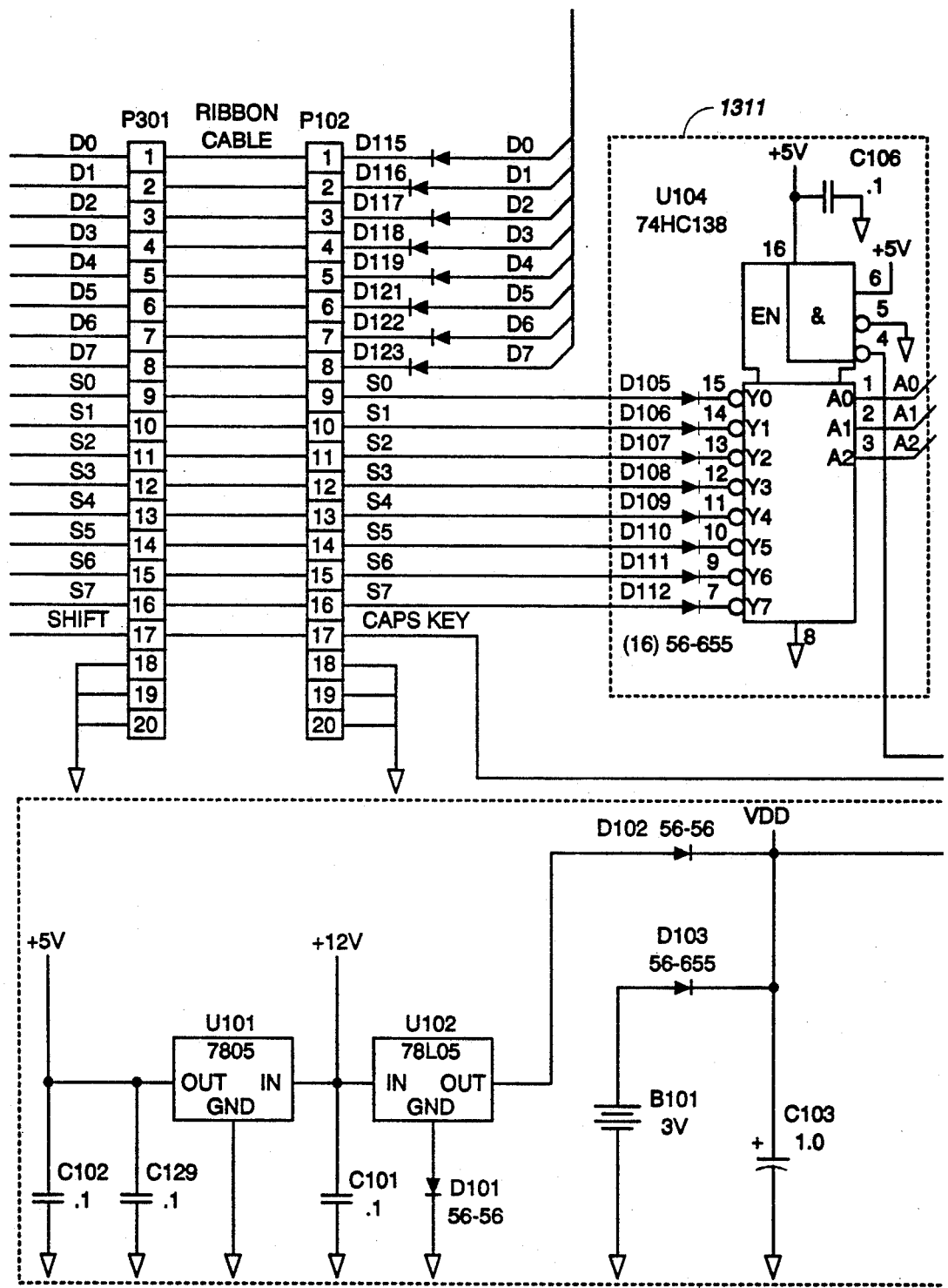
Figure 7G:
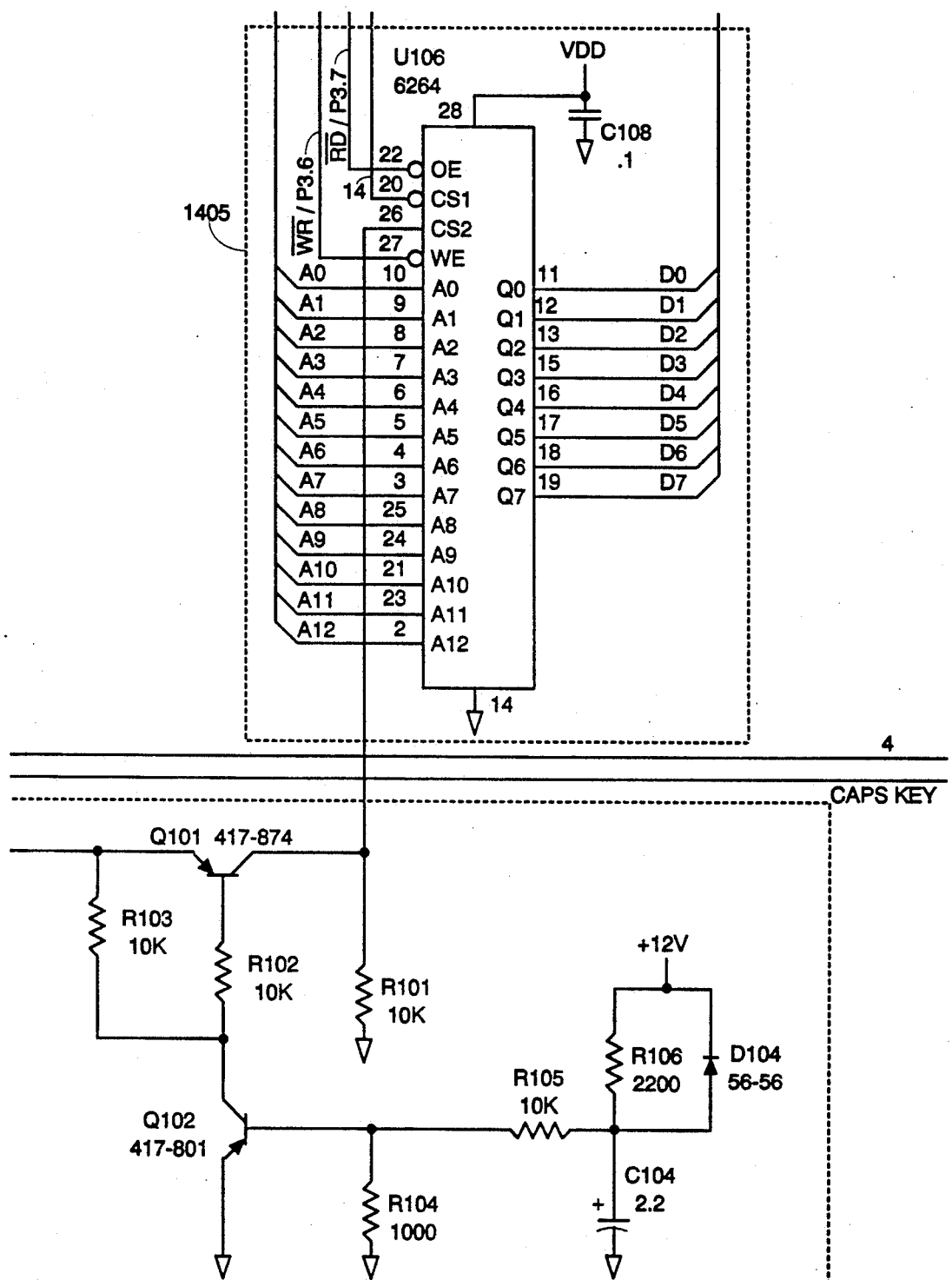
Figure 7H:
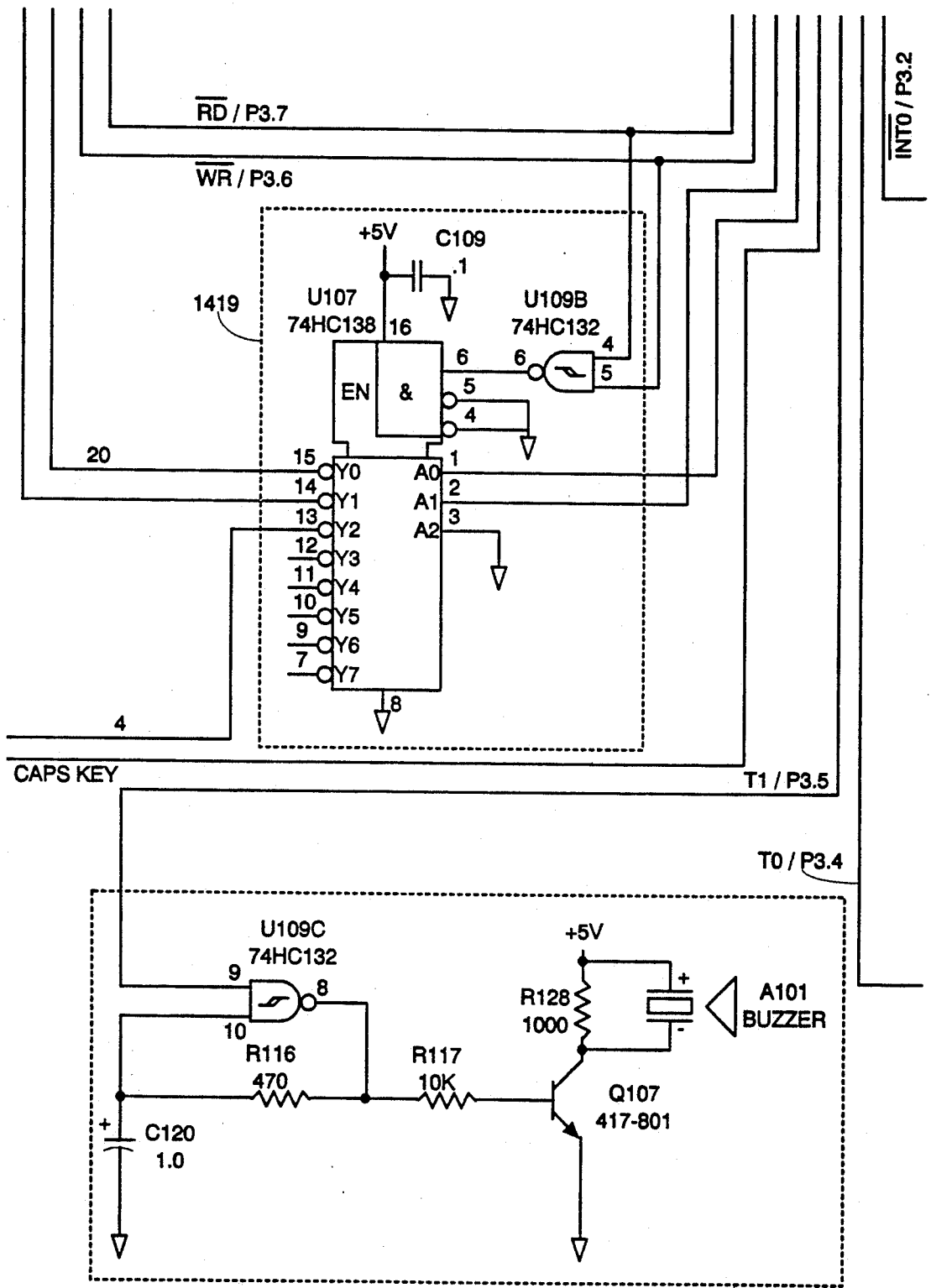
Figure 7J:
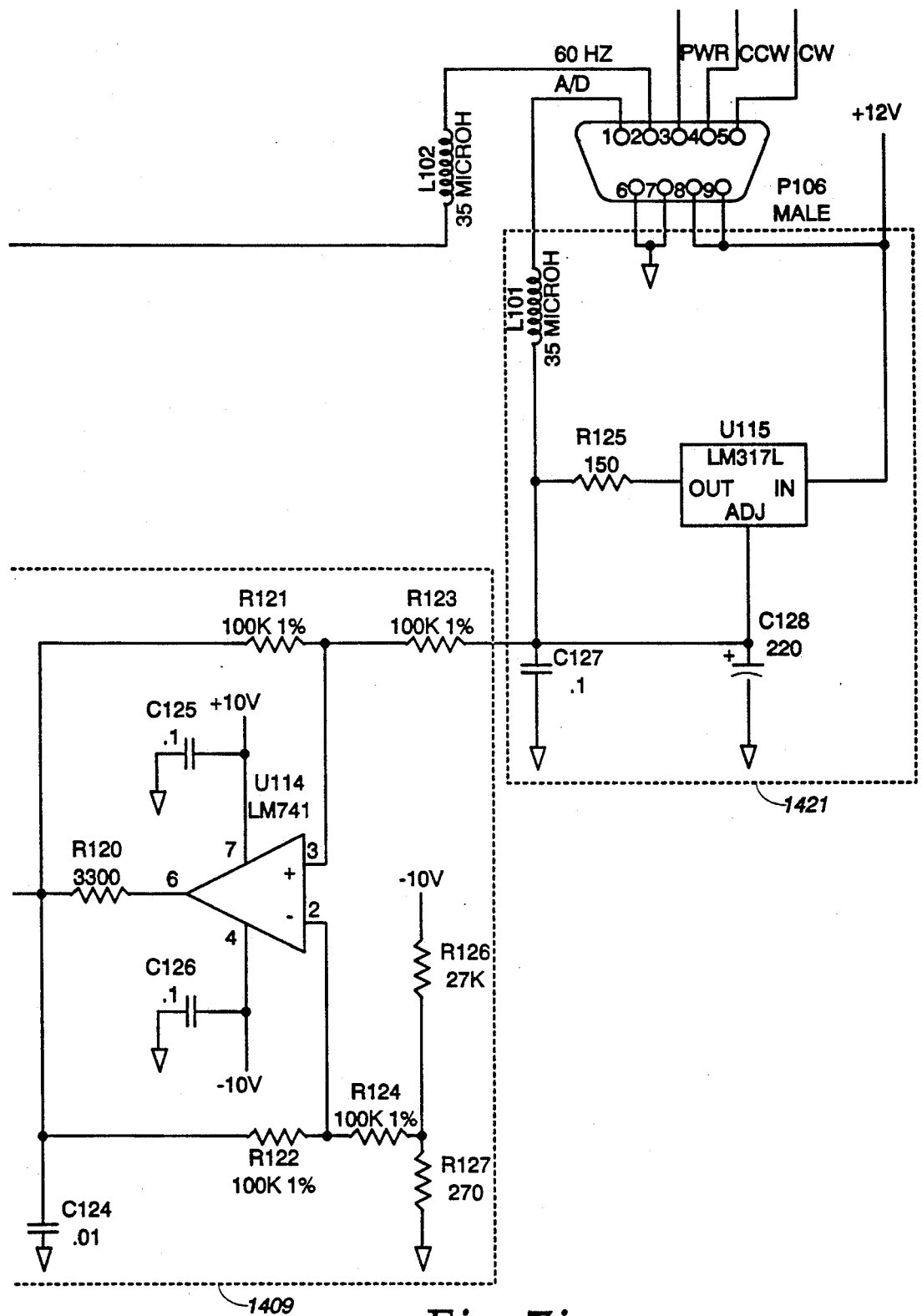

The microprocessor 1401 communicates with the aforementioned external devices by means of an address latch 1315. A suitable integrated circuit U103 (FIG. 7a) for the address latch 1315 is generic part number 74HC373. With reference to FIG. 7c, microprocessor integrated circuit U108 port P0 is used as a bidirectional data port, and supplies the low byte to an address bus when the microprocessor integrated circuit U108 needs to access external devices. The ALE output of microprocessor integrated circuit U108 latches the desired address into an address latch U103, while the high byte of the address appears at microprocessor integrated circuit U108 port P2.

A capacitor C110 and a resistor R107 reset the microprocessor integrated circuit U108 by causing U108 RST (reset) pin 9 to first go high briefly, and then low. A diode D113 allows the capacitor C110 to quickly discharge during a brief power loss to ensure a proper reset.

A transistor Q106 and an inverter U109D may be used to provide a 60 Hz square wave for the microprocessor integrated circuit U108. The 50/60 Hz signal is used to keep time. The microprocessor integrated circuit U108 divides this square wave signal into seconds, minutes, hours, etc., as required for the clock and calendar displays. Since this signal comes from the AC power source, the rotor controller 1504 (FIG. 1) does not contribute to any cumulative timekeeping errors.

A constant-current source 1421 (FIG. 6) is used to supply current to the azimuth-indication potentiometer 1522 located in the antenna rotor motor assembly 1502

(FIGS. 2 and 5). A voltage regulator integrated circuit U115 (FIG. 7j), generic part number LM317L, configured as a constant-current source, is capable of delivering approximately 10 milliamperes to the 500-ohm azimuth-indication potentiometer 1522. A voltage is produced which varies from near zero to approximately 5 volts, depending upon the current bearing.

The output of the azimuth-indication potentiometer 1522 is processed by a voltage-to-frequency (V-F) converter 1409 (FIG. 6). A suitable V-F converter may be fabricated by combining a timer integrated circuit U113 (FIG. 7j), with an operational amplifier circuit U114. The timer integrated circuit U113 may be a TLC555 chip, and the operational amplifier integrated circuit U114 may be an LM741 chip. The V-F converter 1409 (FIG. 6) converts the azimuth-indication potentiometer 1522 voltage to a frequency that may be counted by the microprocessor 1401 and translated into a bearing. Two resistors R122, R124 (FIG. 7j) should be used to bias the negative input of the operational amplifier integrated circuit U114 so that a minimum frequency (not zero Hz) corresponds to an input voltage of zero. This ensures linearity near the counterclockwise limit of rotation of azimuth-indication potentiometer 1522 (FIG. 5).

The output of the timer integrated circuit U113 (FIG. 7i) is a very narrow negative pulse that would be too narrow for the microprocessor integrated circuit U108 to recognize as an interrupt. A transistor Q108 and an inverter U109A stretch this pulse to a duration that can be recognized During the calibration routine to be described in conjunction with the software flowcharts, the microprocessor 1401 (FIG. 6) determines the slope and intercept of the straight line function that relates the bearing to frequency and stores these in RAM 1405, where these values are retained if power is lost The microprocessor 1401 contains a full-duplex serial port 1406. It is configured so that it uses an 11.059 MHz crystal time base Y101 (FIG. 7c) as a frequency reference and allows selection of any standard baud rate between 300 and 9600. An interface IC 1407 (FIG. 6) translates the TTL levels of the microprocessor 1401 to RS-232-compatible levels and vice versa. This device also uses internal charge pumps to provide the positive and negative voltages that are required by a standard RS-232 data line. These voltages are also used by the V-F converter 1408. A suitable integrated circuit U112 (FIG. 7d) for data buffer 1407 is generic part number MAX 232.

Figure 9A:
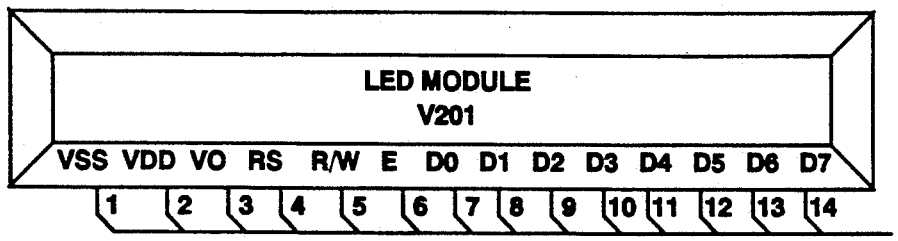
FIG. 9a is a pin-out diagram for the LCD display portion of the control unit illustrated in FIG. 3.

An LCD (liquid-crystal display) module 1304 may be used as a display means. An appropriate circuit V201 (FIG. 9a) for LCD display 1304 is Hitachi Part No. LM-032L. A pin-out of the LCD display 1304 is shown in FIG. 9a. The LCD circuit receives its commands and ASCII characters from microprocessor integrated circuit U108 (FIG. 7c) port P0, but separate pins on the microprocessor integrated circuit U108 are used to activate the LCD circuit V201 enable, read/write, and register select lines to accommodate the LCD circuit's slower timing requirements.

Figure 8:
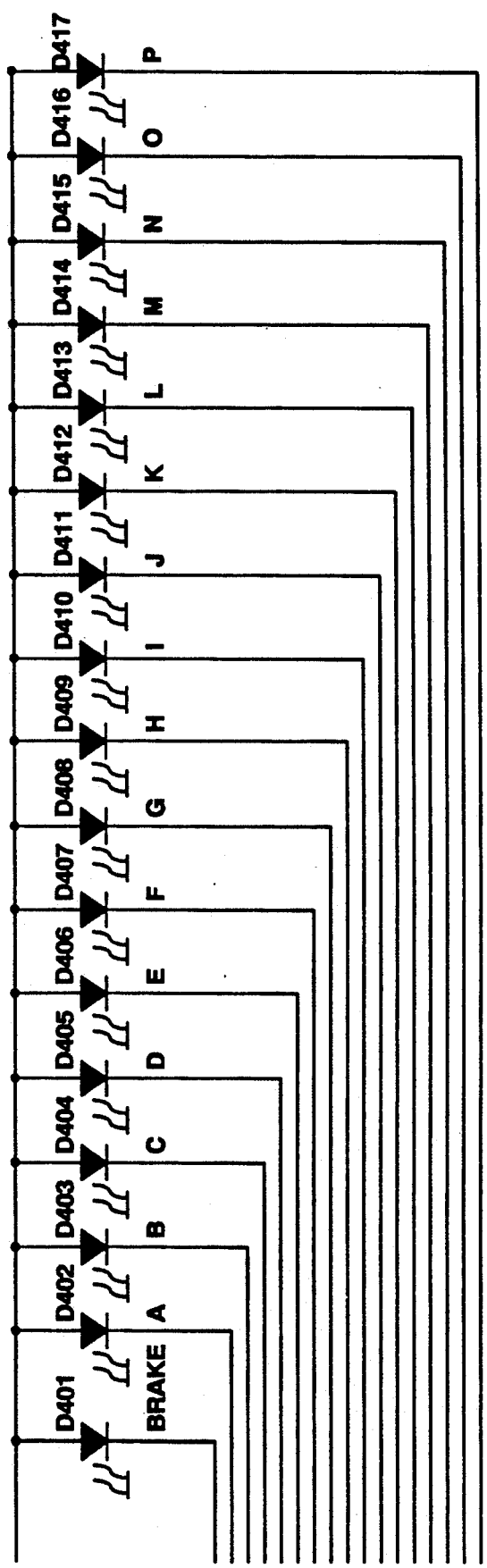
FIG. 8 is an electrical schematic diagram of the LED circuit board of the control unit shown in FIG. 1.

Appropriate levels are latched into LED display driver latches 1429 (FIG. 6) to light the LED compass rose display 1305 (FIG. 2). A suitable display driver latch 1429 may be fabricated from two display driver integrated circuits U110, U111 (FIGS. 7d and 7e) designated by generic port number 74HC373. FIG. 8 is a schematic diagram of the LED compass rose display 1305.

Figure 9B:
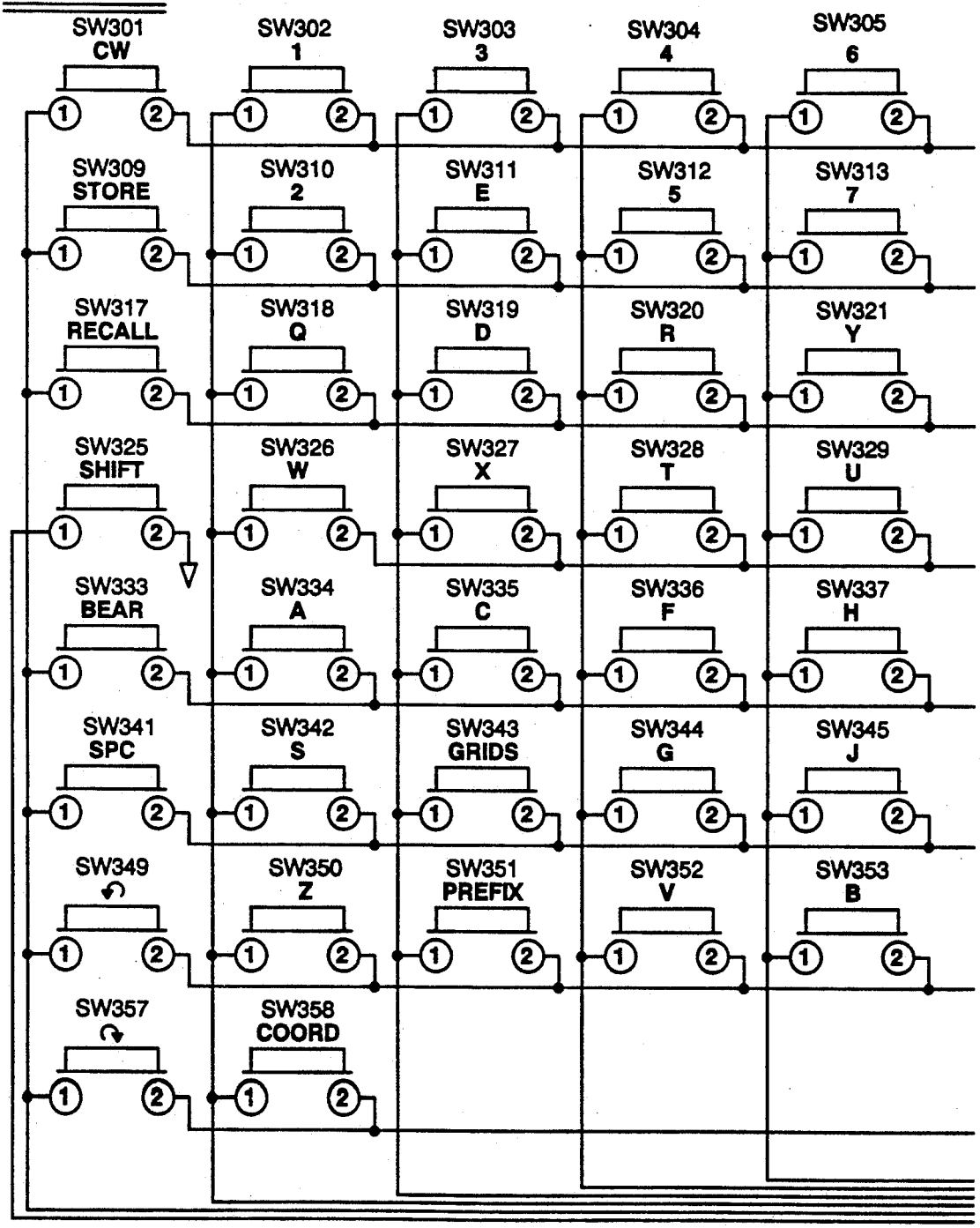
FIGS. 9b and 9c are schematic diagrams of the keyboard portion of the control unit illustrated in FIG. 3.
Figure 9C:
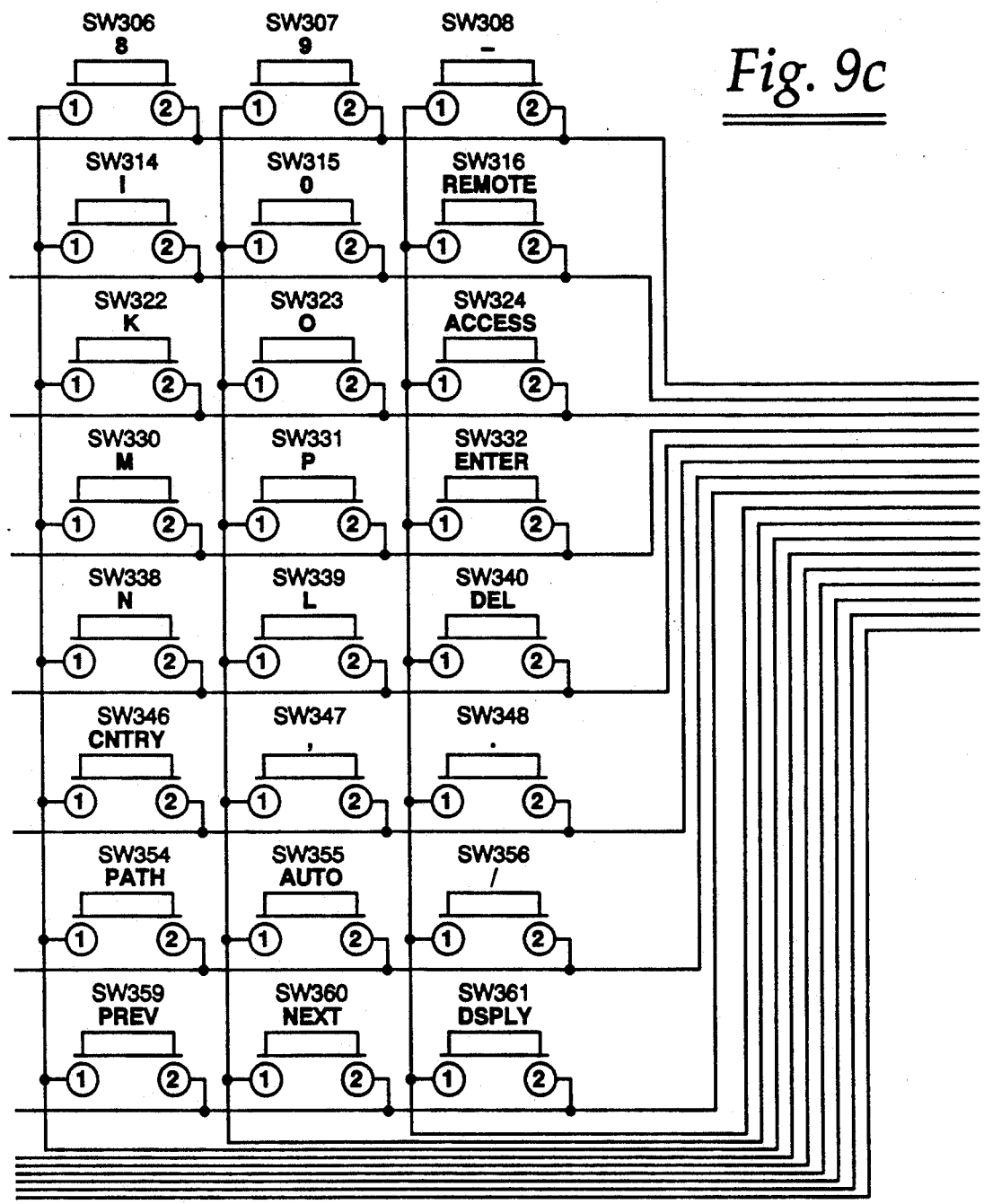

A schematic diagram of the keypad 1308 (FIG. 6) is shown in FIGS. 9b-9c. When the keypad 1308 is being addressed by microprocessor 1401, the microprocessor integrated circuit U108 (FIG. 7c) address lines A0, A1 and A2 are used to select, through 3-8 decoder circuit U104, the column that is to be read into microprocessor integrated circuit U108 data port P0. Any row in that column that has a key closure will result in a low level on the corresponding input Diodes D105 through D112 prevent logically different outputs of U104 from being shorted together in the event that two or more keys in the same row are pressed at the same time. Diodes D115 through D119 and D121 through D123 perform the same function for the data lines in case two or more keys in the same column are pressed at the same time.

The data that is contained in RAM 1405 (FIG. 6) includes the destination indicia database that was copied from ROM 1403 and possibly edited by the user. It also includes all setup selections except date and time. The battery backup circuit 1321 (FIGS. 6 and 7f) prevents this data from being lost during power outages. To protect the contents of the RAM integrated circuit U106 (FIG. 7g), its CS2 pin must swing to a low voltage level to deselect the integrated circuit before its supply voltage drops. After the RAM integrated circuit U106 has been deselected, $V_{DD}$ may fall to 2 volts without losing data.

When power is lost, capacitors C101 (FIG. 7f) and C501 (FIG. 10) begin to discharge, causing the 12-volt supply to fall. When the circuit is fully powered up, a transistor Q102 is turned on by the 12-volt supply through a voltage divider formed by resistors R104, R105 and R106. This keeps transistor Q101 turned on, which keeps the CS2 pin at $V_{DD}$. However, as the 12-volt supply falls, capacitors C104 (FIG. 7g) and C501 (FIG. 10c) discharge through D104. Before voltage regulators U101 and U102 can drop out of regulation, Q102 turns off, which turns off Q101 and allows resistor R101 to pull the RAM integrated circuit U106 CS2 pin low. A short time later, voltage regulators U101 and U102 drop out of regulation, D101 becomes forward biased and D102 becomes reverse-biased. At this point, the RAM integrated circuit U106 obtains its power from the battery. The RAM integrated circuit U106 requires very little current under these conditions.

When power is restored, $V_{DD}$ returns to +5 volts and the capacitor C104 begins to charge through the resistor R106. When $V_{DD}$ stabilizes, transistor Q102 turns on, which turns Q101 on and takes the RAM integrated circuit U106 CS2 pin high again. Diode D101 sets the ground terminal of voltage regulator U102 to a level that is one diode drop above circuit ground to compensate for the diode drop across D102.

The microprocessor 1401 drives a beeper circuit 1319 (FIG. 6). The beeper circuit 1319 may be constructed with a NAND gate U109C (FIG. 7h) and a transistor Q107. NAND gate U109C is connected as a gated stable multivibrator that, together with transistor Q107, drives a piezoelectric transducer A101. This circuit is used to annunciate the bearing in Morse code when the "CW" button is pressed, and to produce a beep when the target bearing is reached. If the keyclick feature is enabled, it also produces a click when a button is pressed.

Figure 10A:
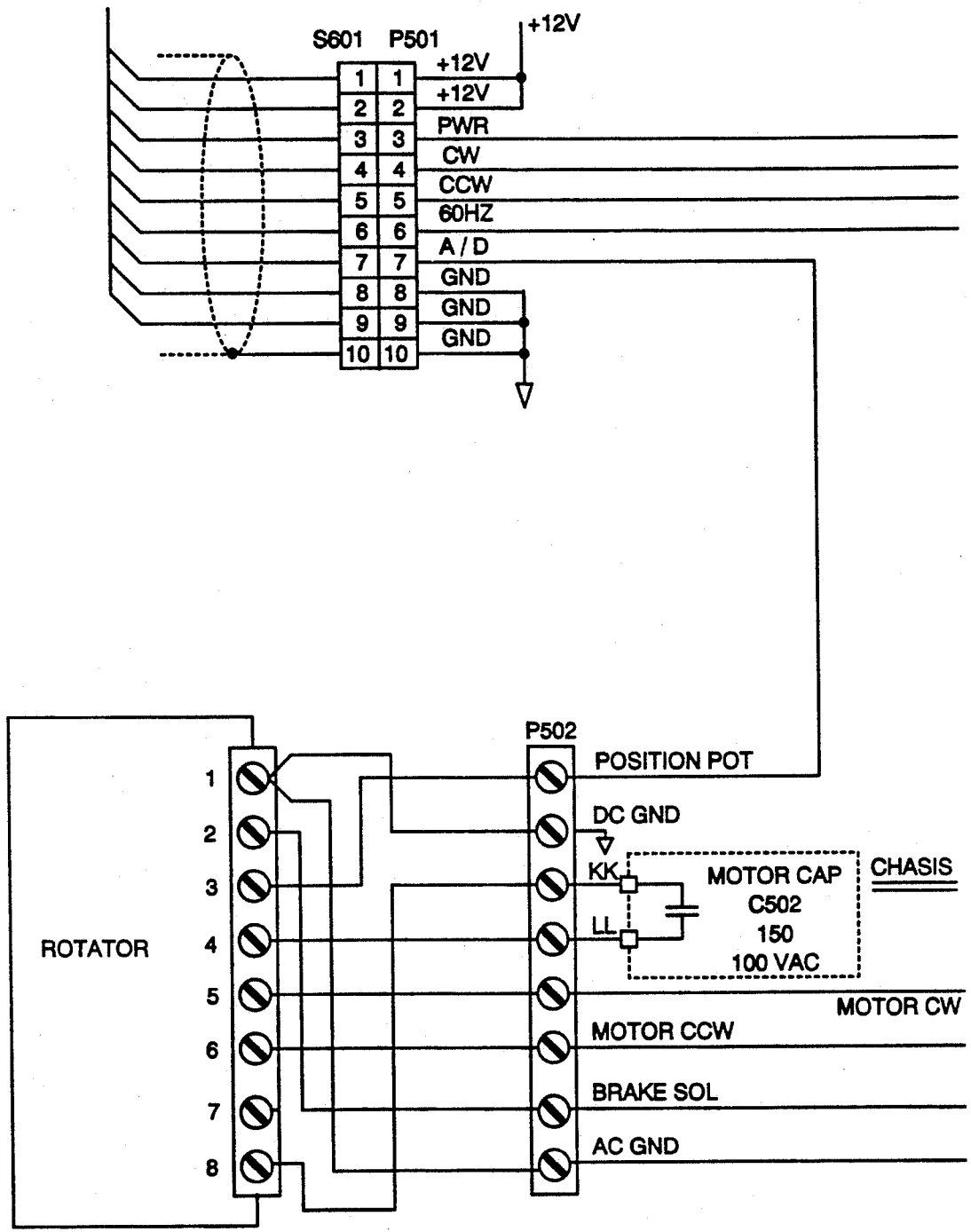
FIGS. 10a-10c represent an electrical schematic diagram of the power supply circuit board of the power unit shown in FIG. 1.
Figure 10B:
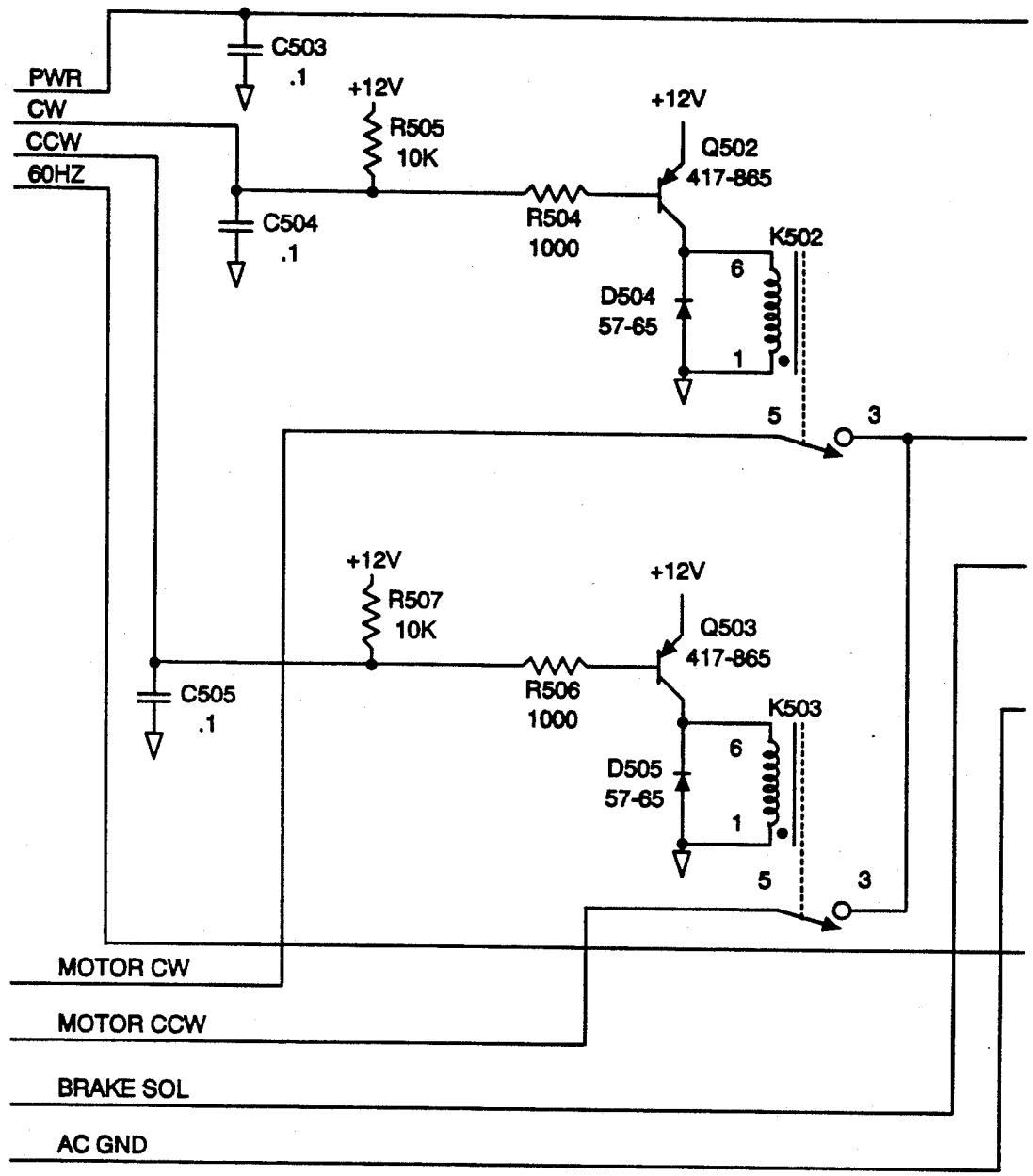
Figure 10C:
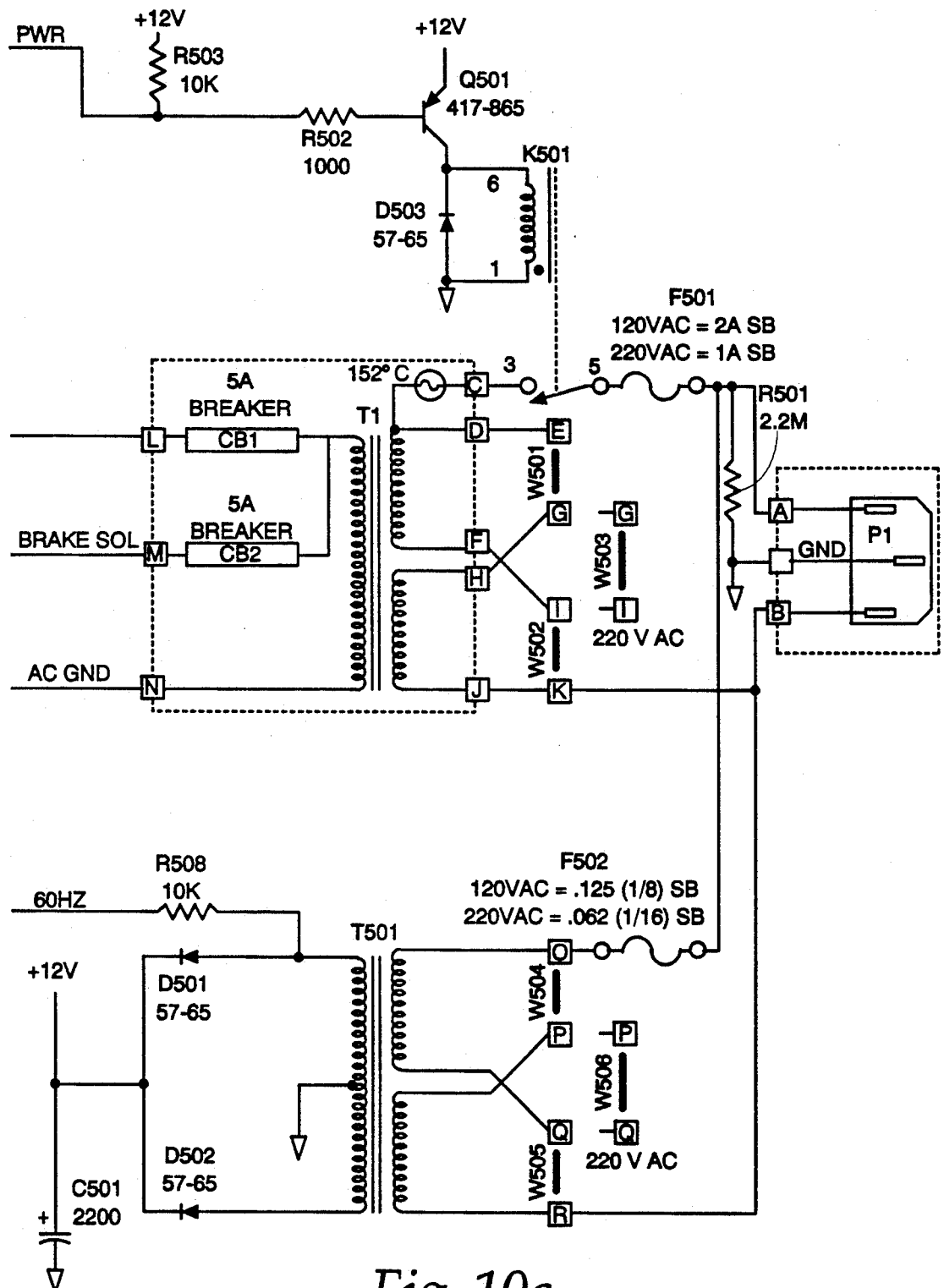

The rotor controller power unit 1511 (FIG. 1) contains the power supply circuit board shown in FIG. 10. The power supply circuit board includes a logic supply 1433 (FIG. 6). The rotor controller power unit 1511 uses two power transformers. A first transformer, logic transformer T501 (FIG. 10c), supplies power for the logic circuitry, while a second transformer, brake and motor transformer T1, supplies power for the brake/-clutch device 1518 and motor 1510. To reduce current drain when the antenna rotor motor 1510 (FIG. 2) is at rest, the brake and motor transformer $T_1$ is turned on only when needed.

The logic supply 1433 (FIG. 6) includes logic power transformer T501 (FIG. 10c). Logic power transformer T501 supplies power to a full-wave rectifier formed by diodes D501 and D502, which supplies a nominal +12-volts DC that is filtered by capacitor C501. One side of the secondary winding supplies the 50/60 Hz signal that is used for timekeeping. Transistor Q106 and gate U109D convert this signal to a TTL-compatible square wave.

A software routine prevents excessive heat buildup in the rotator itself. This also helps make sure that rotator power transformer T1 does not overheat. In addition to the software protection, the primary windings of the rotator and logic power transformers are individually fused. In the event the other protection devices should fail, a thermal fuse located inside the rotator power transformer (near its core) will open before the transformer could become dangerously hot. Circuit breakers CB1 and CB2 protect against excessive current in case a short circuit occurs in the antenna rotor motor assembly 1502 or the multiconductor control cable 1515.

Relay K501 switches power transformer T1 on to turn the rotator. Microprocessor integrated circuit U108 (FIG. 7c) turns on a relay driver 1435 (FIG. 6), for example, transistor Q501 (FIG. 10c), which causes the relay K501 to energize. Diode D503 protects Q501 from the reverse EMF produced by the relay coil when it de-energizes. Relays K502 and K503 cause the motor to turn clockwise or counterclockwise, respectively. Their associated components operate in a similar manner as their counterparts in the K501 circuit described above.

FIG. 11 is a flowchart of the main program loop executed by the microprocessor 1401 (FIG. 6). The loop begins at block 101 where the subroutine DSPBRG is called. DSPBRG updates the bearing displayed on the LCD display 1304 and the compass rose display 1305 (FIG. 3b). Next, block 103 calls the subroutine DSPTIM to update the time and date displayed by the LCD display 1304. Block 105 performs a test to determine whether or not the ROTCW or ROTCCW keys 1386, 1388 (FIG. 3b) have been pressed. If so, the subroutine MANUAL is called at block 107 to rotate the antenna array 1508 manually, and the program loops back to block 101. If the outcome of the test at block 105 is negative, program control shifts to block 109 where a test is conducted to ascertain whether or not a key on the keypad 1308 has been pressed or a character has been received via the serial port 1406. If not, the program loops back to block 101. However, if a key was pressed or if a character was received, the program advances to block 111 where a test determines whether or not the remote mode has been enabled An affirmative branch from block 111 leads to block 115, while a negative branch from block 111 leads to block 113.

Block 115 tests to distinguish received characters from key presses. If there was a key press, the program progresses to block 127 to exit from remote mode and the program then loops back to block 113. If a character was received, control advances to block 119 to see whether or not the character is a carriage return. If not, block 121 appends the character to the command and program control loops back to block 101. If the character is a carriage return, block 123 tests to ascertain whether or not a valid command was issued. If so, the program jumps ahead to block 117 to call the appropriate service routine and then loops back to block 101. If the command checked at block 123 is not valid, the program returns a "?" character followed by a carriage return and a line feed at block 125, and program control loops back to block 101. An affirmative branch from block 113 leads to block 129, where the subroutine SETPAR is executed to establish new auto-rotate parameters.

Execution of the main program loop of FIG. 11 provides the operator with a user-friendly antenna rotor motor assembly 1502 interface. A general overview of the features provided by the main program of FIG. 11 will be discussed, followed by a more detailed discussion of specific subroutines in conjunction with FIGS. 12–20.

The ROTCW and ROTCCW keys 1386, 1388 are momentary functions If the braking device 1518 (FIG. 5) is engaged (yellow brake solenoid 1393 (FIG. 3b) LED off) when one of these buttons is pressed, the following sequence occurs: the braking device 1518 is released (yellow brake solenoid 1393 LED lights). After a very brief pause, the antenna rotor motor 1510 begins rotating in the direction opposite to that selected for 0.1 second. This ensures that the braking device 1518 has been released in the event that wind loading may have been holding it engaged. After another short pause, the antenna rotor motor 1510 begins moving in the proper direction.

If the braking device 1518 was already released, normal rotation begins immediately.

Several seconds after the motor 1510 stops, the braking device 1518 will engage. This delay may be specified by the user as described earlier in the section on system setup.

In addition to manual antenna rotation, any one of the following parameters may be entered into the controller to automatically rotate the antenna to a desired bearing a named bearing, a bearing in specified degrees, geographic coordinates in latitude and longitude, grid square, country name or amateur radio prefix. However, the rotator will not turn automatically when the AUTO key 1384 is pressed unless the rotor controller 1504 has been calibrated. These functions are described in detail below. Any of the above entries may be made in lower case, even though prefixes are always stored and displayed in upper case. Country names may be a combination of lower case and upper case letters The sequence described under manual rotation is followed if the brake is engaged when the AUTO key 1384 is pressed or if rotation is requested under remote control. When the antenna rotor motor 1508 is within 12 degrees of its target bearing, the motor 1510 is pulsed to slow it down. This default setting may be changed, as described with reference to the discussion below on altering the AUTO mode parameters Motor pulsing avoids overshooting the desired bearing and reduces the chance of running into the stops if the target is near a mechanical limit of the motor 1510. Following each pulse, the antenna array 1508 position is monitored to ensure that the antenna array 1508 has stopped moving before its resting position is compared with the target bearing In gusty winds, the antenna array 1508 may not come to a stop until the brake delay times out. When the desired bearing is reached within 2 degrees, or if the process has been attempted several times unsuccessfully, rotation is stopped, and a half-second beep indicates that the antenna array 1508 has reached its target, as accurately as wind conditions permit. This default setting of 2 degrees may be changed, as described hereinafter with reference to altering the AUTO mode parameters. When the braking device 1518 engages, the LED 1393 goes out, and the LCD display 1304 and the compass rose display 1305 are both frozen to prevent the possibility of a distracting flicker.

Once the operator has made a selection, for example, typed in a country name, pressing the ENTER key 1360 will update the information in the various windows, but will not turn the rotor motor 1510. This allows the operator to use the rotor controller 1504 to simply determine information on the target or to prepare for subsequent rotation. Pressing the AUTO key 1384 will then rotate to the appropriate heading as displayed in window 2. Alternatively, the AUTO key 1384 may be pressed instead of the ENTER key 1360 to begin rotating immediately after making a selection. If the operator knows in advance that the long path bearing is required, the ENTER key 1360 must be pressed, followed by the PATH key 1382 or the AUTO key 1384. When the antenna array 1508 is rotating under automatic control, the operator may hit any key to stop rotation prematurely. The key that is pressed will perform its usual function, if any. Pressing the AUTO key 1384 again will continue rotation to the target bearing.

As described in the section on automatic rotation, the rotor controller 1504 normally begins to pulse the motor 1510 when it is within 12 degrees of its destination and attempts to stop within 2 degrees of the desired bearing. These values were chosen as appropriate defaults for the average antenna array 1508 and antenna rotor motor assembly 1502 combination. If the operator has a small antenna array, and/or a husky rotor motor assembly, it may be more appropriate for the rotor controller 1504 to start pulsing at an angle closer than 12 degrees and stop within 1 degree of its target, resulting in slightly faster operation and better accuracy. On the other hand, a large array 1508 may tend to coast further after stopping, requiring that the pulsed mode begin earlier, and it may be more difficult to achieve the desired plus or minus 2-degree accuracy To accommodate a wide range of rotator/antenna arrangements, the rotor controller 1504 provides the option of choosing from among the combinations of values listed below. To make the selection, the SHIFT key is held down while pressing the appropriate digit key (0-9). Aside from the key-click (if enabled), there will be no indication that a new setting has been entered, but the new setting will be saved in the battery-backed RAM 1405.

| Digit Key | Degrees From Target Before Pulsing Begins | Attempted Accuracy (Deg) |
|---|---|---|
| 0 | 8 | 1 |
| 1 | 8 | 2 |
| 2 | 8 | 3 |
| 3 | 12 | 1 |
| 4 | 12 | 2 default |
| 5 | 12 | 3 |
| 6 | 16 | 1 |
| 7 | 16 | 2 |
| 8 | 16 | 3 |
| 9 | 20 | 4 |

The operator may experiment to find the setting that works best for his specific situation In general, the operator should choose a number from the second column that is greater than the "coasting range" of his antenna array 1508.

To recall a stored bearing, the RECALL key 1358 is pressed The display will prompt with "Position (0-9 or -)?". Selection is the same as for the storing, with the names of any stored bearings appearing as the digit keys are pressed. The ENTER key 1360 is pressed when the desired reference name is seen. Alternatively, "-" may be pressed to abort the function The bearing and name of the selection will be copied into the second display window. Pressing the AUTO key 1384 will then rotate to that bearing, or the operator may wish to press the AUTO key 1384 immediately after making the selection to start beam antenna rotation as soon as possible.

To select a bearing in degrees, the BEAR'G key 1370 is pressed. The display will prompt with "Bearing (0-359)?". The bearing is entered and the ENTER key 1360 or the AUTO key 1384 is then pressed. Rotation by latitude/longitude or grid square is similar, except that either the COORD or the GRID S key (1372, 1374 respectively) is pressed instead of the BEAR'G key 1370.

If the CNTRY key 1378 is pressed, the display prompts with "Country?". The operator need only enter enough characters to make the entry unique, such as "azo" for Azores Island. Then the ENTER key 1360 is pressed. The first country name located in the database that matches the entered name alphabetically will appear in the bottom line. The top line prompts with "PRV,NXT,ENTER,AUTO?". The PREV and NXT keys 1380 step alphabetically through the list. Once the desired country is displayed, either the ENTER key 1360 or the AUTO key 1384 are pressed. Although this function is mainly intended for selection of countries, the fifty U.S. states are also contained in the database but without prefixes If the PREFIX key 1376 is pressed, the display prompts with "Prefix?". The prefix or partial prefix is entered and the ENTER key 1360 is pressed. The first matching prefix or prefix range will appear in the bottom line, followed by the country name, or as much of the country name as will fit. "NXT, ENTER or AUTO?" will appear in the top line If the prefix entered is part of a list containing more than one part, only the part that matched the entry will be shown at this time. Once the ENTER key 1360 or the AUTO key 1384 is pressed, window three will display the complete list. If the country is not the desired one, the NXT key 1380 is pressed, and the next country name matching the prefix entry will appear.

When a prefix is entered, the rotor controller 1504 first makes an explicit search for it. If an entry isn't found that matches the entry exactly, a second, implicit pass is made. The result is that the operator may enter from just the first character of the prefix to the full callsign, and a match can be found. Of course, the operator may need to use the NXT key 1380 if he/she enters less than the full prefix.

The controller defaults to selecting the short path bearing If the long path bearing is desired, the PATH key 1382 is pressed after the short path bearing has been determined by any of the means described above. Then the AUTO key 1384 is pressed. The target bearing may be identified as long path by the degree symbol appearing in a lowered position Pressing the PATH key 1382 again reverts to short path. The operator must press the AUTO key 1384 again to return the antenna to the short path bearing. The distance and bearing displays are updated when the PATH key 1382 is pressed.

The key that is marked with the letters "CW" 1350 is pressed in order to have the current bearing sent in audible Morse code on the internal transducer. The speed is fixed at 20 wpm. This key only functions when the antenna rotor motor assembly 1502 is at rest. The LCD display 1304 time readout, if selected, does not update during the time the code is sent.

Pressing the REMOTE key 1352 allows access through the RS-232 serial port 1406 (FIG. 3b). Current date, time and bearing are available, and a new bearing may be selected. The protocol is as follows:

D<CR> Returns the date, followed by a CRLF.
T<CR> Returns the time (in the selected format), followed by CRLF.
B<CR> Returns the current bearing in degrees, followed by CRLF.
nnn<CR> Selects a new bearing. Leading zeroes need not be entered. When the rotator reaches the requested bearing, CRLF is sent.

If any character is received at the serial port during auto rotation using the above command, rotation will stop.

As soon as Remote mode is entered, a CRLF is sent to the serial port. Any unrecognized or invalid commands will return a "?", followed by a CRLF. If the controller has not been calibrated, trying to set or read the bearing will also cause this response. Leading zeroes in the date, time and bearing are included to force right-justification; otherwise the format is the same as on the display.

Pressing any controller key other than the REMOTE key 1352 disables the serial port 1406 (FIG. 3b) and returns to manual operation (The key will perform its normal operation, if any.) When in Remote mode, "(Remote)" appears in the normal display window.

ROM integrated circuit U105 contains the destination indicia database, including the country and state data—names, prefixes, latitudes and longitudes, and time zone information. When the rotor controller 1504 is initialized, and whenever the diagnostics are being performed, this data is copied into RAM integrated circuit U106. Once entered into the RAM integrated circuit U106, the data may be modified by adding and/or deleting countries. The RAM integrated circuit U106 also holds any named bearings saved with the STORE function, as well as the settings the operator selected in the setup mode Selecting the Edit menu after pressing the ACCESS key 1356 permits the operator to add or remove a country from the database in RAM 1405. If a country is added, it will be placed in alphabetical order in the list. Depending upon the length of the country name and prefix list, there is room for several hundred new countries. In the unlikely event that insufficient room remains for the new entry, the message "No room—press ENTER" will appear.

If it is desired to change an existing country entry, for example, the spelling, prefix list, time zone or coordinates, the country must first be removed from the list using the Remove function from the Edit menu. Then the country must be added back using the Add function, entering the new data as desired. The Remove function permits the operator to choose the country in a similar fashion as is done with CNTRY key. If the operator changes his mind about removing a country once a country has already been selected, any key other than the PREV, NXT, ENTER or AUTO keys offered in the top line must be pressed. The AUTO key 1384 serves the same purpose as the ENTER key 1360 in this function.

When the operator enters a new country name, he/she may use a combination of upper and lower case characters for better readability, since the searches are case-insensitive. When the operator enters prefixes, they may be entered in either case, but will be stored in upper case. A prefix list may be a single prefix or it may be a combination of separate prefixes and prefix ranges. Prefix ranges use a "-". Prefixes and ranges must be separated by commas. For example, "B,A,CD1-CD5,E" would be a valid prefix list. It is not necessary to enter a prefix list. If the ENTER key 1360 is pressed when the controller prompts for a prefix, that field will be left blank. In that case, the operator will only be able to select that country using the CNTRY key 1378.

Any countries added to the database will be flagged such that when listed with the List function from the Misc menu, they will be preceded with an "*", indicating a change from the ROM 1403 data.

If at some point the operator has made a number of changes to the country data and desires to make the changes permanent, this may be accomplished by means of the "Dump" function offered in the Misc menu. However, the operator must have access to an EPROM programmer in order to implement this function The "Dump" function performs an Intel Hex dump of all the data in RAM 1405, and is used to program a new EPROM for use as ROM 1403 if it is desired to make all of the destination indicia database entries permanent. The dump removes the "user-added" flag from any entries that have been incorporated by the radio operator, so that the List function only prints an "*" in front of countries differing from those in the reprogrammed EPROM.

The new EPROM will also contain any named bearing information saved with the STORE function, as well as the Setup data—the operator's latitude and longitude, preferred clock format, etc. Of course, these parameters may still be changed with the setup function.

If the operator wishes to start "from scratch" by copying the EPROM database to RAM 1405, the Init function in the Misc menu (to be discussed with reference to FIGS. 13a and 13b) may be used. The operator will be asked if he/she is sure in order to avoid accidental loss of any changes he/she has made. Pressing any key other than "Y" will abort this function.

Choosing the List function from the Misc menu sends the contents of the database to the serial port in a format that may be displayed on a computer terminal or printer. The country names are in alphabetical order, and each name is followed by its prefix list, latitude and longitude, grid square, distance, bearing, and time offset from UTC. If the operator wishes to abort the listing prematurely, he/she can press any key. The list will stop as soon as it finishes displaying the current line.

Figure 12A:
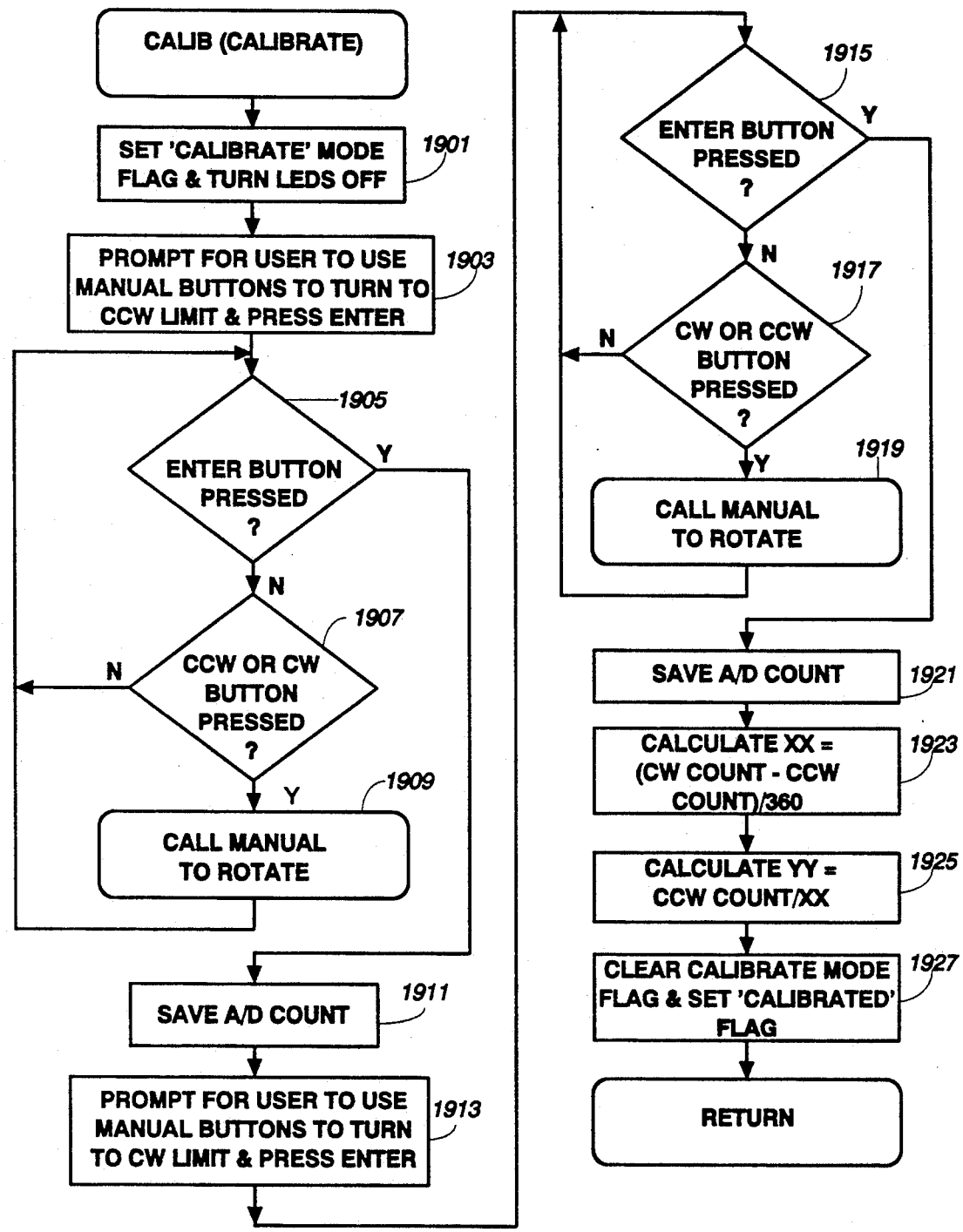
FIGS. 12a-12b represent a software flowchart illustrating the subroutine CALIB which calibrates the system shown in FIG. 1 and the subroutine INFO which converts data from a table stored in memory into an ASCII string for subsequent display.
Figure 12B:
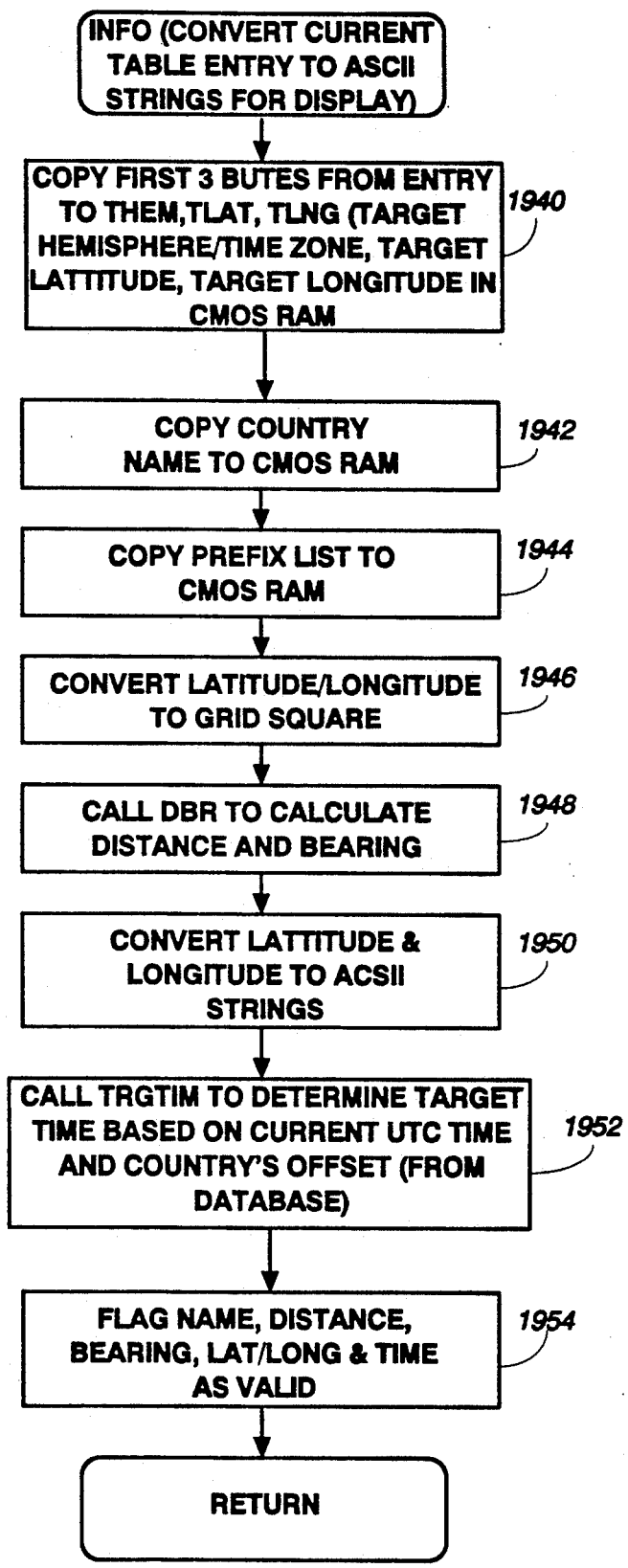

FIGS. 12a and 12b are flowcharts of subroutines CALIS and INFO. CALIB implements the calibration procedure for the antenna rotor motor assembly 1502 (FIG. 1). Block 1901 sets a calibrate mode flag and turns the LED compass rose display 1305 (FIG. 6) off. Block 1903 prompts the user to use the manual buttons to turn the antenna array 1508 to the counterclockwise limit of rotation and to press the "ENTER" key 1360 (FIG. 3b) by displaying appropriate messages on the LCD display 1304 (FIG. 6). Block 1905 determines whether or not the "ENTER" key 1360 was pressed. If so, the program jumps ahead to block 1911; otherwise, block 1907 ascertains whether or not the rotate manual CW 1386 or rotate manual CCW 1388 keys have been pressed. If not, the program loops back to block 1905; otherwise, the MANUAL subroutine is called at block 1909 to rotate the antenna array 1508 manually. The program then loops back to block 1905, which tests to see whether or not the "ENTER" key 1360 was pressed. A negative branch from block 1905 leads to block 1907 as described earlier. An affirmative branch from block 1905 transfers program control to block 1911 where the value of the voltage-to-frequency (V-F) converter 1409 is saved. Block 1913 causes the LCD display 1304 (FIG. 6) to display a prompt asking the user to press the ROTCCW key 1388 to turn the antenna array 1508 to the clockwise limit of rotation and to press the "ENTER" key 1360. Block 1915 checks to see whether or not the "ENTER" key 1360 was pressed. If not, block 1917 checks to see whether the ROTCW 1386 or ROTCCW 1388 keys were pressed If neither key was pressed, the program loops back to block 1915; if one of these keys 1386, 1388 was pressed, block 1919 calls the subroutine MANUAL to rotate the antenna array 1508.

The affirmative branch from block 1915 transfers program control to block 1921 where the value of the V-F converter 1409 is saved. Block 1923 calculates a variable XX as equal to the quantity of the CW count minus the CCW count divided by 360. Block 1925 calculates YY as the CCW count divided by XX. Block 1927 clears the calibrate mode flag and sets the calibrated flag before returning control to the calling program.

The subroutine INFO converts the current destination indicia database entry into an ASCII string for display. Block 1940 copies the first three bytes from the database entry to the memory locations THEM, TLAT and TLNG (target hemisphere, target latitude and target longitude) in RAM 1405.

At block 1942, the country name is copied to RAM 1405 (FIG. 6) and at block 1944, the prefix list is copied to RAM 1405. The latitude and longitude coordinates are processed in block 1946 to specify the corresponding grid square. At block 1948, the DBR subroutine is called to calculate distance and bearing. Latitude and longitude coordinates are processed in block 1950 to convert the coordinates to ASCII strings. Block 1952 calls the subroutine TRGTIM to determine target time based upon current UTC (universal coordinated time) and the target country's offset from UTC as specified in the database. Block 1954 flags the name, distance, bearing, latitude, longitude and time as valid before returning program control to the calling program.

Figure 13A:
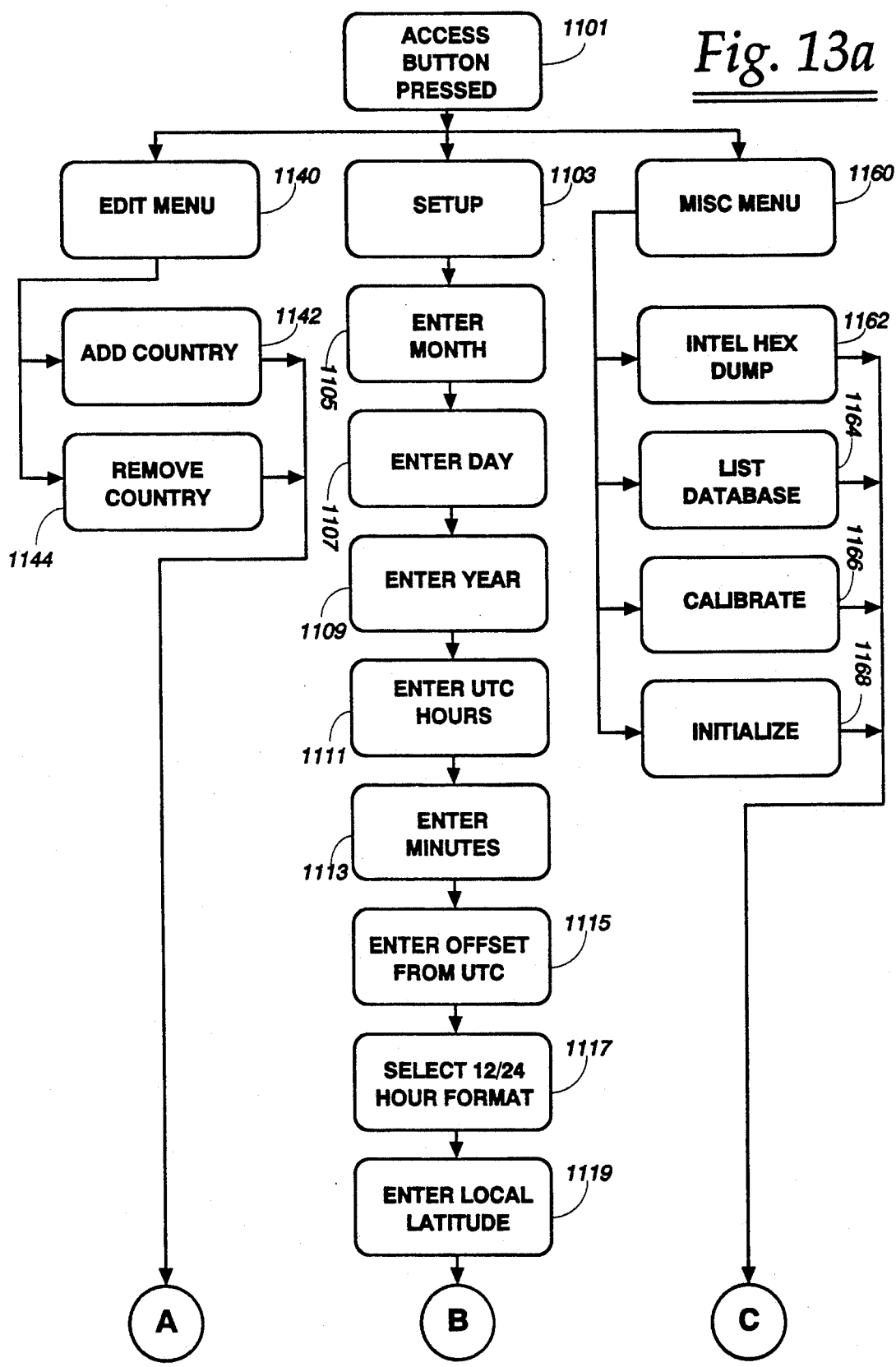
FIGS. 13a-13b represent a flowchart illustrating the setup sequence for the system shown in FIG. 1.
Figure 13B:
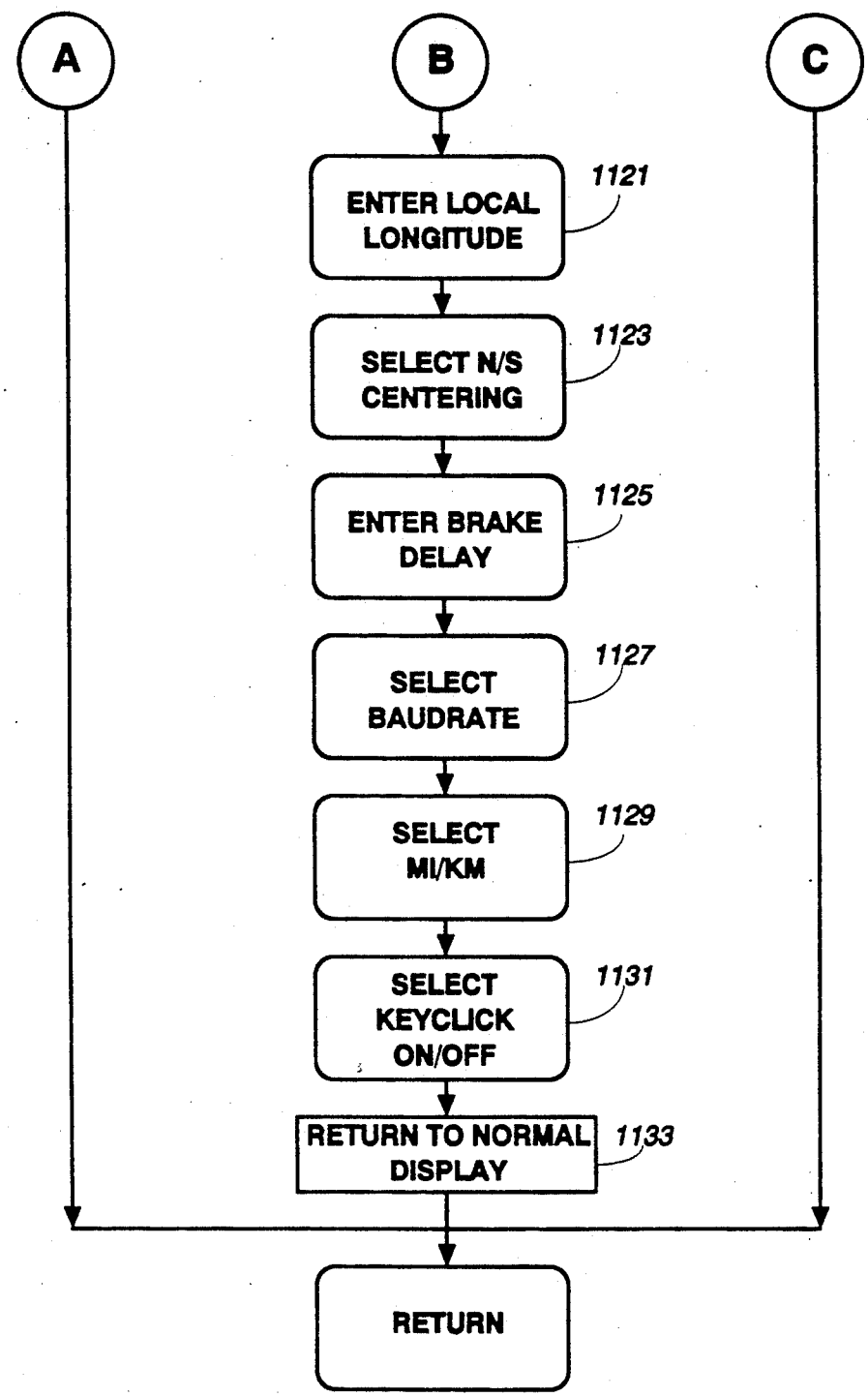

With reference to FIGS. 13a and 13b, the system setup subroutine SETUP will be described. When the rotor controller 1504 (FIG. 1) is first powered up, its controller 1504 (FIG. 1) is first powered up, its response is dependent upon whether or not there is already information stored in the battery-backed RAM 1405 (FIG. 6). If not, the rotor controller 1504 will run five diagnostic tests. The tests take only a few seconds and help to verify that the controller is functioning properly. The integrated circuits U108, U106, U105 and U110 (FIG. 7) are checked. With the exception of the LED test, the names of the tests that passed are displayed. The tests performed are described below.

| Test | Displayed if Ok | If bad, check or replace |
|---|---|---|
| Program ROM | PGM | U108 |
| External RAM | RAM | U106 |
| EPROM | ROM | U105 (invalid or blank) |
| Serial Port* | SER | U112 |
| LEDs | (Watch LED sequence. If any fails to light, replace it. If all the LEDs on one side fail to light, replace the associated latch IC.) | |

*For the serial port test to succeed, a jumper wire must be inserted between holes 2 and 3 of P104.

When the rotor controller 1504 (FIG. 1) is powered up, the controller checks to see if the user has entered any data into RAM 1504 (FIG. 6); in other words, the rotor controller 1405 determines whether or not the SETUP routine (FIGS. 13a-13b) has already been executed.

If the SETUP routine (FIG. 13a-13b) has not been executed, the rotor controller 1504 performs the diagnostics and then automatically enters the SETUP routine, prompting the user to enter the date, time, his latitude & longitude, brake delay, etc.

On the other hand, if the rotor controller 1504 determines that data is already present in RAM 1405, for example, after a power failure, the rotor controller 1504 displays a message indicating that power was lost and prompts the user to press the ENTER key 1360. Once the operator presses the ENTER key 1360, the rotor controller 1504 prompts for date and time ONLY, then presents the normal display. The rotor controller 1504 is able to determine that the only information lost was date and time, and so the whole SETUP routine need not be executed again However, the INIT function may be used to clear RAM 1405 of all user-entered settings and to run the complete SETUP routine (FIGS. 13a-13b).

After the unit is initialized, the SETUP routine is automatically entered causing the rotor controller 1504 to automatically prompt the operator for the necessary input. The operator must enter the date and time, but the other settings will default, as follows:
24-hour clock format
0 hours offset from UTC (Universal Coordinated Time)
North-centered
Distance readings in miles
5-second brake delay
Keyclick on
Serial port baud rate=9600
Auto-rotate parameters as described under Automatic Rotation Therefore, the operator may simply press the ENTER key 1360 when prompted for any of these entries to accept the default setting. Similarly, if the operator later wishes to change a single setting, he/she can leave others unchanged by simply pressing the ENTER key 1360 when prompted for them.

If the operator has used the Dump function (described later) to program a new ROM 1403 (FIG. 6), the setup selections that were in effect at that time will become the new defaults. Further details of this feature will be described later. Of critical importance, the north-/south-centering selection must match the manner in which the antenna array 1508 is mounted. Once the information has been entered, the display will show the day of the week, date, time and bearing. If the rotor controller 1504 has not yet been calibrated, the bearing will be blank and the AUTO key 1384 will not operate.

Referring to FIGS. 13a and 13b, the various entries to be made in setup mode will be described. The displayed prompts lead the operator through these selections with ease. The operator may leave any selection unchanged by simply pressing the ENTER key 1360 as a response for that selection.

In order to set up the rotor controller, the ACCESS key is pressed at block 1101. The ACCESS key 1356 provides the operator with a selection of menus and submenus. The setup menu is called by pressing "S" at block 1103 and the operator is prompted as follows:

| | |
|---|---|
| Block 1105: Month (1-12)? | Enter "1" through "12" and press the ENTER key 1360. |
| Block 1107: Day (1-31)? | Enter "1" through "31" and press the ENTER key 1360. |
| Block 1109: Year (0-99)? | Enter the last two digits and press the ENTER key 1360. |
| Block 1111: UTC hours (0-23)? | Enter UTC (Universal Coordinated Time) hours and press the ENTER key 1360. |
| Block 1113: UTC minutes (1-59)? | Enter the digits for the next minute and press the ENTER key 1360 when the next minute arrives. |
| Block 1115: Hours from UTC? | Enter the number of hours that must be added to UTC to give local time. This may be between −12 and +12. (This does not take into account any change in date.) If it is desired to have the controller display UTC (Universal Coordinated Time), enter 0. |
| Block 1117: 12 or 24-hour clock? | Press "1" or "2". |
| Block 1119: Latitude (− for S)? | Enter latitude to the nearest degree and press the ENTER key 1360. If the operator lives in the southern hemisphere, precede the number with a "−". |
| Block 1121: Longitude (− for E)? | Enter longitude to the nearest degree and press the ENTER key 1360. If the operator lives in the eastern hemisphere, precede the number with a "−". |
| Block 1123: N or S centered? | If the beam is aimed North at its center of rotation, press "N", otherwise press "S". |
| Block 1125: Brake delay (5-25)? | This value will depend on the size of the beam(s) antennas controlled by the rotor. It is the number of seconds for which the controller will keep the brake released after stopping rotation. This delay ensures that the beam has stopped moving by the time the brake engages. |
| Block 1127: Baudrate (300-9600)? | Press one of the following keys: "3" for 300 baud "6" for 600 baud "1" for 1200 baud "2" for 2400 baud "4" for 4800 baud "9" for 9600 baud |
| Block 1129: Miles or kilometers? | Press "M" if the target distances are to be displayed in miles. If kilometers are preferred, press "K". |
| Block 1131: Keyclick (Y/N) | Press "Y" if an audible beep is desired on key presses; otherwise, press "N". |

After the above parameters have been entered, program control is transferred to block 1133, where the LCD display 1304 enters the default display mode described earlier. With reference to block 1101, pressing the ACCESS button provides the operator with access to the SETUP routine just described. The ACCESS button also provides access to an EDIT menu, block 1140, and a MISC menu, block 1160. The EDIT menu 1140 enables the operator to add a country to the country database stored in RAM 1405 at block 1142, or to remove a country from the database stored in RAM 1405 at block 1144.

The calibration feature will be described with reference to FIGS. 13a-13b. First, the ACCESS key 1356 is pressed, providing access to several menus and submenus. The main menu is "Setup, Edit or Misc?". The "M" key should be pressed. The miscellaneous functions are Dump, block 1152; List, block 1164; Calibrate, block 1166; and Initialize, block 1168. At the "Dmp, Lst, Cal, Init?" prompt, press "C". The operator will be instructed to turn the rotator to its counterclockwise limit and press the ENTER key 1360. The ROTATE MANUAL keys 1386, 1388 are used to position the rotator to either due south or due north, depending on whether the antenna is mounted for north- or south-centered operation. Unless the particular rotator motor used with the controller allows more than 360 degree rotation (overlap), the operator may simply press the ROTATE MANUAL CCW key 1388 until the rotor stops at the counterclockwise limit of rotation The ENTER key 1360 is pressed, and the above process is repeated for the clockwise limit. The controller is now calibrated to the rotator and need not be recalibrated unless: (1) the Init function is used to clear RAM 1405, (2) the antenna rotor motor assembly 1502 or its azimuth-indication potentiometer 1522 are replaced, (3) the length of the multiconductor control cable 1515 is changed or (4) the RAM (U106, FIG. 7g) or backup battery (B101, FIG. 7f) are replaced.

If the CCW and CW wires to the azimuth-indication potentiometer 1522 (FIG. 2) are accidentally switched, the rotor controller 1504 will respond with the error message "Calibration error—Press ENTER". The azimuth-indication potentiometer 1522 must be wired so that its resistance decreases as the motor 1510 turns clockwise. This message can also occur if there is a dirty spot on the azimuth-indication potentiometer 1522 near the counterclockwise end.

Once the calibration is complete, the antenna array 1508 should be rotated through its full range while watching the displayed bearing for any skips that would indicate a dirty azimuth-indication potentiometer 1522. If there are any such spots, the azimuth-indication potentiometer 1522 should be cleaned for best rotor controller 1504 performance. If the degree symbol changes to a small "x" near the ends of rotation, this is an indication that the motor 1510 has turned beyond its normal 360 degree range. The bearing will still indicate the correct number of degrees. This accommodates motors 1510 that are capable of extended rotational range. If this symbol appears occasionally within the normal range, it is an indication of a dirty spot on the azimuth-indication potentiometer 1522.

The RAM 1405 saves up to ten bearings, each of which may optionally be given a reference name. The bearings are saved by pressing the STORE key 1354. The display will prompt with "Brg (ENTER=current)?". If the current bearing is to be stored, the ENTER key 1360 is pressed. Otherwise, the desired bearing in degrees is entered and the ENTER key 1360 is pressed.

The next prompt is "Position (0-9 or -)?". Any digit key or the "-" key can be pressed before pressing ENTER. Pressing only the ENTER key defaults to position 0. Before pressing ENTER, the digit keys will display the name of any bearing already saved at that location, allowing the operator to select an empty position or a position the operator wishes to write over. If nothing has yet been stored in a particular location, a default direction name appears in the display. If the operator changes his mind and doesn't want to save the bearing after all, "-" may be pressed to abort the function. Otherwise, ENTER is pressed.

The last prompt is "Reference name?". A name or phrase of up to 20 characters and spaces may be entered, such as "My friend in England". Press the ENTER key 1360.

Figure 14:
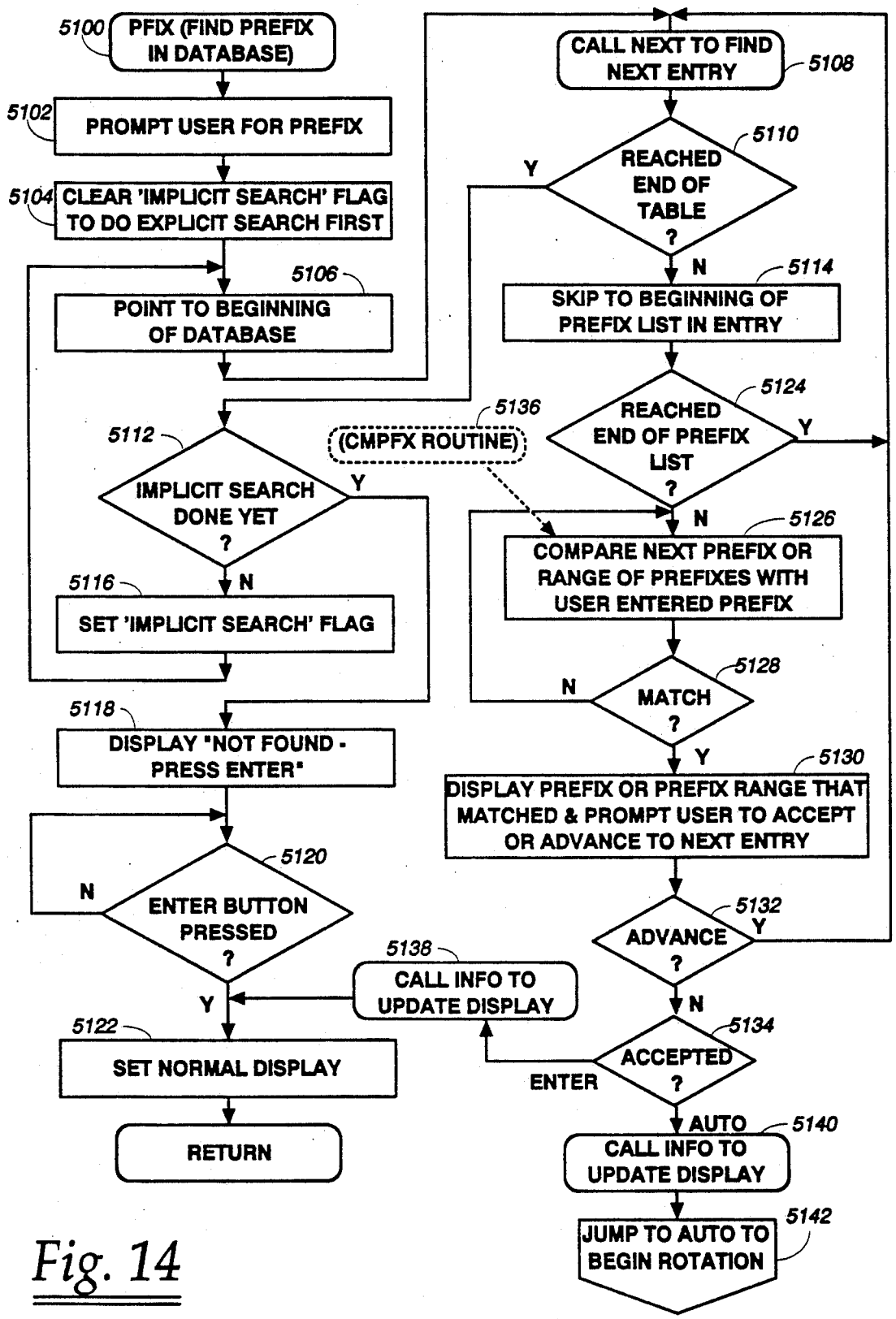
FIG. 14 is a software flowchart illustrating the subroutine PFIX which searches through a table stored in for a given amateur radio prefix.
Figure 15A:
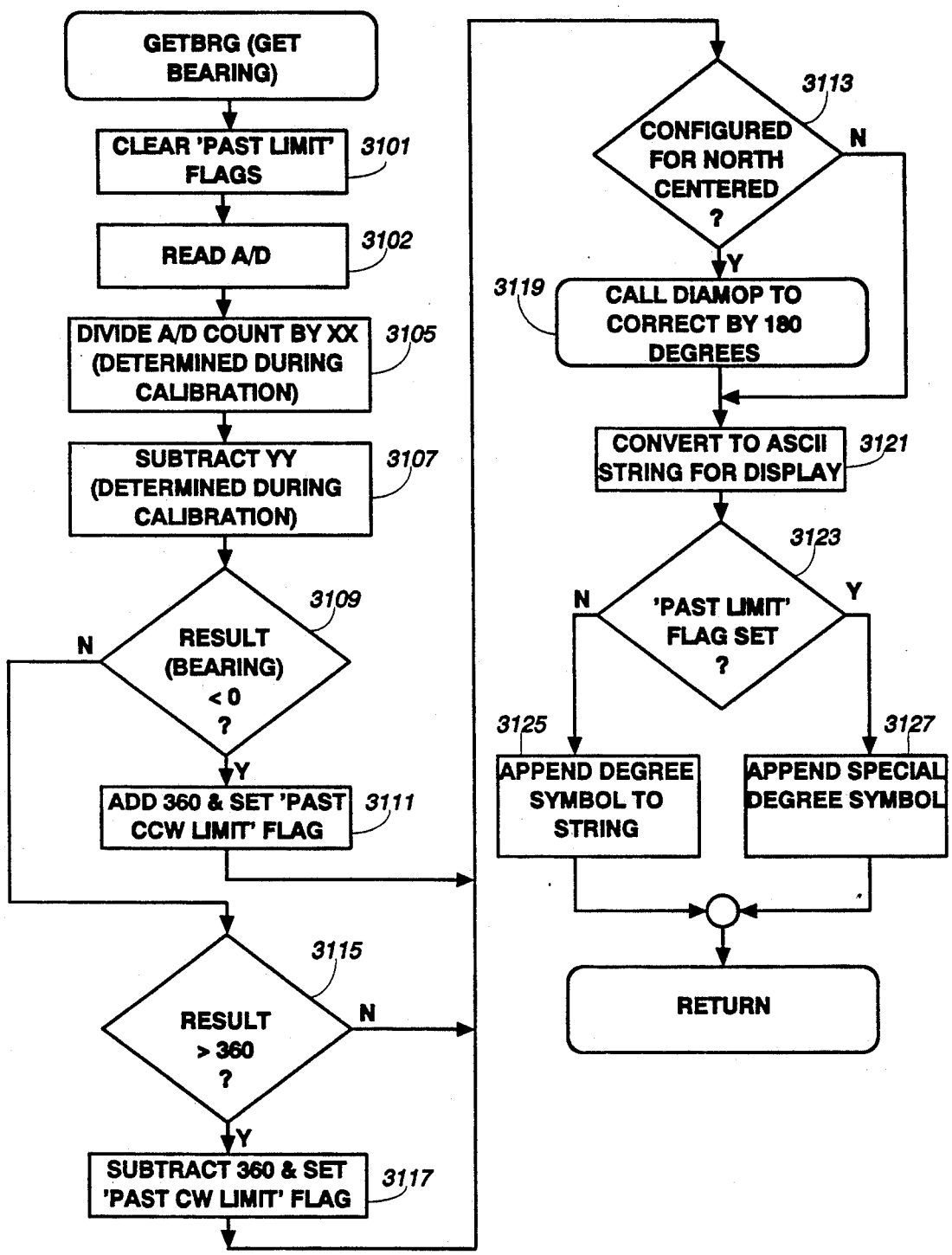
FIGS. 15a-15b represent a software flowchart depicting the subroutines GETBRG, DIAMOP and WAIT which apply the calibration factors determined during execution of the subroutine shown in FIG. 8 to a bearing stored in memory.
Figure 15B:
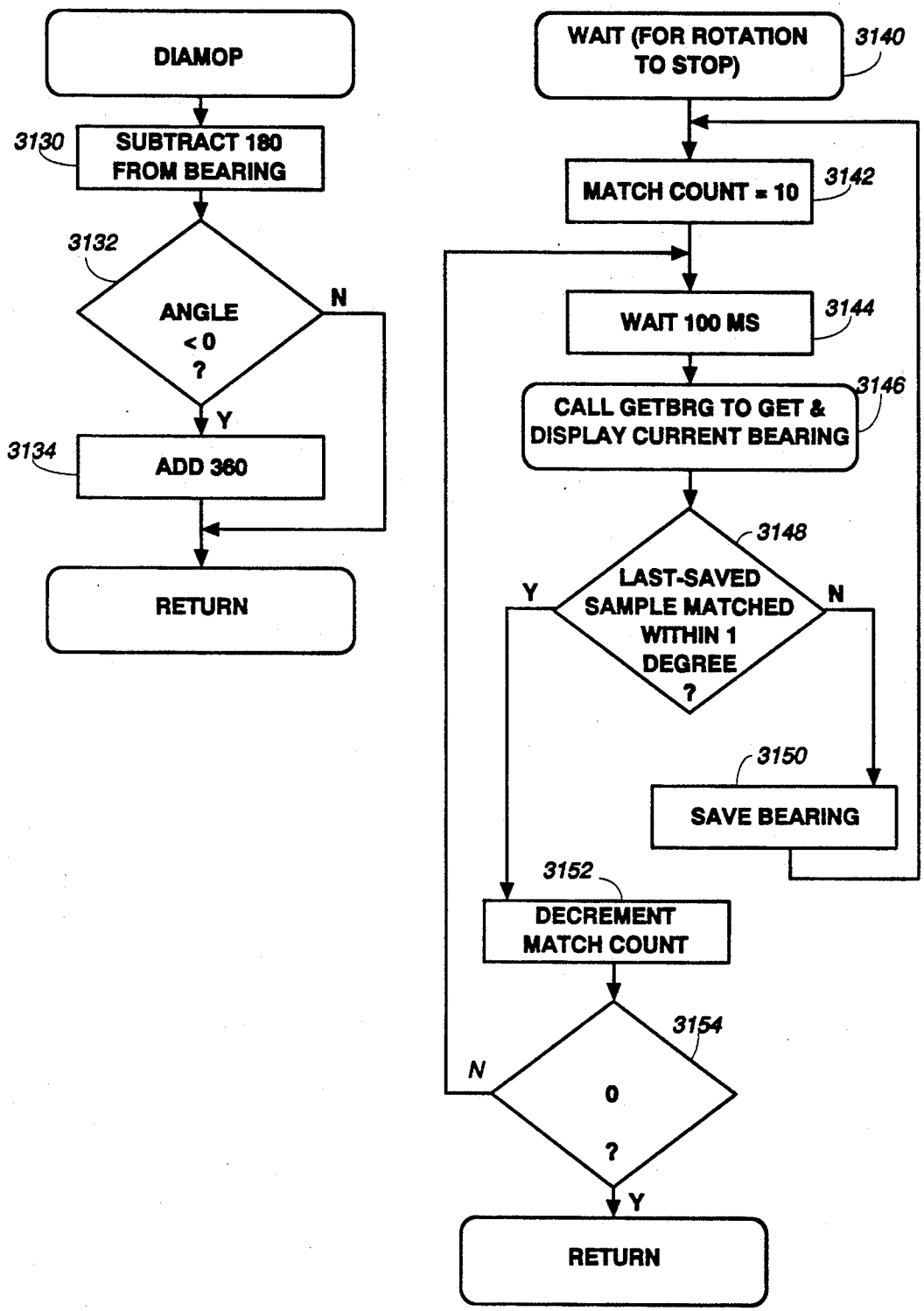

Table lookup by an entered prefix will be described hereinafter with reference to FIG. 14. The PFIX routine 5100 searches the database for a match to a prefix entered by the user. The program commences at block 5102, where the user is prompted to enter a prefix into the keypad 1308. In block 5104, the "implicit search" flag is cleared so that an explicit search will be conducted first. Next, the search is commenced at the beginning of the database in block 5106. In block 5108, a subroutine NEXT is called to retrieve the next entry from the database. Block 5110 checks to see whether or not the end of the table has been reached. If the end has been reached, program control transfers to block 5112, but if the end of the list has not been reached, program control transfers to block 5114. The affirmative branch at block 5110 will be described first, followed by a description of the negative branch. Block 5112 in the affirmative branch conducts a test to see whether or not an implicit search of the database has been done. If not, the program sets the implicit search flag at block 5115 and program control shifts back to block 5106. If an implicit search has been conducted, block 5118 causes the LCD display 1304 to display the words "Not found—press ENTER". Block 5120 checks to see whether the ENTER key 1360 has been pressed. If not, the program loops back to block 5118 indefinitely. Once the ENTER key 1360 has been pressed, block 5122 causes the LCD display 1304 to return to the first display mode.

If the negative branch is followed at block 5110, the program skips to the beginning of the prefix list in the entry at block 5114. Next, a test is performed at block 5124 to determine whether or not the end of the prefix list has been reached. If so, program control is transferred back to block 5108. Otherwise, at block 5126 the next prefix or range of prefixes is compared with the user entered prefix. The subroutine CMPF at block 5136 conducts the comparison. If the prefixes do not match, block 5128 loops the program back to block 5126 to check the next prefix. Upon locating a match, block 5130 causes the LCD display 1304 to display the prefix or prefix range corresponding to the user entered prefix and to prompt the user to either accept the prefix entry or advance to the next database entry. If the user wishes to advance to the next entry, program control is transferred back to block 5108. If the user indicates that he/she does not wish to advance to the next entry at block 5132, the user must either accept or reject the entry at block 5134. If the user does not accept the entry, the INFO subroutine is called at block 5138 to update the LCD display 1304 and the LCD display 1304 then enters the first (normal) display mode at block 5122.

If the user accepts the entry at block 5134, the INFO routine updates the display at block 5140. Next, if and only if the entry was accepted with the AUTO key 1384, block 5142 transfers program control to the AUTO subroutine to commence antenna array rotation. If accepted with the enter key 1360, the display is updated, but rotation doesn't start.

The subroutine GETBRG will be described with reference to FIG. 15. GETBRG causes the LCD display 1304 to display the current bearing of the antenna array. The routine commences at block 3101 where the "past limit" flags are cleared. These flags would be set in the event that the rotor motor 1510 was rotated beyond the 360-degree limit of rotation. Next, block 3103 reads the voltage-to-frequency converter 1409 (FIG. 6). The frequency count is divided by a first calibration factor XX at block 3105, determined during the calibration procedure previously described. Next, at block 3107, another calibration factor YY is subtracted from the result obtained at block 3105. Block 3109 conducts a test to ascertain whether or not the result obtained at block 3107 is less than zero. If so, 360 is added to the result at block 3111 and the program jumps to block 3113. Otherwise, the program conducts a test at block 3115 to determine whether the result is greater than 360. If so, 360 is subtracted from the result and the "past CW (clockwise) limit" flag is set at block 3117. The program then jumps to block 3113. If the result is not greater than 360 as determined in block 3115, then program control transfers to block 3113, which checks to see whether or not the antenna rotor motor assembly 1504 was configured for north-centered operation. If so, the subroutine DIAMOP is called at block 3119 to correct the bearing by 180 degrees and program control progresses to block 3121. If the rotor was not configured for north-centered operation, program control shifts to block 3121 where the bearing is converted into an ASCII string for display by LCD display 1304.

Block 3123 checks to see whether or not the "past limit" flags have been set. If not, a degree symbol is appended to the ASCII string at block 3125. Otherwise, a special degree symbol is appended at block 3127.

The subroutine DIAMOP, called at block 3119, will be described DIAMOP commences by subtracting 180 from the bearing at block 3130. Next, the bearing is tested at block 3132 to see whether or not it is less than zero. If not, the subroutine returns Otherwise, 360 is added to the bearing at block 3134 before the subroutine returns.

The subroutine WAIT provides enhanced accuracy with respect to the aiming of the antenna array 1508. This subroutine waits until the antenna array 1508 has stopped moving, ensuring that the rotator has stopped turning by requiring 10 readings in a row that match to within 1 degree. When this is true, it returns and another routine compares current bearing to the desired bearing (block 4115).

WAIT commences at block 3140. Block 3142 sets a match count variable to a value of 10. Next, the program waits 100 milliseconds at block 3144. At block 3146, the subroutine GETBRG is called, which obtains the current bearing. Block 3148 compares the current bearing sample to determine whether or not the bearings match. If not, the current bearing is saved at block 3150 and program control shifts back to block 3142. If the bearings match to within one degree, the match count variable is decremented by one at block 3152. Block 3154 checks to see whether the match count is equal to zero. If so, the subroutine returns; otherwise, program control transfers back to block 3144.

The subroutine AUTO will be described with reference to FIG. 16. At block 4101, the subroutine determines whether or not the selected bearing is a valid bearing. If the bearing is invalid, the subroutine returns. If the selected bearing is valid, program control progresses to block 4103 where a test is conducted to ascertain whether or not the antenna rotor motor assembly 1502 has been calibrated. If the calibration procedure was not followed, the subroutine returns. Otherwise, the program progresses to block 4105 where the LCD display 1304 is returned to its first (normal) display mode. At block 4107, the subroutine determines whether the antenna array 1508 is positioned near the target bearing If so, the program jumps ahead to block 4117 which activates beeper circuit 1319 (FIG. 6) and then to block 4125, where antenna array 1508 rotation is stopped before returning to the calling program.

If the antenna array 1508 is not near the target bearing, as determined in block 4107, the program waits 200-800 milliseconds at block 4109 before stopping the motor 1510 (FIG. 2). At block 4111, the output of the voltage-to-frequency converter 1409 (FIG. 6) is monitored to keep track of the position of the antenna array 1508. Block 4113 tests to see whether or not the antenna is still moving by executing the WAIT subroutine earlier described with reference to FIG. 13. If the antenna is still moving, program control shifts back to block 4111 where the voltage-to-frequency converter 1409 is monitored again. If the antenna array 1508 has stopped moving, block 4115 determines whether the antenna has been positioned within the desired accuracy. If so, the beeper circuit 1319 (FIG. 6) is activated at block 4117, the rotation is stopped at block 4125 and the subroutine returns to the calling program.

If the test at block 4115 determines that the antenna array 1508 is not positioned within the desired accuracy, the motor 1510 (FIG. 2) is activated to commence rotation in the required direction at block 4119. The displayed bearing and time are updated at block 4121 and block 4123 checks to see whether or not a button on the keypad 1308 (FIG. 6) has been pressed. If so, the program jumps back to block 4109 to wait 200-800 milliseconds before stopping the motor. If not, the motor 1510 stops at block 4125 and the subroutine returns to the calling program.

The subroutine ICOS takes the inverse cosine of an argument ICOS is employed in the context of bearing calculations to determine distance and bearing between two geographic coordinates in latitude and longitude. The subroutine commences by setting an iteration count variable to 9 at block 4141. Block 4143 saves the sign of the argument and block 4145 assumes that the angle is equal to 45 degrees. A delta value of 22.5 degrees is used to check out the values of two other angles equal to the assumed value of 45 degrees, plus or minus delta. Block 4147 takes the cosine of the assumed value by means of subroutine COS. Block 4149 conducts a test to determine whether or not the result of block 4147 is greater than the argument. If so, a new assumed value equal to the previously assumed value plus delta is now adopted at block 4151. Otherwise, a new assumed value equal to the previously assumed value minus delta is now adopted at block 4153. After the new assumed value has been updated either in block 4151 or block 4153, the program sets a new delta value in block 4155 equal to the previous delta value divided by two. Next, the iteration count variable is decremented by one at block 4157. Block 4159 tests to see whether or not the iteration count variable is equal to zero. If not, the program jumps back to block 4147 where the cosine of the new assumed value is taken. Otherwise, program control progresses to block 4161 which checks to see whether or not the original sign of the argument was positive. If so, at block 4165 the inverse cosine of the argument is set equal to the value last assumed in block 4151 or block 4153. If the test at block 4161 determines that the original sign of the argument was non-positive, then the value last assumed in block 4151 or block 4153 is subtracted from 180. The value so obtained is set equal to the inverse cosine of the argument in block 4165 and the subroutine returns to the calling program.

The subroutine SETPAR sets the auto-rotate parameters of the rotor controller 1504. In block 167, the program converts the digit key which was pressed on keypad 1308 (FIG. 6) into an auto-rotate parameter based upon a lookup table. At block 4169, these parameters are saved in RAM 1405. The subroutine then returns to the calling program.

Figure 17A:
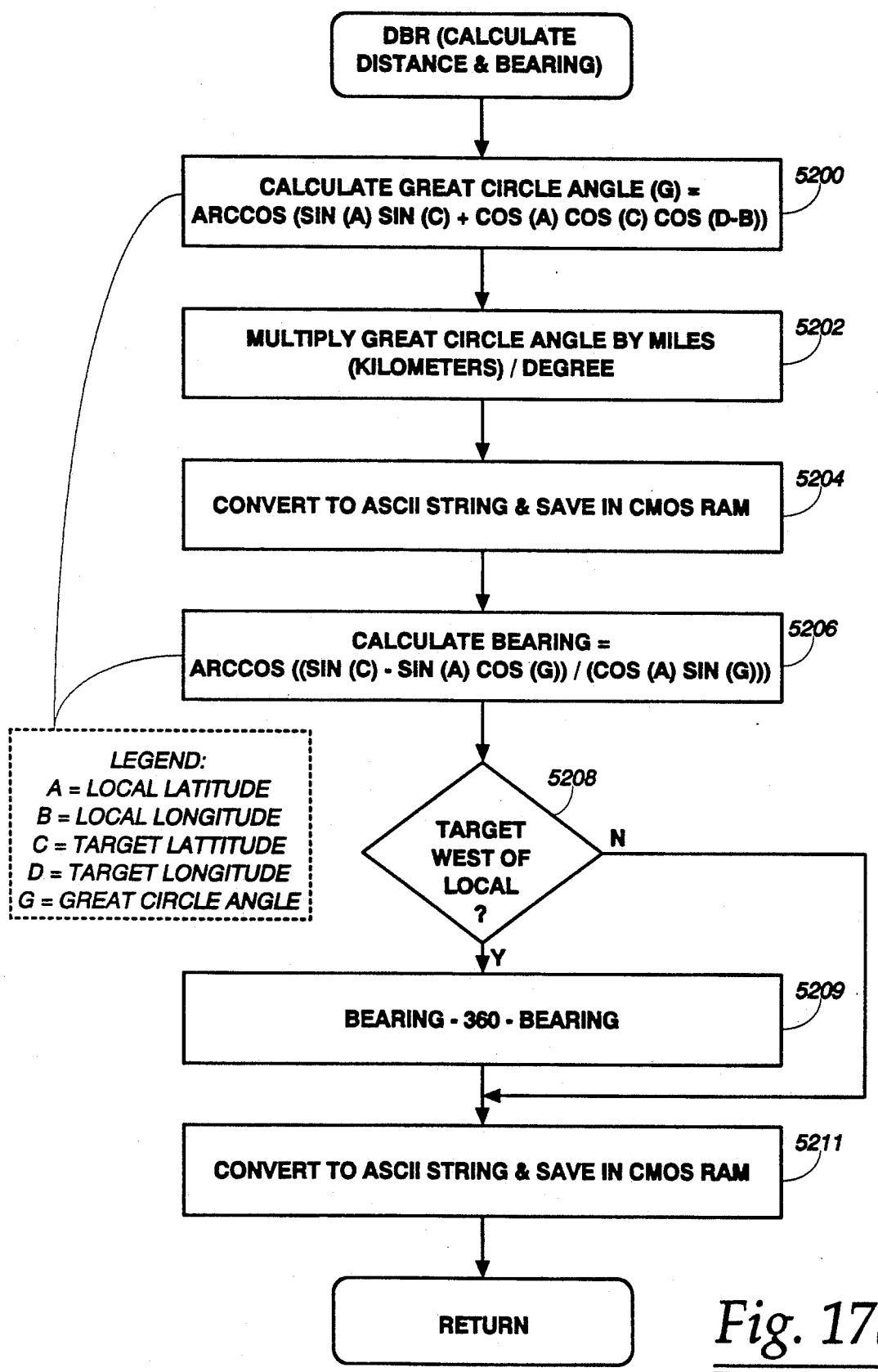
FIG. 17a-17b represents a software flowchart illustrating the subroutines DBR, PATH and IDSP which calculate distance and bearing from latitude and longitude, convert between long path and short path bearings and update the display screen, respectively.
Figure 17B:
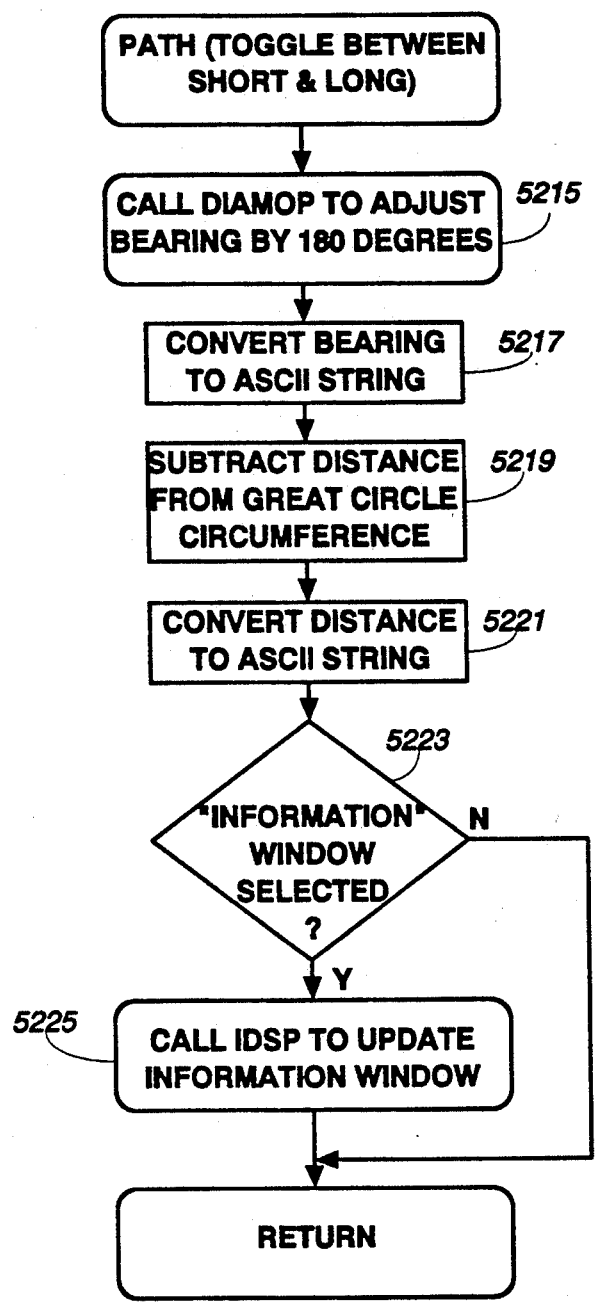
Figure 17C:
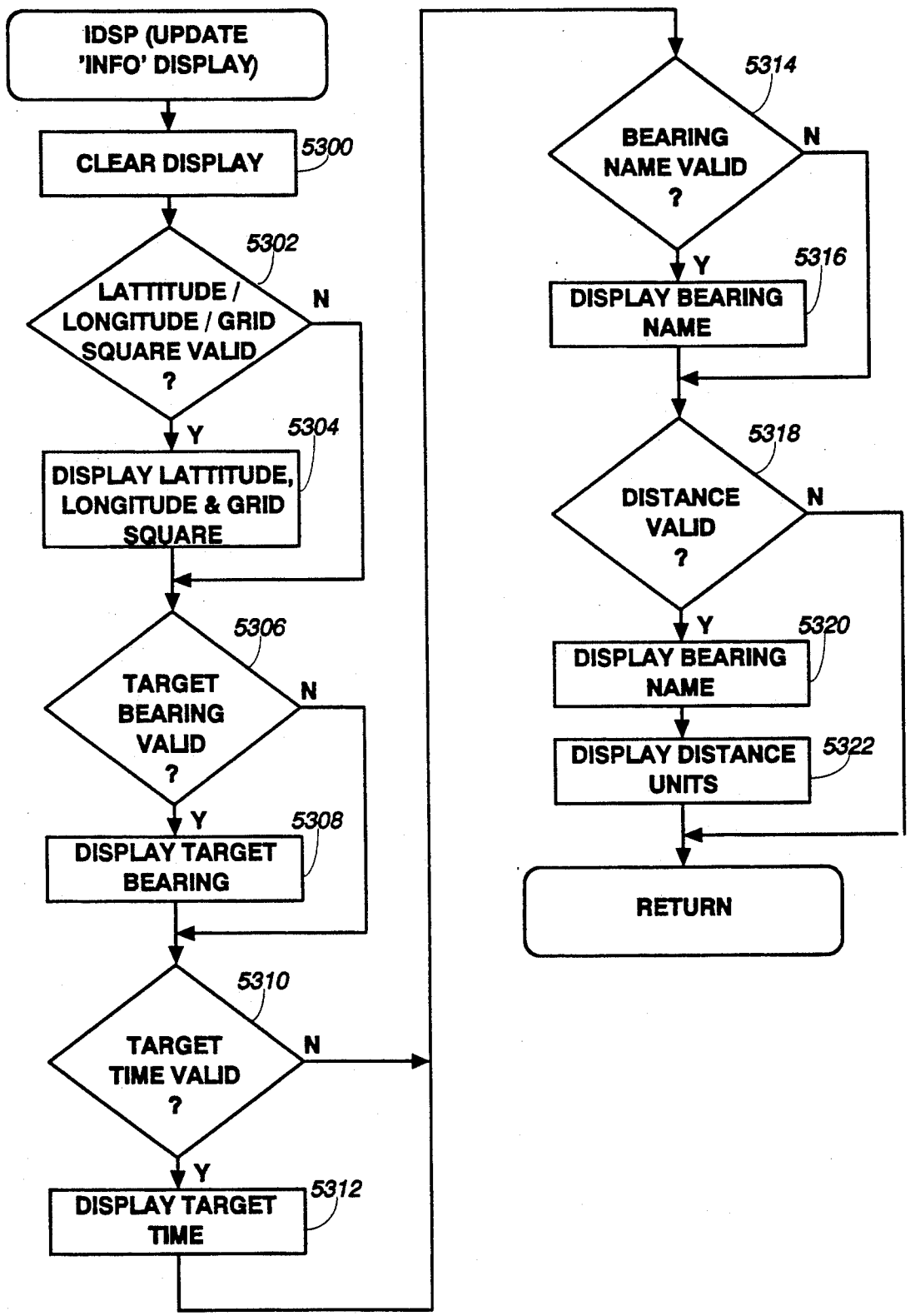

With reference to FIGS. 17a-17c, the subroutine DBR will be described DBR calculates the distance and the bearing between two geographic coordinates in latitude and longitude. The geographic coordinates represent the latitude and longitude of the radio operator (local coordinates) and the latitude and longitude of a desired target zone (target coordinates). The bearing is calculated using the geographical coordinates of the radio operator as a fixed reference point.

Figure 16A:
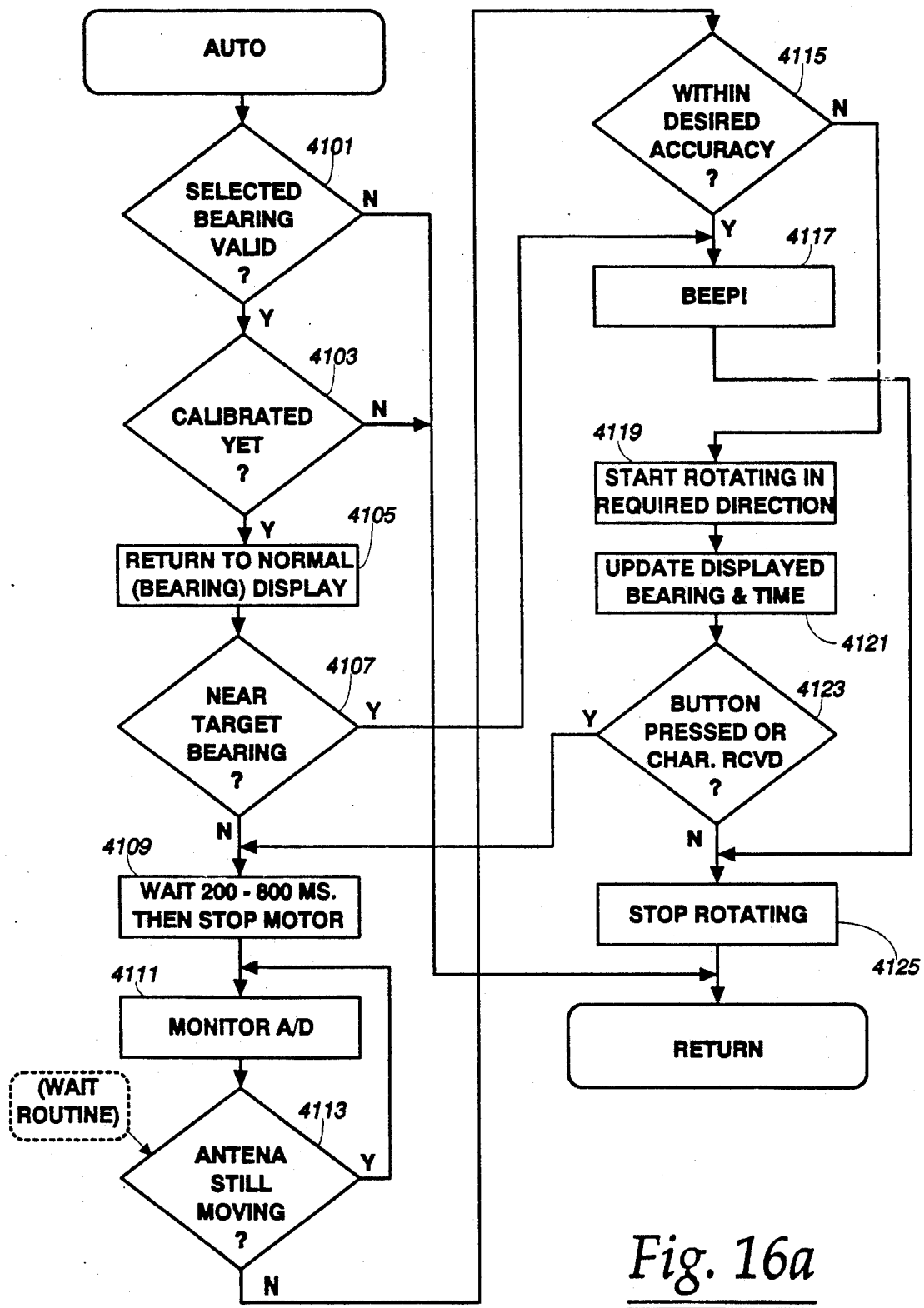
FIGS. 16a-16b represents a software flowchart showing the subroutines AUTO, ICOS and SETPAR which control the application of power to the rotor motor, calculate the inverse cosine of an argument for bearing calculations and convert an entered key into an auto-rotate parameter respectively.
Figure 16B:
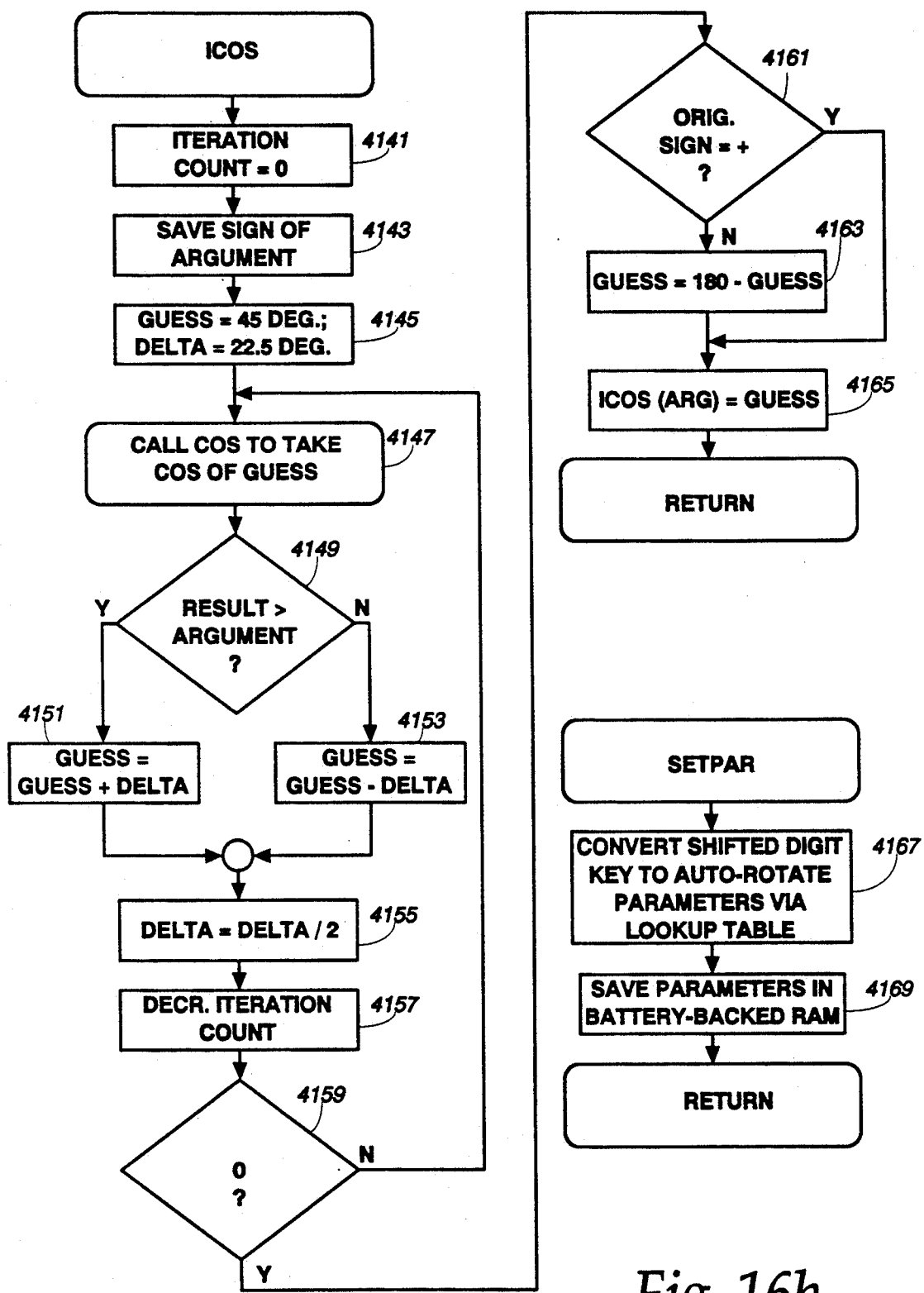

The subroutine commences at block 5200, local coordinates and the target coordinates. The ICOS subroutine of FIGS. 16a-16b is employed to calculate a great circle angle equal to the inverse cosine of [sin (local latitude) sin (target latitude)+cos (local latitude) cos (target latitude) cos (target longitude-local longitude)]. Block 5202 multiplies the great circle angle by distance per degree. Block 5204 converts the great circle angle (G) to an ASCII string and saves the string in RAM 1405 (FIG. 6). Next, a bearing is calculated in block 5206 equal to the inverse cosine of {[sin (target latitude)—sin (local latitude) cos (G)]/[cos (local latitude) sin (G)]}. Block 5208 checks to see whether or not the target longitude is west of the local longitude. If so, a new bearing is calculated at block 5209 by subtracting the bearing calculated in block 5206 from 360. If the target longitude is not west of the local longitude, the bearing calculated in block 5206 is not changed. Next, the program enters block 5211 to convert the calculated bearing into an ASCII string and to save the ASCII string in RAM 1405 (FIG. 6). The subroutine then returns to the calling program.

Subroutine PATH enables the operator to toggle between long path values and short path values At block 5213, PATH calls subroutine DIAMOP (described earlier with reference to FIG. 15a-15b). DIAMOP adjusts the bearing by 180 degrees to switch from long path to short path, or vice-versa. Block 5217 converts the new bearing into an ASCII string, and block 5219 subtracts the distance between the local coordinates and the target coordinates from the great circle circumference of the earth. Block 5221 converts the distance calculated in block 5219 into an ASCII string. Block 5223 checks to see whether or not an information window has been selected for LCD display 1304 (FIG. 6). If so, the IDSP subroutine is called at block 5225 to update the display of the LCD display 1304. Then the subroutine returns to the calling program.

The subroutine IDSP commences in block 5300 by clearing the display of LCD display 1304. Next, block 5302 checks to see whether or not the latitude, longitude and/or grid square values are valid. If so, latitude, longitude and grid square are displayed at block 5304. In either case, program control then progresses to block 5306 which determines whether or not the target bearing is valid. If so, the target bearing is displayed at block 5308. In either case, the program moves to block 5310 to ascertain whether or not the target time is valid. If so, block 5312 displays target time. Next, block 5314 checks the bearing name, which is displayed in block 5316 to see whether or not the name is valid. Block 5318 checks the distance and, if valid, the bearing name and the distance units are displayed in block 5320 and 5322. The subroutine then returns to the calling program.

Figure 18A:
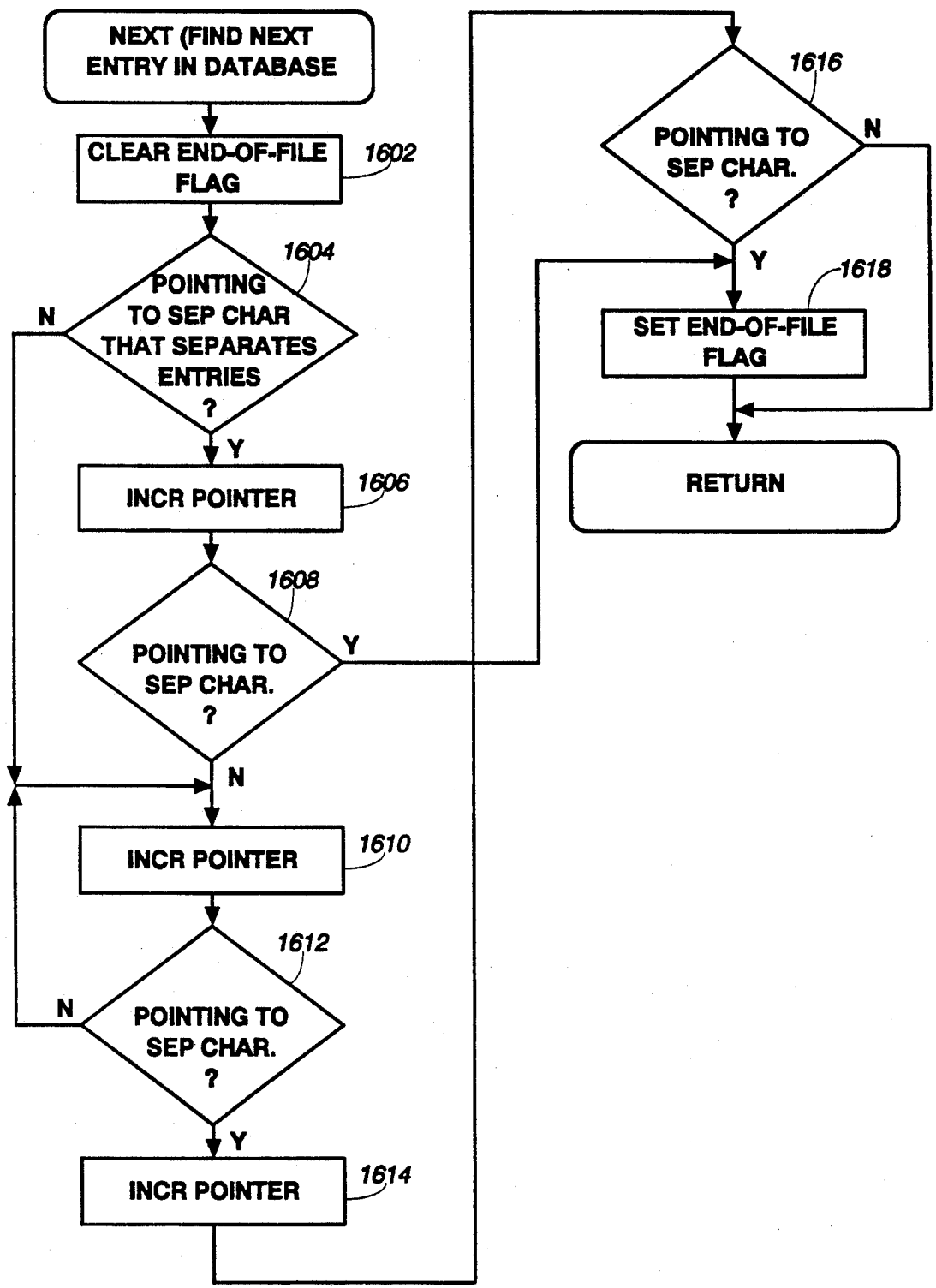
FIGS. 18a-18b represents a software flowchart showing the subroutines NEXT and DSPBRG which locate the next entry in the database stored in memory and update the bearing display, respectively.
Figure 18B:
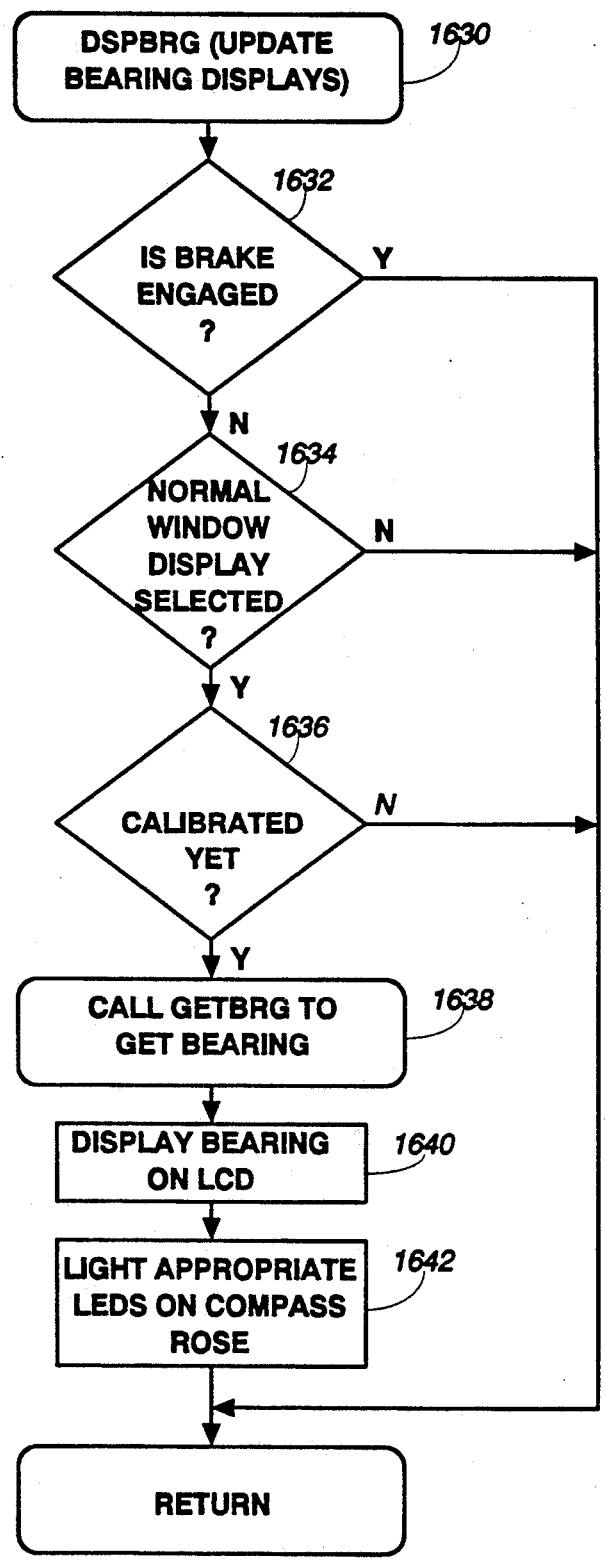

FIGS. 18a-18b are software flowcharts of the subroutine NEXT and DSPBRG. The subroutine NEXT is called in subroutine PFIX, which was described earlier with reference to FIG. 14. The purpose of NEXT is to find the next entry in the destination indicia database stored in RAM 1405. The subroutine NEXT commences at block 1602, where an end-of-file flag is cleared. Block 1604 conducts a test to determine whether or not a database character pointer is pointing to a SEP character which separates adjacent entries in the database. If so, the program progresses to block 1606; otherwise, the program jumps ahead to block 1610. Block 1606 increments the database character pointer by one, and block 1608 determines whether or not the newly-incremented pointer is pointing to a SEP character. If so, the program skips ahead to block 1618; otherwise, the program continues to block 1610.

At block 1610, the database character pointer is incremented by one. Block 1610 is reached by a negative branch from block 1604, block 1608 or block 1612. At block 1612, a test is conducted to ascertain whether the database character pointer is pointing to a SEP character. If so, the program progresses to block 1614, where the pointer is incremented by one. Otherwise, the program loops back to block 1610. From block 1614, the program continues to block 1616, where the SEP character test is performed yet again. A negative branch from block 1616 causes the subroutine to return to the calling program and a positive branch transfers program control to block 1618 where the end-of-file flag is set. Then the subroutine returns to the calling program.

Subroutine DSPBRG updates the bearing display of LCD display 1304. At block 1632, a preliminary test is conducted to determine whether or not the brake is engaged. If the brake is engaged, the subroutine returns program control to the calling program. Otherwise, the program continues to block 1634 to determine whether or not the first (normal) display mode has been selected for LCD display 1304. If not, the subroutine returns to the calling program. If the first display mode was selected at block 1616, the program determines whether or not the antenna rotor motor assembly 1502 has been calibrated. If the motor assembly 1502 has not been calibrated, the subroutine returns to the calling program. Otherwise, the program calls the subroutine GETBRG at block 1638 to get the desired bearing. At block 1640, the bearing is displayed on the LCD display 1304. Block 1642 lights the appropriate LEDs on the LED compass rose display 1305 before the subroutine transfers program control to the calling program.

Figure 19A:
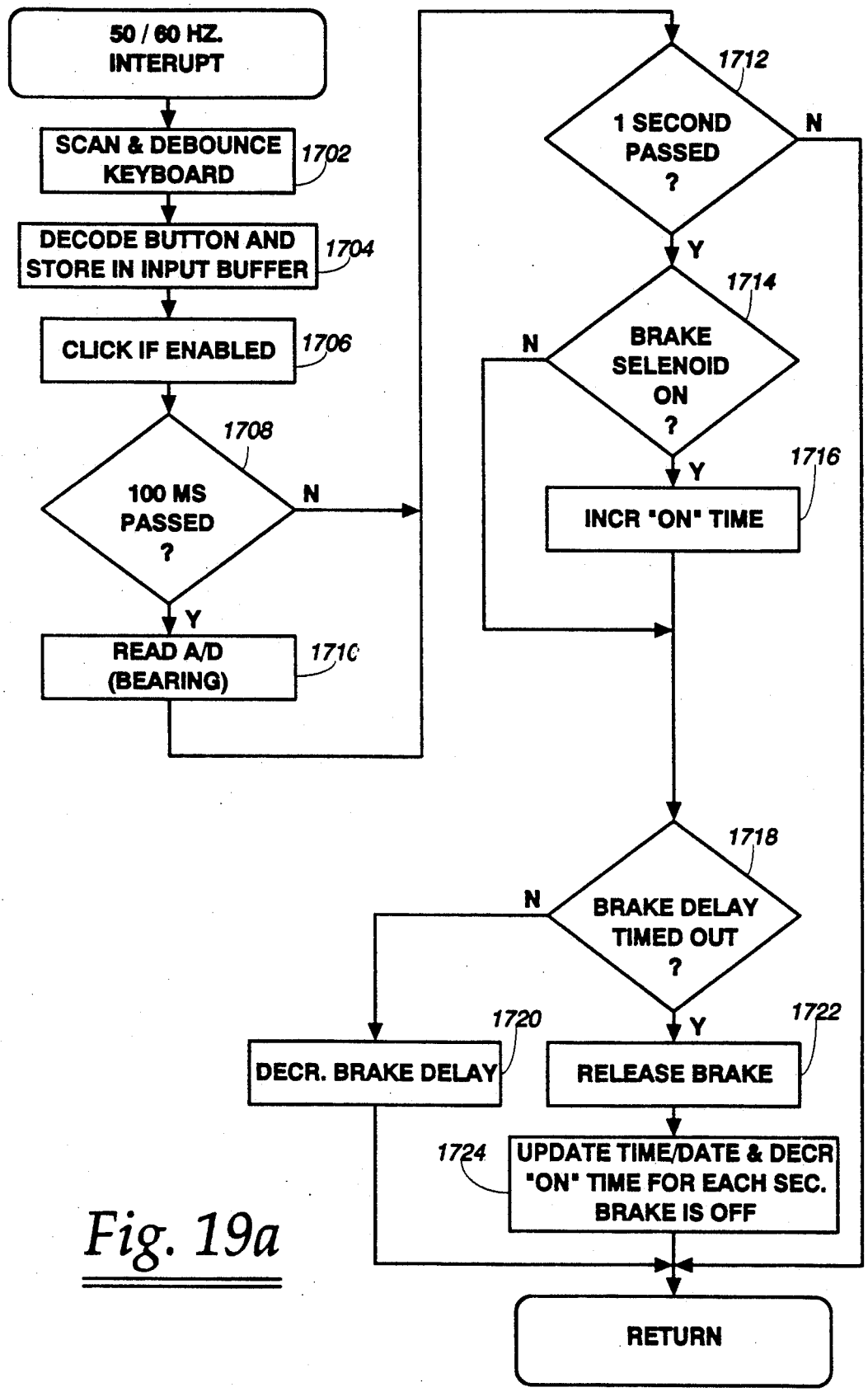
FIGS. 19a-19b represents a software flowchart illustrating the 50/60 cycle interrupt routine which processes keyboard inputs and the ROTCW/ROTCCW subroutine which applies control signals to the rotor motor.
Figure 19B:
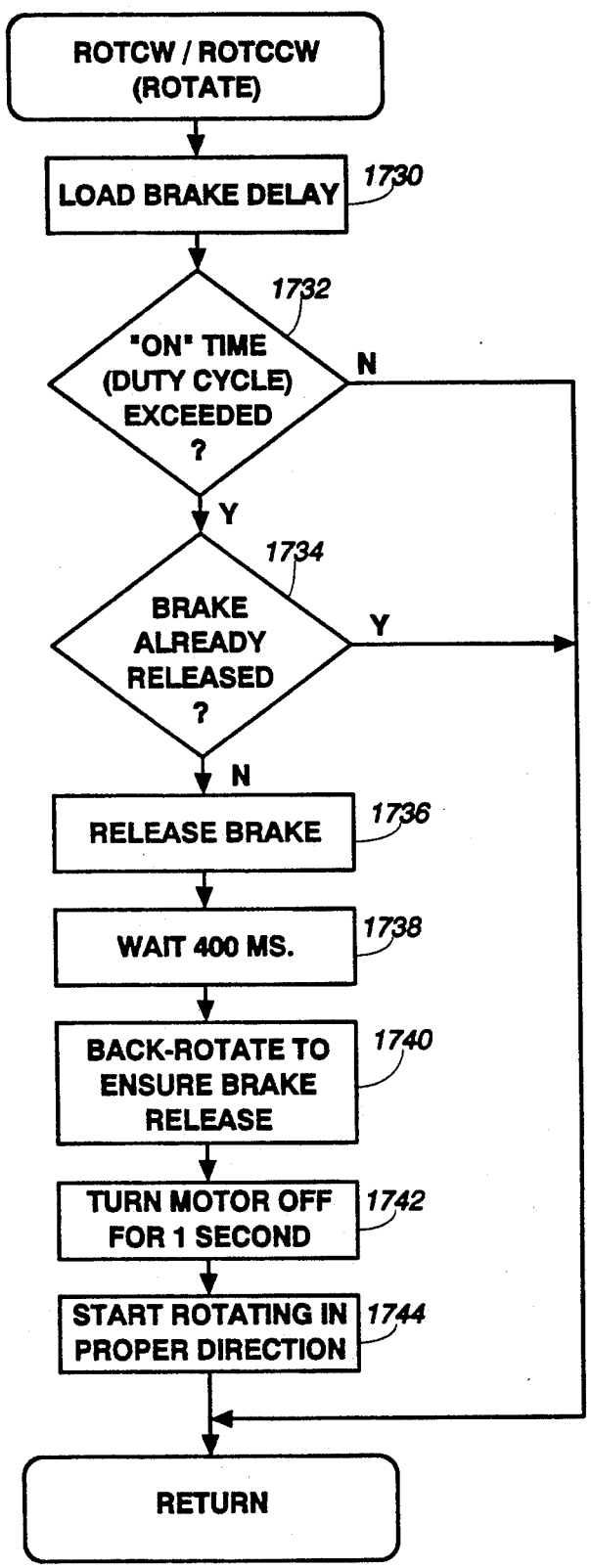

FIGS. 19a and 19b are flowcharts depicting the subroutines for the 50/60 Hz interrupt program and the ROTCW/ROTCCW antenna rotating program.

The 50/60 Hz interrupt routine begins at block 1702 where the keypad 1308 is scanned and a debounce function is provided. Block 1704 decodes the key of keypad 1308 that was pressed and stores the key in an input buffer. Block 1706 causes the beeper circuit 1319 to emit an audible click if the keyclick feature has been enabled. Block 1708 conducts a test to see whether or not 100 milliseconds have passed. If not, the subroutine returns program control to the calling program. If so, the program continues to block 1710 where the voltage-to-frequency (V-F) converter 1409 (FIG. 6) is read to determine the current bearing of the antenna array 1508 (FIG. 1). Block 1712 determines whether or not one second has passed. If not, the subroutine returns program control to the calling program. Otherwise, a test is conducted at block 1714 to ascertain whether or not the brake solenoid is on. If not, the program skips ahead to block 1718. If the brake solenoid is on, an "on-time" counter is incremented by one at block 1716. Block 1718 determines whether or not the brake delay has timed out. If not, block 1720 decrements the brake delay variable before returning control to the calling program. If the brake delay has timed out at block 1718, the program releases brake control at block 1722 and updates time, date and decrements the "on-time" variable for each second the brake solenoid is off. At block 1724, the subroutine then returns control to the calling program.

The ROTCW/ROTCCW subroutine rotates the antenna array 1508 (FIG. 1) either clockwise or counterclockwise as desired. In block 1730, a desired value for the brake delay is loaded. Block 1732 determines whether the "on-time" duty cycle of the motor 1510 (FIG. 2) has been exceeded. If not, the program returns control to the calling subroutine. Otherwise, a test is conducted at block 1734 to determine whether or not the brake is already released. If the brake is released, the subroutine returns control to the calling program. Otherwise, the brake is released at block 1736. In block 1738, the program waits 400 milliseconds before back-rotating the antenna array 1508 at block 1740 to ensure release of the brake. Block 1742 then shuts off power to the motor 1510 for one second, and block 1744 starts the motor 1510 rotating in the proper direction before returning program control to the calling program.

Figure 20A:
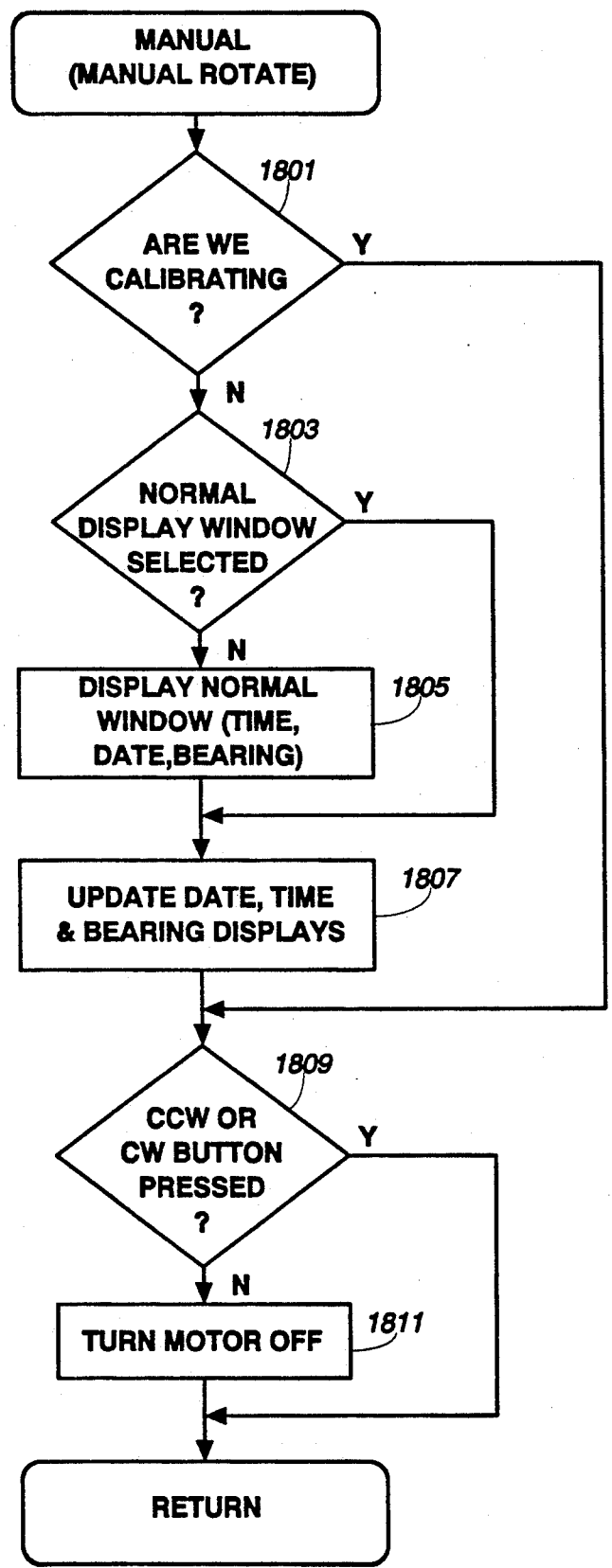
FIGS. 20a-20b represent a software flowchart illustrating the subroutines MANUAL and LIST which provide for manual rotation of the rotor motor and enable input applied to the serial port of the rotor controller, respectively.
Figure 20B:
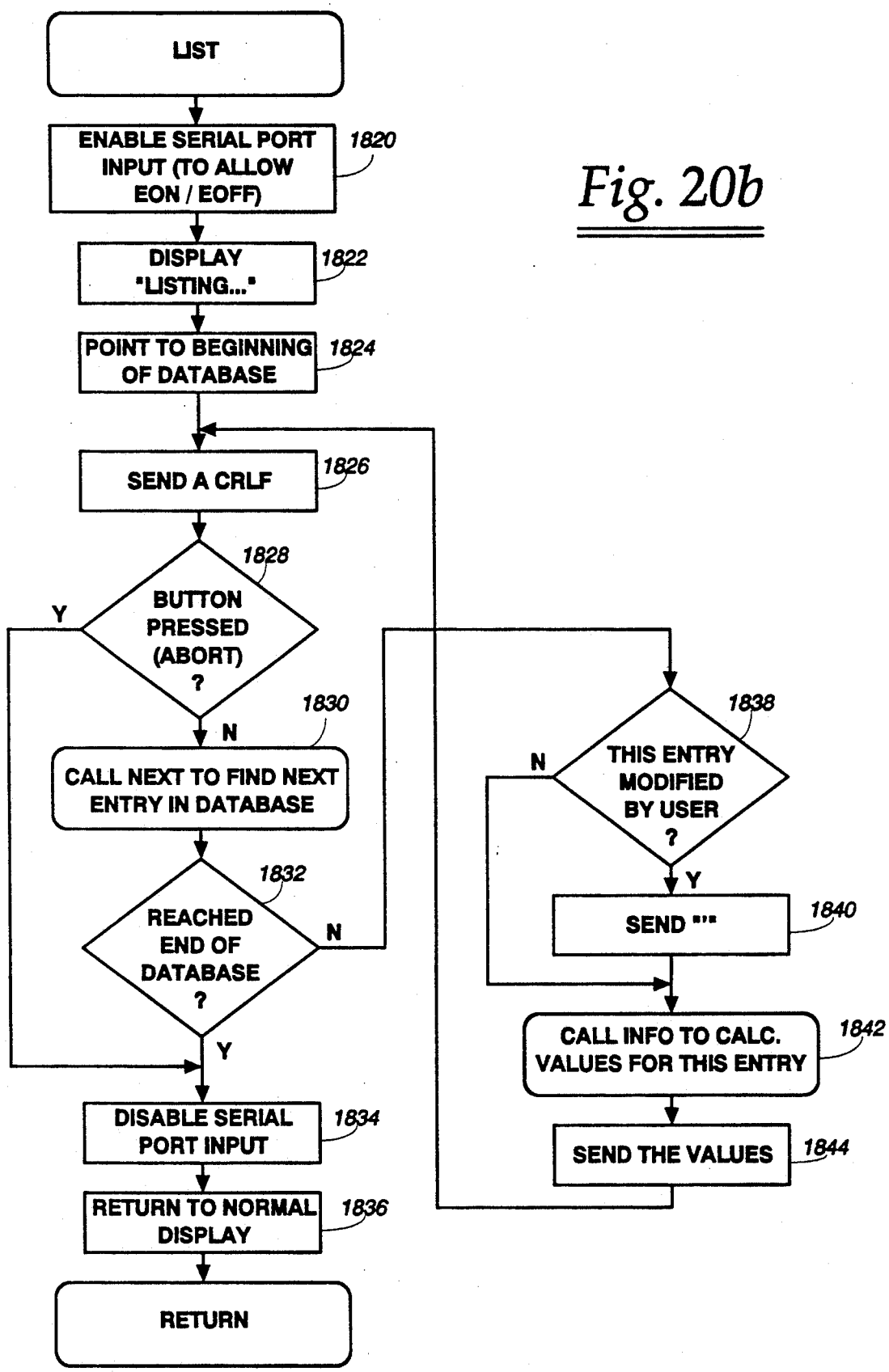

FIGS. 20a and 20b are flowcharts of subroutines MANUAL and LIST. The MANUAL subroutine provides for manual rotation of the antenna array 1508. Block 1801 conducts a preliminary test to determine whether or not the subroutine is being called during execution of calibration procedures. If so, the program jumps ahead to block 1809. Otherwise, at block 1803, the program checks to see whether or not the first (normal) display mode has been selected for the LCD display 1304. If so, the program skips ahead to block 1807; if not, at block 1805, the first display mode is displayed on the LCD display 1304.

Block 1807 updates the date, time and hearing displays in the LCD display 1304. Next, block 1809 determines whether the CCW or CW button was pressed. If neither button was pressed, the motor is turned off at block 1811. Then, the subroutine returns control to the calling program.

The LIST subroutine lists the entries in the database for the convenience of the operator. Block 1820 enables the serial port input of the rotor controller 1504. Next, block 1822 causes the LCD display to display the message "Listing . . . ". Block 1824 adjusts the value of a database pointer so that the pointer is pointing to the beginning of the database. Block 1826 sends out a carriage return/line feed character. Block 1828 determines whether or not a button on the keypad 1308 has been pressed, indicating that the listing is to be aborted. If a button has been pressed, the subroutine skips ahead to block 1834. Otherwise, the subroutine NXT (described earlier in conjunction with FIGS. 18a-18b) is called at block 1830 to find the next entry in the database. Block 1832 tests to see whether or not the end of the database has been reached. If so, the serial port input is disabled at block 1834, the LCD display is returned to the normal display mode at block 1836, and program control is returned to the calling program. If the end of the database has not been reached as determined in block 1832, block 1838 checks to see whether the database entry in question has been modified by the user. If so, an asterisk character is sent at block 1840.

Program control proceeds to block 1842 where the subroutine INFO (FIGS. 19a and 19b) is called to calculate values for the database entry. Block 1844 sends the calculated values and loops the program back to block 1826.

Figure 21:
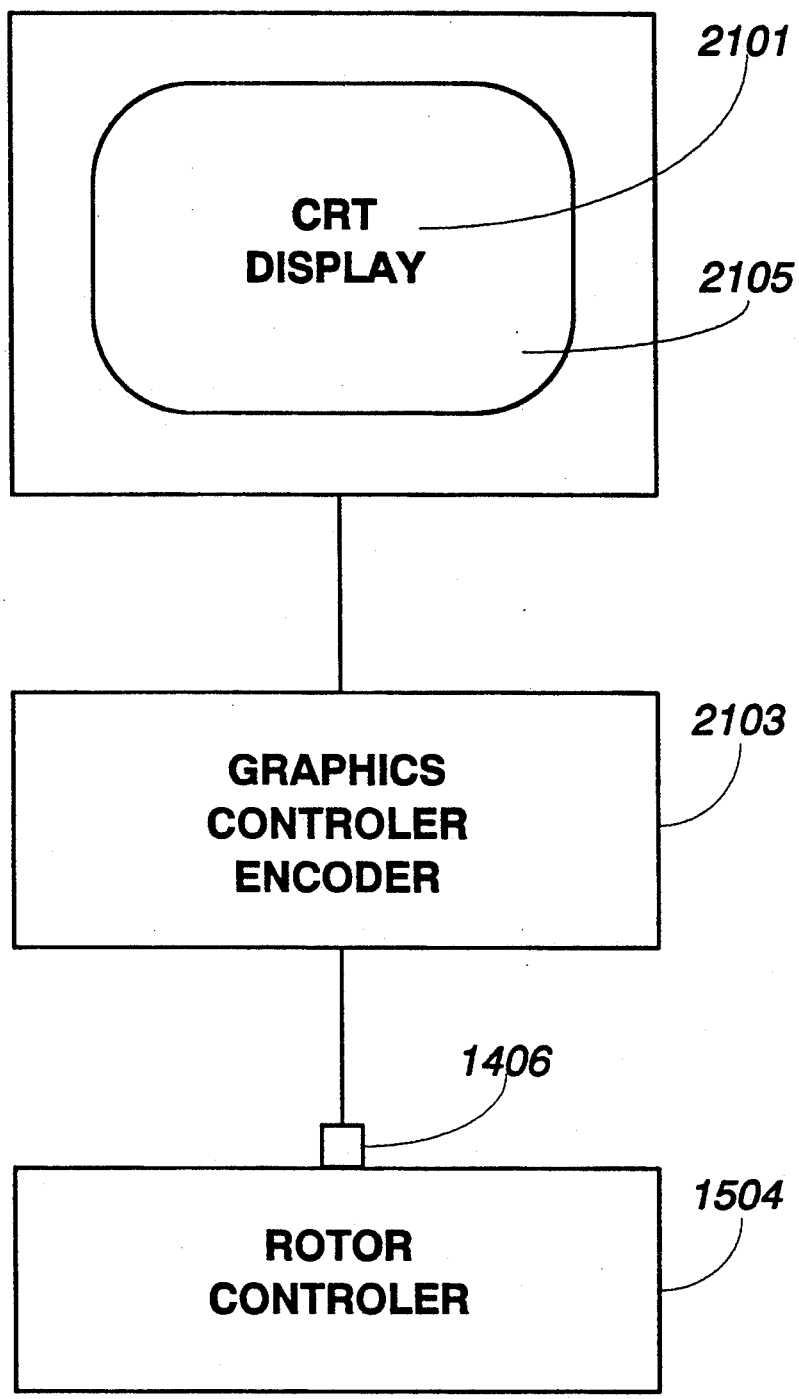
FIG. 21 illustrates a further embodiment of the invention including a CRT display, a graphics controller/encoder and a rotor controller.

FIG. 21 illustrates a further embodiment of the invention. A cathode-ray tube display 2101 is used in place of the LCD display 1304 as a user interface. The CRT display may optionally contain a touch-sensitive screen 2105. The touch-sensitive screen 2105 accepts user input which was entered into the keypad 1307 of the earlier-illustrated embodiment. A graphics controller/encoder 2103 drives the CRT display and optionally provides an encoder for encoding user input entered on the touch-sensitive CRT screen 2105. The graphics controller 2103 is converted to the serial port 1406 of the rotor controller 1504.

The rotor controller 1504 drives the graphics controller/encoder 2103. Data output from the rotor controller 1405 is converted into a video output by graphics controller 2103. The graphics controller 2103 has the ability to control either a monochromatic CRT display or a color CRT display with a video signal. If a color CRT display is used for CRT display 2101, the video signal has separate red, blue and green color signals for coupling to the separate guns of the CRT display 2101. The CRT display 2101 is used to display prompts from the system software, destination indicia for various target zones, operational parameters including the current bearing and other information which was provided by the LCD display 1304. Optionally, the destination indicia may include a map of the world and/or a map of various geographic regions.

Figure 22:
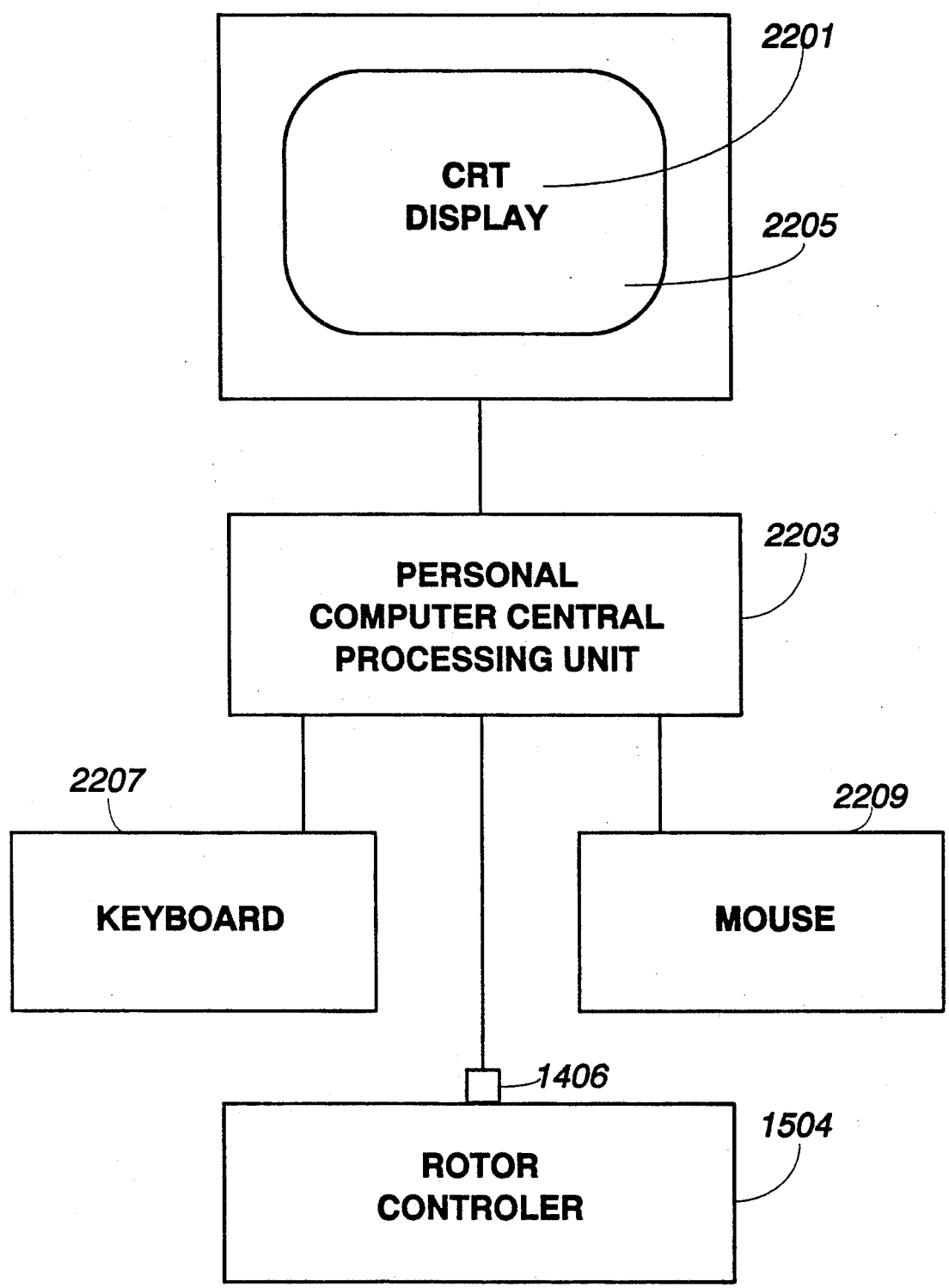
FIG. 22 illustrates a further embodiment of the invention including a CRT display, a personal computer central processing unit, a keyboard, a tabletop mouse control and a rotor controller.

FIG. 22 illustrates a further embodiment of the invention. The rotor controller is connected to a personal computer central processing unit 2203 via serial port 1406. Data is entered into the central processing unit 2203 by means of a keyboard 2207, a mouse 2209 and/or a touch-sensitive CRT screen 2205. A CRT display 2201 is driven by the central processing unit 2203 and displays destination indicia for potential target zones. Optionally, the destination indicia may include a map of the geographic regions. The user enters data by means of a mouse 2209, a keyboard 2207 and/or a touch-sensitive CRT display screen 2205.

What is claimed is:

1. A system for automatically controlling the rotation of an angularly positionable antenna from one angular position to a desired new angular position, comprising:
   a plurality of destination indicia, each of which specifies a geographic location;
   display means for displaying said plurality of destination indicia;
   manual selection means associated with said display means for selecting one of said destination indicia;
   a memory containing a table associating each of said plurality of destination indicia with a geographical reference location in latitude and longitude and a time zone offset variable specifying the time zone of said geographical reference location with respect to an arbitrary reference time zone;
   retrieval means associated with and activated by said manual selection means for retrieving from said table said geographical reference location associated with said selected desired destination indicia;
   calculating means for calculating a desired angular position for said antenna by determining an angular offset of said antenna from an arbitrary reference angle based upon the location of said geographical reference location with respect to an arbitrary reference location; and
   energizing means for energizing an antenna rotor shaft such that said shaft is rotated to said desired angular position.

2. A system for automatically controlling the rotation of an angularly positionable antenna as set forth in claim 1 wherein said destination indicia is selected from a set consisting of (1) the name of a country or a portion thereof; (2) an amateur radio prefix or a portion thereof;

(3) geographic coordinates of latitude and longitude; (4) a grid square; and (5) a bearing in degrees.

3. A system for automatically controlling the rotation of an angularly positionable antenna as set forth in claim 1 wherein said manual selection means further includes a keyboard comprised of a plurality of keys.

4. A system for automatically controlling the rotation of an angularly positionable antenna as set forth in claim 1 wherein said retrieval means comprises a microprocessor-based data processing system for storing and retrieving data including said destination indicia.

5. A system for automatically controlling the rotation of an angularly positionable antenna as set forth in claim 1 wherein said memory means includes read-only memory and random-access memory.

6. A system for automatically controlling the rotation of an angularly positionable antenna as set forth in claim 5 further including data transfer means for transferring data from said read-only memory to said random-access memory.

7. A system for automatically controlling the rotation of an angularly positionable antenna as set forth in claim 6 further including editing means for editing the contents of said random-access memory subsequent to said transferring of said data.

8. A system for automatically controlling the rotation of an angularly positionable antenna as set forth in claim 1 wherein said manual selection means further includes a cathode-ray tube having a touch-sensitive surface.

9. A system for automatically controlling the rotation of an angularly positionable antenna as set forth in claim 1 wherein said manual selection means further includes a portable mouse controller producing electromagnetic control signals and a cathode-ray tube responsive to said electromagnetic control signals.

10. A system for automatically controlling the rotation of an angularly positionable antenna as set forth in claim 1 wherein said manual selection means further includes a hand-held infrared transmitter producing infrared control signals, and said display means is associated with an infrared receiver responsive to said infrared control signals 11. A system for automatically controlling the rotation of an angularly positionable antenna as set forth in claim 1 wherein said manual selection means further includes a liquid crystal display having a touch-sensitive surface.

12. A system for automatically controlling the rotation of an angularly positionable antenna as set forth in claim 1 wherein said manual selection means further includes a tabletop mouse control unit producing electromagnetic control signals and a liquid crystal display responsive to said electromagnetic control signals.

13. A system for automatically controlling the rotation of an angularly positionable antenna as set forth in claim 1 wherein said display means further includes a liquid crystal display.

14. A system for automatically controlling the rotation of an angularly positionable antenna as set forth in claim 1 wherein said display means further includes a cathode-ray tube.

15. A system for automatically controlling the rotation of an angularly positionable antenna as set forth in claim 1 wherein said display means depicts a geographic representation of the world and said manual selection means is operative on said display means to select at least one geographical location displayed on said display means.

16. A system for automatically controlling the rotation of an angularly positionable antenna as set forth in claim 1 further including:
 a data communications port for transferring data to and from said system; and
 a remote control selection means interfacing with said data communications port for selecting one of said destination indicia.

17. A method for automatically controlling the rotation of an angularly positionable antenna from one angular position to a desired new angular position, comprising the following steps:
 a) storing a table in an electronic memory, said table including a plurality of destination indicia and a plurality of sets of geographic coordinates in latitude and longitude, each said destination index being associated with one said set of geographical coordinates;
 b) displaying said plurality of said destination indicia;
 c) selecting a desired destination index from among said displayed destination indicia;
 d) retrieving said geographic coordinates corresponding to said desired destination index from said table stored in said electronic memory;
 e) calculating an angular offset for said desired destination index based upon the location of said retrieved geographic coordinates with respect to an arbitrary reference location in latitude and longitude; and
 f) rotating an angularly positionable antenna to said angular offset as determined in step (e).

18. A method for automatically controlling the rotation of an angularly positionable antenna as set forth in claim 17 wherein step (a) further includes the step of storing in said table a time zone offset variable for each said set of geographic coordinates, said time zone variable specifying the time zone of said geographic coordinates with respect to an arbitrary reference time zone.

19. A method for automatically controlling the rotation of an angularly positionable antenna as set forth in claim 17 wherein step (e) further includes the step of calculating the distance between said retrieved geographic coordinates and said arbitrary reference location 20. A method for automatically controlling the rotation of an angularly positionable antenna as set forth in claim 17 wherein step (f) further includes the step of providing electronic control signals for energizing and braking an antenna rotor motor such that a brake release signal is applied to said rotor motor prior to energization of said rotor motor, and such that said rotor motor is initially energized in a direction opposite to said angular offset determined in step (e).

21. A method for automatically controlling the rotation of an angularly positionable antenna as set forth in claim 17 wherein step (a) further includes the step of storing said table in an electronic read-only memory.

22. A method for automatically controlling the rotation of an angularly positionable antenna as set forth in claim 21 further including the step of copying said table from said read-only memory to a random-access memory, thus permitting subsequent editing of said table stored in said random-access memory.

23. A system for automatically controlling the position of a rotatable antenna;
 means for storing predetermined geographical locations corresponding to a plurality of destination indicia;

means for selecting one of said stored destination indicia;

means responsive to said selecting means for calculating an angular position for said rotatable antenna corresponding to said selected destination indicia; and means responsive to said calculating means for positioning said rotatable antenna to said angular position.

24. A system as recited in claim 23 wherein said destination indicia includes at least a portion of an amateur radio prefix.

25. A system as recited in claim 23 wherein said destination indicia includes a latitude and longitude coordinate.

26. A system as recited in claim 23 wherein said destination indicia includes a bearing.

27. A system as recited in claim 23 wherein said destination indicia includes a portion of a country name.

28. A system as recited in claim 23 further including means for displaying said plurality of destination indicia.

* * * * *

UNITED STATES PATENT AND TRADEMARK OFFICE
CERTIFICATE OF CORRECTION

PATENT NO. : 5,214,364

DATED : May 25, 1993

INVENTOR(S) : Perdue et al.

It is certified that error appears in the above-identified patent and that said Letters Patent is hereby corrected as shown below:

Column 1, line 4, After the title, insert --BACKGROUND OF THE INVENTION--;

line 63, after "bearing" insert --.--.

Column 2, line 3, after "antenna" insert --.--;

line 65, change "3" to --3b--;

line 68, change "3." to --3b;--.

Column 3, line 7, after "7j" delete ";";

change "represents" to --represent--;

line 13, change "3." to --3b;--;

line 15, change "3." to --3b;--;

UNITED STATES PATENT AND TRADEMARK OFFICE
CERTIFICATE OF CORRECTION

PATENT NO. : 5,214,364  Page 2 of 7
DATED : May 25, 1993
INVENTOR(S) : Perdue et al.

It is certified that error appears in the above-identified patent and that said Letters Patent is hereby corrected as shown below:

line 36, change "represents" to --represent--;

line 42, change "FIG. 17a-17b represents" to --FIGS. 17a-17c represent--;

line 47, change "represents" to --represent--;

line 51, change "represents" to --represent--;

Column 6, line 52, after "1301" insert --running between the power unit 1511 and the control--.

Column 7, line 39, change "others" to --other--;

line 42, after "convenience" insert --.--.

Column 8, line 4, after "displayed" insert --.--;

line 12, after "specified" insert --.--;

UNITED STATES PATENT AND TRADEMARK OFFICE
CERTIFICATE OF CORRECTION

PATENT NO. : 5,214,364

DATED : May 25, 1993

INVENTOR(S) : Perdue et al.

It is certified that error appears in the above-identified patent and that said Letters Patent is hereby corrected as shown below:

line 41, after "required" insert --.--;

Column 9, line 27, delete "conditions of ordinary" and insert --ordinary conditions--;

line 36, after "failure" insert --.--.

Column 10, line 13, change "7a" to --7g--;

line 20, change "7a" to --7f--.

Column 11, line 12, change "7j" to --7i--;

line 30, after "recognized" insert --.--;

line 35, after "lost" insert --.--.

Column 12, line 9, after "input" insert --.--.

UNITED STATES PATENT AND TRADEMARK OFFICE
CERTIFICATE OF CORRECTION

PATENT NO. : 5,214,364

DATED : May 25, 1993

INVENTOR(S) : Perdue et al.

It is certified that error appears in the above-identified patent and that said Letters Patent is hereby corrected as shown below:

Column 13, line 35, after "de-energizes" insert --.--;

line 60, after "enabled" insert --.--.

Column 14, line 22, after "functions" insert --.-- line 42, after "bearing" insert --:--;

line 52, after "letters" insert --.--;

line 60, after "parameters" insert --.--;

line 67, after "bearing" insert --.--.

Column 16, line 8, after "situation" insert --.--;

line 13, after "pressed" insert --.--;

line 46, after "prefixes" insert --.--;

UNITED STATES PATENT AND TRADEMARK OFFICE
CERTIFICATE OF CORRECTION

PATENT NO. : 5,214,364

DATED : May 25, 1993

INVENTOR(S) : Perdue et al.

Page 5 of 7

It is certified that error appears in the above-identified patent and that said Letters Patent is hereby corrected as shown below:

line 53, after "line" insert --.--.

Column 17, line 2, after "bearing" (first occurrence) insert --.--;

line 7, after "position" insert --.--;

line 45, after "operation" insert --.--;

line 59, after "mode" insert --.--.

Column 19, line 4, change "CALIS" to --CALIB--;

line 33, after "pressed" insert --.--.

Column 20, line 44, after "again" insert --.--.

Column 22, line 16, change "Baudrate" to --Baud rate--;

UNITED STATES PATENT AND TRADEMARK OFFICE
CERTIFICATE OF CORRECTION

PATENT NO. : 5,214,364  Page 6 of 7
DATED : May 25, 1993
INVENTOR(S) : Perdue et al.

It is certified that error appears in the above-identified patent and that said Letters Patent is hereby corrected as shown below:

line 63, after "rotation" insert --.--.

Column 24, line 9, after "pressed" insert --.--. Column 25, line 13, after "described" insert --.--;

line 16, after "returns" insert --.--;

line 53, after "bearing" insert --.--.

Column 26, line 18, after "argument" insert --.--;

line 54, change "167" to --4167--;

line 61, after "described" insert --.--.

Column 27, line 1, after "5200," insert --where a great circle angle is calculated from the--;

UNITED STATES PATENT AND TRADEMARK OFFICE
CERTIFICATE OF CORRECTION

PATENT NO. : 5,214,364

DATED : May 25, 1993

INVENTOR(S) : Perdue et al.

It is certified that error appears in the above-identified patent and that said Letters Patent is hereby corrected as shown below:

line 24, after "values" insert --.--;

line 26, change "FIG." to --FIGS.--.

Signed and Sealed this

Twelfth Day of April, 1994

Attest:

BRUCE LEHMAN

Attesting Officer

Commissioner of Patents and Trademarks